(12) United States Patent
Lancaster et al.

(10) Patent No.: US 10,102,260 B2
(45) Date of Patent: Oct. 16, 2018

(54) METHOD AND APPARATUS FOR ACCELERATED DATA TRANSLATION USING RECORD LAYOUT DETECTION

(71) Applicant: IP Reservoir, LLC, St. Louis, MO (US)

(72) Inventors: Joseph M. Lancaster, St. Louis, MO (US); Michael John Henrichs, Eureka, MO (US); Terry Tidwell, Brentwood, MO (US); Alex St. John, Webster Groves, MO (US); Kevin Brian Sprague, Clayton, MO (US)

(73) Assignee: IP RESERVOIR, LLC, St. Louis, MO (US)

( * ) Notice: Subject to any disclaimer, the term of this patent is extended or adjusted under 35 U.S.C. 154(b) by 476 days.

(21) Appl. No.: 14/694,580

(22) Filed: Apr. 23, 2015

(65) Prior Publication Data
US 2015/0310077 A1 Oct. 29, 2015

Related U.S. Application Data

(60) Provisional application No. 61/983,414, filed on Apr. 23, 2014.

(51) Int. Cl.
*G06F 7/00* (2006.01)
*G06F 17/30* (2006.01)
*G06F 21/71* (2013.01)

(52) U.S. Cl.
CPC .. *G06F 17/30569* (2013.01); *G06F 17/30598* (2013.01); *G06F 21/71* (2013.01)

(58) Field of Classification Search
CPC ......... G06F 17/30569; G06F 17/30563; G06F 17/30592; G06F 17/30598

USPC .......................................... 707/602, 755, 756
See application file for complete search history.

(56) References Cited

U.S. PATENT DOCUMENTS

| | | | |
|---|---|---|---|
| 3,601,808 | A | 8/1971 | Vlack |
| 3,611,314 | A | 10/1971 | Pritchard, Jr. et al. |
| 3,729,712 | A | 4/1973 | Glassman |
| 3,824,375 | A | 7/1974 | Gross et al. |
| 3,848,235 | A | 11/1974 | Lewis et al. |

(Continued)

FOREIGN PATENT DOCUMENTS

| | | |
|---|---|---|
| EP | 0573991 | 12/1993 |
| EP | 0880088 | 11/1996 |

(Continued)

OTHER PUBLICATIONS

"A Reconfigurable Computing Model for Biological Research Application of Smith-Waterman Analysis to Bacterial Genomes" A White Paper Prepared by Star Bridge Systems, Inc. [retrieved Dec. 12, 2006]. Retrieved from the Internet: <URL: http://www.starbridgesystems.com/resources/whitepapers/Smith%20Waterman%20Whitepaper.pdf.

(Continued)

*Primary Examiner* — Md I Uddin
(74) *Attorney, Agent, or Firm* — Thompson Coburn LLP; Benjamin L. Volk, Jr.

(57) ABSTRACT

Various methods and apparatuses are described for performing high speed translations of data. In an example embodiment, record layout detection can be performed for data. In another example embodiment, data pivoting prior to field-specific data processing can be performed.

64 Claims, 42 Drawing Sheets

(56) References Cited

U.S. PATENT DOCUMENTS

| | | | |
|---|---|---|---|
| 3,906,455 | A | 9/1975 | Houston et al. |
| 4,081,607 | A | 3/1978 | Vitols et al. |
| 4,298,898 | A | 11/1981 | Cardot |
| 4,314,356 | A | 2/1982 | Scarbrough |
| 4,385,393 | A | 5/1983 | Chaure et al. |
| 4,464,718 | A | 8/1984 | Dixon et al. |
| 4,550,436 | A | 10/1985 | Freeman et al. |
| 4,823,306 | A | 4/1989 | Barbic et al. |
| 4,941,178 | A | 7/1990 | Chuang |
| 5,023,910 | A | 6/1991 | Thomson |
| 5,050,075 | A | 9/1991 | Herman et al. |
| 5,101,424 | A | 3/1992 | Clayton et al. |
| 5,140,692 | A | 8/1992 | Morita |
| 5,161,103 | A | 11/1992 | Kosaka et al. |
| 5,163,131 | A | 11/1992 | Row et al. |
| 5,179,626 | A | 1/1993 | Thomson |
| 5,226,165 | A | 7/1993 | Martin |
| 5,243,655 | A | 9/1993 | Wang |
| 5,249,292 | A | 9/1993 | Chiappa |
| 5,255,136 | A | 10/1993 | Machado et al. |
| 5,263,156 | A | 11/1993 | Bowen et al. |
| 5,265,065 | A | 11/1993 | Turtle |
| 5,267,148 | A | 11/1993 | Kosaka et al. |
| 5,313,560 | A | 5/1994 | Maruoka et al. |
| 5,319,776 | A | 6/1994 | Hile et al. |
| 5,327,521 | A | 7/1994 | Savic et al. |
| 5,339,411 | A | 8/1994 | Heaton, Jr. |
| 5,347,634 | A | 9/1994 | Herrell et al. |
| 5,371,794 | A | 12/1994 | Diffie et al. |
| 5,388,259 | A | 2/1995 | Fleischman et al. |
| 5,396,253 | A | 3/1995 | Chia |
| 5,404,411 | A | 4/1995 | Banton et al. |
| 5,404,488 | A | 4/1995 | Kerrigan et al. |
| 5,418,951 | A | 5/1995 | Damashek |
| 5,421,028 | A | 5/1995 | Swanson |
| 5,432,822 | A | 7/1995 | Kaewell, Jr. |
| 5,440,723 | A | 8/1995 | Arnold et al. |
| 5,461,712 | A | 10/1995 | Chelstowski et al. |
| 5,463,701 | A | 10/1995 | Kantner, Jr. et al. |
| 5,465,353 | A | 11/1995 | Hull et al. |
| 5,481,735 | A | 1/1996 | Mortensen et al. |
| 5,488,725 | A | 1/1996 | Turtle et al. |
| 5,497,488 | A | 3/1996 | Akizawa et al. |
| 5,517,642 | A | 5/1996 | Bezek et al. |
| 5,544,352 | A | 8/1996 | Egger |
| 5,546,578 | A | 8/1996 | Takada et al. |
| 5,651,125 | A | 7/1997 | Witt et al. |
| 5,687,297 | A | 11/1997 | Coonan et al. |
| 5,701,464 | A | 12/1997 | Aucsmith |
| 5,704,060 | A | 12/1997 | Del Monte |
| 5,712,942 | A | 1/1998 | Jennings et al. |
| 5,721,898 | A | 2/1998 | Beardsley et al. |
| 5,740,466 | A | 4/1998 | Geldman et al. |
| 5,774,835 | A | 6/1998 | Ozawa et al. |
| 5,774,839 | A | 6/1998 | Shlomot |
| 5,781,772 | A | 7/1998 | Wilkinson, III et al. |
| 5,781,921 | A | 7/1998 | Nichols |
| 5,805,832 | A | 9/1998 | Brown et al. |
| 5,813,000 | A | 9/1998 | Furlani |
| 5,819,273 | A | 10/1998 | Vora et al. |
| 5,819,290 | A | 10/1998 | Fujita et al. |
| 5,826,075 | A | 10/1998 | Bealkowski et al. |
| 5,864,738 | A | 1/1999 | Kessler et al. |
| 5,870,730 | A | 2/1999 | Furuya et al. |
| 5,886,701 | A | 3/1999 | Chauvin et al. |
| 5,913,211 | A | 6/1999 | Nitta |
| 5,930,753 | A | 7/1999 | Potamianos et al. |
| 5,943,421 | A | 8/1999 | Grabon |
| 5,943,429 | A | 8/1999 | Handel |
| 5,978,801 | A | 11/1999 | Yuasa |
| 5,987,432 | A | 11/1999 | Zusman et al. |
| 5,991,881 | A | 11/1999 | Conklin et al. |
| 5,995,963 | A | 11/1999 | Nanba et al. |
| 6,006,264 | A | 12/1999 | Colby et al. |
| 6,023,760 | A | 2/2000 | Karttunen |
| 6,028,939 | A | 2/2000 | Yin |
| 6,044,407 | A | 3/2000 | Jones et al. |
| 6,058,391 | A | 5/2000 | Gardner |
| 6,064,739 | A | 5/2000 | Davis |
| 6,067,569 | A | 5/2000 | Khaki et al. |
| 6,070,172 | A | 5/2000 | Lowe |
| 6,073,160 | A | 6/2000 | Grantham et al. |
| 6,105,067 | A | 8/2000 | Batra |
| 6,134,551 | A | 10/2000 | Aucsmith |
| 6,138,176 | A | 10/2000 | McDonald et al. |
| RE36,946 | E | 11/2000 | Diffie et al. |
| 6,147,976 | A | 11/2000 | Shand et al. |
| 6,169,969 | B1 | 1/2001 | Cohen |
| 6,175,874 | B1 | 1/2001 | Imai et al. |
| 6,226,676 | B1 | 5/2001 | Crump et al. |
| 6,236,980 | B1 | 5/2001 | Reese |
| 6,279,113 | B1 | 8/2001 | Vaidya |
| 6,317,795 | B1 | 11/2001 | Malkin et al. |
| 6,336,150 | B1 | 1/2002 | Ellis et al. |
| 6,339,819 | B1 | 1/2002 | Huppenthal et al. |
| 6,370,645 | B1 | 4/2002 | Lee et al. |
| 6,377,942 | B1 | 4/2002 | Hinsley et al. |
| 6,381,242 | B1 | 4/2002 | Maher, III et al. |
| 6,389,532 | B1 | 5/2002 | Gupta et al. |
| 6,397,259 | B1 | 5/2002 | Lincke et al. |
| 6,397,335 | B1 | 5/2002 | Franczek et al. |
| 6,412,000 | B1 | 6/2002 | Riddle et al. |
| 6,430,272 | B1 | 8/2002 | Maruyama et al. |
| 6,456,632 | B1 | 9/2002 | Baum et al. |
| 6,463,474 | B1 | 10/2002 | Fuh et al. |
| 6,499,107 | B1 | 12/2002 | Gleichauf et al. |
| 6,535,868 | B1 | 3/2003 | Galeazzi et al. |
| 6,564,263 | B1 | 5/2003 | Bergman et al. |
| 6,578,147 | B1 | 6/2003 | Shanklin et al. |
| 6,625,150 | B1 | 9/2003 | Yu |
| 6,704,816 | B1 | 3/2004 | Burke |
| 6,711,558 | B1 | 3/2004 | Indeck et al. |
| 6,765,918 | B1 | 7/2004 | Dixon et al. |
| 6,772,345 | B1 | 8/2004 | Shetty |
| 6,785,677 | B1 | 8/2004 | Fritchman |
| 6,804,667 | B1 | 10/2004 | Martin |
| 6,807,156 | B1 | 10/2004 | Veres et al. |
| 6,839,686 | B1 | 1/2005 | Galant |
| 6,850,906 | B1 | 2/2005 | Chadha et al. |
| 6,870,837 | B2 | 3/2005 | Ho et al. |
| 6,877,044 | B2 | 4/2005 | Lo et al. |
| 6,886,103 | B1 | 4/2005 | Brustoloni et al. |
| 6,901,461 | B2 | 5/2005 | Bennett |
| 6,931,408 | B2 | 8/2005 | Adams et al. |
| 6,931,545 | B1 | 8/2005 | Ta et al. |
| 6,944,168 | B2 | 9/2005 | Paatela et al. |
| 6,978,223 | B2 | 12/2005 | Milliken |
| 6,980,976 | B2 | 12/2005 | Alpha et al. |
| 6,981,054 | B1 | 12/2005 | Krishna |
| 7,007,208 | B1 | 2/2006 | Hibbert et al. |
| 7,019,674 | B2 | 3/2006 | Cadambi et al. |
| 7,046,848 | B1 | 5/2006 | Olcott |
| 7,093,023 | B2 | 8/2006 | Lockwood et al. |
| 7,127,424 | B2 | 10/2006 | Kemp, II et al. |
| 7,139,743 | B2 | 11/2006 | Indeck et al. |
| 7,149,715 | B2 | 12/2006 | Browne et al. |
| 7,167,980 | B2 | 1/2007 | Chiu |
| 7,177,833 | B1 | 2/2007 | Marynowski et al. |
| 7,181,437 | B2 | 2/2007 | Indeck et al. |
| 7,181,608 | B2 | 2/2007 | Fallon et al. |
| 7,222,114 | B1 | 5/2007 | Chan et al. |
| 7,224,185 | B2 | 5/2007 | Campbell et al. |
| 7,225,188 | B1 | 5/2007 | Gai et al. |
| 7,251,629 | B1 | 7/2007 | Marynowski et al. |
| 7,287,037 | B2 | 10/2007 | An et al. |
| 7,305,383 | B1 | 12/2007 | Kubesh et al. |
| 7,305,391 | B2 | 12/2007 | Wyschogrod et al. |
| 7,363,277 | B1 | 4/2008 | Dutta et al. |
| 7,386,564 | B2 | 6/2008 | Abdo et al. |
| 7,408,932 | B2 | 8/2008 | Kounavis et al. |
| 7,411,957 | B2 | 8/2008 | Stacy et al. |
| 7,420,931 | B2 | 9/2008 | Nanda et al. |
| 7,444,515 | B2 | 10/2008 | Dharmapurikar et al. |
| 7,454,418 | B1 | 11/2008 | Wang |

(56) References Cited

U.S. PATENT DOCUMENTS

| | | |
|---|---|---|
| 7,457,834 B2 | 11/2008 | Jung et al. |
| 7,461,064 B2 | 12/2008 | Fontoura et al. |
| 7,467,155 B2 | 12/2008 | McCool et al. |
| 7,478,431 B1 | 1/2009 | Nachenberg |
| 7,480,253 B1 | 1/2009 | Allan |
| 7,487,327 B1 | 2/2009 | Chang et al. |
| 7,496,108 B2 | 2/2009 | Biran et al. |
| 7,552,107 B2 | 6/2009 | Indeck et al. |
| 7,558,925 B2 | 7/2009 | Bouchard et al. |
| 7,565,525 B2 | 7/2009 | Vorbach et al. |
| 7,636,703 B2 | 12/2009 | Taylor |
| 7,660,793 B2 | 2/2010 | Indeck et al. |
| 7,680,790 B2 | 3/2010 | Indeck et al. |
| 7,685,121 B2 | 3/2010 | Brown et al. |
| 7,685,254 B2 | 3/2010 | Pandya |
| 7,701,945 B2 | 4/2010 | Roesch et al. |
| 7,702,629 B2 | 4/2010 | Cytron et al. |
| 7,783,862 B2 | 8/2010 | Cameron |
| 7,805,392 B1 | 9/2010 | Steele et al. |
| 7,840,482 B2 | 11/2010 | Singla et al. |
| 7,917,299 B2 | 3/2011 | Buhler et al. |
| 7,921,046 B2 | 4/2011 | Parsons et al. |
| 7,945,528 B2 | 5/2011 | Cytron et al. |
| 7,949,650 B2 | 5/2011 | Indeck et al. |
| 8,095,508 B2 | 1/2012 | Chamberlain et al. |
| 8,374,986 B2 | 2/2013 | Indeck et al. |
| 8,407,588 B1 | 3/2013 | Hu et al. |
| 8,620,881 B2 | 12/2013 | Chamberlain et al. |
| 8,751,452 B2 | 6/2014 | Chamberlain et al. |
| 8,768,888 B2 | 7/2014 | Chamberlain et al. |
| 9,176,775 B2 | 11/2015 | Chamberlain et al. |
| 9,633,093 B2 | 4/2017 | Henrichs et al. |
| 9,633,097 B2 | 4/2017 | Tidwell et al. |
| 2001/0013048 A1 | 8/2001 | Imbert de Tremiolles et al. |
| 2001/0014093 A1 | 8/2001 | Yoda et al. |
| 2001/0052038 A1 | 12/2001 | Fallon et al. |
| 2001/0056547 A1 | 12/2001 | Dixon |
| 2002/0031125 A1 | 3/2002 | Sato |
| 2002/0069370 A1 | 6/2002 | Mack |
| 2002/0091691 A1 | 7/2002 | Sharp |
| 2002/0095512 A1 | 7/2002 | Rana et al. |
| 2002/0103663 A1 | 8/2002 | Bankier et al. |
| 2002/0105911 A1 | 8/2002 | Pruthi et al. |
| 2002/0129140 A1 | 9/2002 | Peled et al. |
| 2002/0150248 A1 | 10/2002 | Kovacevic |
| 2002/0162025 A1 | 10/2002 | Sutton et al. |
| 2002/0166063 A1 | 11/2002 | Lachman et al. |
| 2003/0009693 A1 | 1/2003 | Brock et al. |
| 2003/0014521 A1 | 1/2003 | Elson et al. |
| 2003/0014662 A1 | 1/2003 | Gupta et al. |
| 2003/0018630 A1 | 1/2003 | Indeck et al. |
| 2003/0023876 A1 | 1/2003 | Bardsley et al. |
| 2003/0037037 A1 | 2/2003 | Adams et al. |
| 2003/0043805 A1 | 3/2003 | Graham et al. |
| 2003/0051043 A1 | 3/2003 | Wyschogrod et al. |
| 2003/0065943 A1 | 4/2003 | Geis et al. |
| 2003/0074582 A1 | 4/2003 | Patel et al. |
| 2003/0110229 A1 | 6/2003 | Kulig et al. |
| 2003/0115485 A1 | 6/2003 | Milliken |
| 2003/0163715 A1 | 8/2003 | Wong |
| 2003/0169877 A1 | 9/2003 | Liu et al. |
| 2003/0177253 A1 | 9/2003 | Schuehler et al. |
| 2003/0221013 A1 | 11/2003 | Lockwood et al. |
| 2004/0019703 A1 | 1/2004 | Burton |
| 2004/0028047 A1 | 2/2004 | Hou et al. |
| 2004/0049596 A1 | 3/2004 | Schuehler et al. |
| 2004/0054924 A1 | 3/2004 | Chuah et al. |
| 2004/0064737 A1 | 4/2004 | Milliken et al. |
| 2004/0100977 A1 | 5/2004 | Suzuki et al. |
| 2004/0111632 A1 | 6/2004 | Halperin |
| 2004/0117645 A1 | 6/2004 | Okuda et al. |
| 2004/0162826 A1 | 8/2004 | Wyschogrod et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0196905 A1 | 10/2004 | Yamane et al. |
| 2004/0199448 A1 | 10/2004 | Chalermkraivuth et al. |
| 2004/0205149 A1 | 10/2004 | Dillon et al. |
| 2005/0005145 A1 | 1/2005 | Teixeira |
| 2005/0086520 A1 | 4/2005 | Dharmapurikar et al. |
| 2005/0113025 A1* | 5/2005 | Akamatsu .......... H04N 1/00278 |
| | | 455/41.3 |
| 2005/0131790 A1 | 6/2005 | Benzschawel et al. |
| 2005/0175010 A1 | 8/2005 | Wilson et al. |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0187974 A1 | 8/2005 | Gong |
| 2005/0195832 A1 | 9/2005 | Dharmapurikar et al. |
| 2005/0229254 A1 | 10/2005 | Singh et al. |
| 2006/0020715 A1 | 1/2006 | Jungck |
| 2006/0031154 A1 | 2/2006 | Noviello et al. |
| 2006/0031156 A1 | 2/2006 | Noviello et al. |
| 2006/0031263 A1 | 2/2006 | Arrouye et al. |
| 2006/0031737 A1 | 2/2006 | Chugg et al. |
| 2006/0036693 A1 | 2/2006 | Hulten et al. |
| 2006/0047636 A1 | 3/2006 | Mohania et al. |
| 2006/0053295 A1 | 3/2006 | Madhusudan et al. |
| 2006/0059213 A1 | 3/2006 | Evoy |
| 2006/0129745 A1 | 6/2006 | Thiel et al. |
| 2006/0198375 A1 | 9/2006 | Baik et al. |
| 2006/0242123 A1 | 10/2006 | Williams, Jr. |
| 2006/0259417 A1 | 11/2006 | Marynowski et al. |
| 2006/0269148 A1 | 11/2006 | Farber et al. |
| 2006/0294059 A1 | 12/2006 | Chamberlain et al. |
| 2007/0011175 A1 | 1/2007 | Langseth et al. |
| 2007/0011183 A1 | 1/2007 | Langseth et al. |
| 2007/0011317 A1 | 1/2007 | Brandyburg et al. |
| 2007/0011687 A1 | 1/2007 | Ilik et al. |
| 2007/0061594 A1 | 3/2007 | Ginter et al. |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0112748 A1 | 5/2007 | Angell et al. |
| 2007/0112837 A1 | 5/2007 | Houh et al. |
| 2007/0118500 A1 | 5/2007 | Indeck et al. |
| 2007/0130140 A1 | 6/2007 | Cytron et al. |
| 2007/0156574 A1 | 7/2007 | Marynowski et al. |
| 2007/0156669 A1 | 7/2007 | Marchisio et al. |
| 2007/0174841 A1 | 7/2007 | Chamberlain et al. |
| 2007/0179935 A1 | 8/2007 | Lee et al. |
| 2007/0209068 A1 | 9/2007 | Ansari et al. |
| 2007/0237327 A1 | 10/2007 | Taylor et al. |
| 2007/0244859 A1 | 10/2007 | Trippe et al. |
| 2007/0260602 A1 | 11/2007 | Taylor |
| 2007/0277036 A1 | 11/2007 | Chamberlain et al. |
| 2007/0294157 A1 | 12/2007 | Singla et al. |
| 2008/0005062 A1 | 1/2008 | Gupta et al. |
| 2008/0021874 A1 | 1/2008 | Dahl et al. |
| 2008/0023655 A1* | 1/2008 | Sakamoto .............. B82Y 10/00 |
| | | 250/492.22 |
| 2008/0030383 A1 | 2/2008 | Cameron |
| 2008/0077582 A1 | 3/2008 | Reed |
| 2008/0084573 A1 | 4/2008 | Horowitz et al. |
| 2008/0086274 A1 | 4/2008 | Chamberlain et al. |
| 2008/0104542 A1 | 5/2008 | Cohen et al. |
| 2008/0109413 A1 | 5/2008 | Indeck et al. |
| 2008/0114724 A1 | 5/2008 | Indeck et al. |
| 2008/0114725 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2008/0243675 A1 | 10/2008 | Parsons et al. |
| 2008/0307435 A1 | 12/2008 | Rehman |
| 2009/0007197 A1 | 1/2009 | Turner |
| 2009/0182683 A1 | 7/2009 | Taylor et al. |
| 2009/0262741 A1 | 10/2009 | Jungck et al. |
| 2009/0287628 A1 | 11/2009 | Indeck et al. |
| 2009/0300054 A1 | 12/2009 | Fisher et al. |

(56) References Cited

U.S. PATENT DOCUMENTS

| | | | |
|---|---|---|---|
| 2010/0094858 | A1 | 4/2010 | Indeck et al. |
| 2010/0145902 | A1 | 6/2010 | Boyan et al. |
| 2010/0198850 | A1 | 8/2010 | Cytron et al. |
| 2010/0284532 | A1 | 11/2010 | Burnett et al. |
| 2011/0040701 | A1 | 2/2011 | Singla et al. |
| 2011/0078109 | A1 | 3/2011 | Griggs et al. |
| 2011/0123021 | A1 | 5/2011 | Tepper |
| 2012/0114119 | A1 | 5/2012 | Ahuja et al. |
| 2012/0311411 | A1 | 12/2012 | Kirkpatrick |
| 2013/0151458 | A1 | 6/2013 | Indeck et al. |
| 2014/0114908 | A1* | 4/2014 | Henrichs ........... G06F 17/30563 707/602 |
| 2014/0114929 | A1 | 4/2014 | Henrichs et al. |
| 2014/0250393 | A1* | 9/2014 | Goodson ............... G06F 3/0484 715/765 |
| 2014/0279864 | A1 | 9/2014 | Lopyrev et al. |
| 2015/0310078 | A1 | 10/2015 | Lancaster et al. |
| 2015/0310087 | A1 | 10/2015 | Tidwell et al. |
| 2017/0123866 | A1 | 5/2017 | Indeck et al. |
| 2017/0124166 | A1 | 5/2017 | Thomas et al. |
| 2017/0220655 | A1 | 8/2017 | Henrichs et al. |

FOREIGN PATENT DOCUMENTS

| | | | |
|---|---|---|---|
| EP | 0851358 | A | 7/1998 |
| EP | 0887723 | | 12/1998 |
| EP | 0911738 | A | 4/1999 |
| JP | 02136900 | A | 5/1990 |
| JP | 03014075 | A | 1/1991 |
| JP | 09145544 | A | 6/1997 |
| JP | 200286715 | A | 10/2000 |
| JP | 2001357048 | A | 12/2001 |
| JP | 2002101089 | A | 4/2002 |
| WO | 199010910 | | 9/1990 |
| WO | 1994/09443 | A1 | 4/1994 |
| WO | 199737735 | | 10/1997 |
| WO | 199905814 | | 2/1999 |
| WO | 2000041136 | A1 | 7/2000 |
| WO | 2001022425 | A | 3/2001 |
| WO | 2001039577 | | 6/2001 |
| WO | 2001061913 | | 8/2001 |
| WO | 2001080082 | A2 | 10/2001 |
| WO | 2001080558 | | 10/2001 |
| WO | 2002061525 | | 8/2002 |
| WO | 2002082271 | | 10/2002 |
| WO | 2003100650 | | 4/2003 |
| WO | 2003036845 | | 5/2003 |
| WO | 2004017604 | | 2/2004 |
| WO | 2004042560 | A | 5/2004 |
| WO | 2004042561 | A | 5/2004 |
| WO | 2004042562 | | 5/2004 |
| WO | 2004042574 | A | 5/2004 |
| WO | 2005017708 | A | 2/2005 |
| WO | 2005026925 | | 3/2005 |
| WO | 2005048134 | A | 5/2005 |
| WO | 2006023948 | | 3/2006 |
| WO | 2006096324 | | 9/2006 |
| WO | 2007064685 | | 6/2007 |
| WO | 2007087507 | | 8/2007 |
| WO | 2008063973 | | 5/2008 |
| WO | 2008063974 | | 5/2008 |
| WO | 2009029842 | | 3/2009 |
| WO | 2009089467 | A2 | 7/2009 |
| WO | 2009140363 | A1 | 11/2009 |
| WO | 2014/066416 | A2 | 5/2014 |
| WO | 2015/164639 | | 10/2015 |

OTHER PUBLICATIONS

"ACTIV Financial Announces Hardware Based Market Data Feed Processing Strategy", For Release on Apr. 2, 2007, 2 pages.

"ACTIV Financial Delivers Accelerated Market Data Feed", Apr. 6, 2007, byline of Apr. 2, 2007, downloaded from http://hpcwire.com/hpc.1346816.html on Jun. 19, 2007, 3 pages.

"DRC, Exegy Announce Joint Development Agreement", Jun. 8, 2007, byline of Jun. 4, 2007; downloaded from http://www.hpcwire.com/hpc/1595644.html on Jun. 19, 2007, 3 pages.

"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.

"Overview, Field Programmable Port Extender", Jan. 2002 Gigabit Workshop Tutorial, Washington University, St. Louis, MO, Jan. 3-4, 2002, pp. 1-4.

"Payload Plus™ Agere System Interface", Agere Systems Product Brief, Jun. 2001, downloaded from Internet, Jan. 2002, pp. 1-6.

"RFC793: Transmission Control Protocol, Darpa Internet Program, Protocol Specification", Sep. 1981.

"Technology Overview", Data Search Systems Incorporated, downloaded from the http://www.datasearchsystems.com/tech.htm on Apr. 19, 2004.

"The Field-Programmable Port Extender (FPX)", downloaded from http://www.arl.wustl.edu/arl/ in Mar. 2002.

Aldwairi et al., "Configurable String Matching Hardware for Speeding up Intrusion Detection", SIRARCH Comput. Archit. News, vol. 33, No. 1, pp. 99-107, Mar. 2005.

Amanuma et al., "A FPGA Architecture for High Speed Computation", Proceedings of 60th Convention Architecture, Software Science, Engineering, Mar. 14, 2000, pp. 1-163-1-164, Information Processing Society, Japan.

Amer-Yahia et al., "XQuery 1.0 and XPath 2.0 Full-Text 1.0", W3C Working Draft, http://www.w3.org/TR/query-full-ext/, May 18, 2007—parts 1-4.

Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.

Anonymous, "Method for Allocating Computer Disk Space to a File of Known Size", IBM Technical Disclosure Bulletin, vol. 27, No. 10B, Mar. 1, 1985, New York.

Arnold et al., "The Splash 2 Processor and Applications", Proceedings 1993 IEEE International Conference on Computer Design: VLSI in Computers and Processors (ICCD '93), Oct. 3, 1993, pp. 482-485, IEEE Computer Society, Cambridge, MA USA.

Artan et al., "Multi-packet Signature Detection using Prefix Bloom Filters", 2005, IEEE, pp. 1811-1816.

Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.

Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.

Baer, "Computer Systems Architecture", 1980, pp. 262-265; Computer Science Press, Potomac, Maryland.

Baeza-Yates et al., "New and Faster Filters for Multiple Approximate String Matching", Random Structures and Algorithms (RSA), Jan. 2002, pp. 23-49, vol. 20, No. 1.

Baker et al., "High-throughput Linked-Pattern Matching for Intrusion Detection Systems", ANCS 2005: Proceedings of the 2005 Symposium on Architecture for Networking and Communications Systems, pp. 193-202, ACM Press, 2005.

Barone-Adesi et al., "Efficient Analytic Approximation of American Option Values", Journal of Finance, vol. 42, No. 2 (Jun. 1987), pp. 301-320.

Behrens et al., "Blastn Redundancy Filter in Reprogrammable Hardware," Final Project Submission, Fall 2003, Department of Computer Science and Engineering, Washington University.

Berk, "JLex: A lexical analyzer generator for Javan™ ", downloaded from http://www.cs.princeton.edu/~appel/modem/java/Jlex/ in Jan. 2002, pp. 1-18.

Bloom, "Space/Time Trade-offs in Flash Coding With Allowable Errors", Communications of the ACM, Jul. 1970, pp. 422-426, vol. 13, No. 7, Computer Usage Company, Newton Upper Falls, Massachusetts, USA.

(56) References Cited

OTHER PUBLICATIONS

Braun et al., "Layered Protocol Wrappers for Internet Packet Processing in Reconfigurable Hardware", Proceedings of Hot Interconnects 9 (HotI-9) Stanford, CA, Aug. 22-24, 2001, pp. 93-98.
Braun et al., "Protocol Wrappers for Layered Network Packet Processing in Reconfigurable Hardware", IEEE Micro, Jan.-Feb. 2002, pp. 66-74.
Brodie et al., "Dynamic Reconfigurable Computing", in Proc. of 9th Military and Aerospace Programmable Logic Devices International Conference, Sep. 2006.
Cavnar et al., "N-Gram-Based Text Categorization", Proceedings of SDAIR-94, 3rd Annual Symposium on Document Analysis and Information Retrieval, Las Vegas, pp. 161-175, 1994.
Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.
Chamberlain et al., "The Mercury System: Embedding Computation Into Disk Drives", 7th High Performance Embedded Computing Workshop, Sep. 2003, Boston, MA.
Chaney et al., "Design of a Gigabit ATM Switch", Washington University, St. Louis.
Cho et al., "Deep Packet Filter with Dedicated Logic and Read Only Memories", 12th Annual IEEE Symposium on Field-Programmable Custom Computing Machines, Apr. 2004.
Cho, "A Fast Regular Expression Indexing Engine", Proc. of 18th Int'l Conv. on Data Engineering, 2001, pp. 1-12.
Choi et al., "Design of a Flexible Open Platform for High Performance Active Networks", Allerton Conference, 1999, Champaign, IL.
Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.
Cloutier et al, "VIP: An FPGA-Based Processor for Image Processing and Neural Networks", Proceedings of Fifth International Conference on Microelectronics for Neural Networks, Feb. 12, 1996, pp. 330-336, Los Alamitos, California.
Compton et al., "Configurable Computing: A Survey of Systems and Software", Technical Report, Northwestern University, Dept. of ECE, 1999.
Compton et al., "Reconfigurable Computing: A Survey of Systems and Software", Technical Report, Northwestern University, Dept. of ECE, 1999, presented by Yi-Gang Tai.
Cong et al., "An Optional Technology Mapping Algorithm for Delay Optimization in Lookup-Table Based FPGA Designs", IEEE, 1992, pp. 48-53.
Crosman, "Who Will Cure Your Data Latency?", Storage & Servers, Jun. 20, 2007, URL: http://www.networkcomputing.com/article/printFullArticleSrc.jhtml?article ID=199905630.
Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.
Denoyer et al., "HMM-based Passage Models for Document Classification and Ranking", Proceedings of ECIR-01, 23rd European Colloquim Information Retrieval Research, Darmstatd, DE, pp. 126-135, 2001.
Department of Computer Science & Engineering; "Technical Reports"; Publication (http://cse.seas.wustl.edu/Research/Publications.asp); Dec. 17, 2007; pp. 1-26; Washington University in St. Louis.
Dharmapurikar et al., "Deep Packet Inspection Using Parallel Bloom Filters," IEEE Micro, Jan.-Feb., 2004, Volume: 24, Issue: 1, pp. 52-61.
Dharmapurikar et al., "Deep Packet Inspection Using Parallel Bloom Filters," Symposium on High Performance Interconnects (HotI), Stanford, California, 2003, pp. 44-51.
Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.
Dharmapurikar et al., "Longest Prefix Matching Using Bloom Filters," SIGCOMM, 2003, pp. 201-212.
Dharmapurikar et al., "Robust TCP Stream Reassembly in the Presence of Adversaries", Proc. of the 14th conference on USENIX Security Symposium—vol. 14, 16 pages, Baltimore, MD, 2005; http://www.icir.org/vern/papers/TcpReassembly/TCPReassembly.pdf.
Lockwood, "Hardware Laboratory Configuration", Field Programmable Port Extender: Jan. 2002 Gigabit Workshop Tutorial, Washington University, St. Louis, MO, Jan. 3-4, 2002.
Lockwood, "Introduction", Field Programmable Port Extender: Jan. 2002 Gigabit Workshop Tutorial, Washington University, St. Louis, MO, Jan. 3-4, 2002.
Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.
Lockwood, "Protocol Processing on the FPX", Field Programmable Port Extender: Jan. 2002 Gigabit Workshop Tutorial, Washington University, St Louis, MO, Jan. 3-4, 2002.
Lockwood, "Simulation and Synthesis", Field Programmable Port Extender: Jan. 2002 Gigabit Workshop Tutorial, Washington University, St Louis, MO, Jan. 3-4, 2002.
Lockwood, "Simulation of the Hello World Application for the Field-Programmable Port Extender (FPX)", Washington University, Applied Research Lab, Spring 2001 Gigabits Kits Workshop.
Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.
Madhusudan, "Design of a System for Real-Time Worm Detection", Power Point Presentation in Support of Master's Thesis, Washington Univ., Dept. of Computer Science and Engineering, St. Louis, MO, Aug. 2004.
Mao et al., "Cluster-based Online Monitoring System of Web Traffic", Dept. of Computer Science and Technology, Tsinghua Univ., Bejing, 100084 P.R. China.
Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.
Moscola et al, "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.
Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.
Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.
Navarro, "A Guided Tour to Approximate String Matching", ACM Computing Surveys, vol. 33, No. 1, Mar. 2001, pp. 31-88.
Necker et al., "TCP-Stream Reassembly and State Tracking in Hardware", School of Electrical and Computer Engineering, Georgia Institute of Technology, Atlanta, GA.
Niewczas et al., "A Pattern Matching Algorithm for Verification and Analysis of Very Large IC Layouts", ACM, Apr. 1998, pp. 129-134.
Nunez et al., "The X-MatchLITE FPGA-Based Data Compressor", Euromicro Conference 1999, Proceedings, Italy, Sep. 8-10, 1999, pp. 126-132, Los Alamitos, CA.
Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.
Partial International Search Report for PCT/US03/15638 dated Feb. 3, 2004.

(56) References Cited

OTHER PUBLICATIONS

Prakash et al., "OC-3072 Packet Classification Using BDDs and Pipelined SRAMs", Department of Electrical and Computer Engineering, The University of Texas at Austin.
Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.
Prosecution History for U.S. Appl. No. 14/060,313, filed Oct. 22, 2013 (Henrichs et al.).
Prosecution History for U.S. Appl. No. 14/060,339, filed Oct. 22, 2013 (Henrichs et al.).
Prosecution History for U.S. Appl. No. 14/694,595, filed Apr. 23, 2015 (Lancaster et al.).
Prosecution History for U.S. Appl. No. 14/694,622, filed Apr. 23, 2015 (Tidwell et al.).
Ramakrishna et al., "A Performance Study of Hashing Functions for Hardware Applications", Int. Conf. on Computing and Information, May 1994, pp. 1621-1636, vol. 1, No. 1.
Ramakrishna et al., "Efficient Hardware Hashing Functions for High Performance Computers", IEEE Transactions on Computers, Dec. 1997, vol. 46, No. 12.
Ramesh et al., "Automatic Selection of Tuning Parameters for Feature Extraction Sequences", IEEE, Jun. 21-23, 1994, pp. 672-677.
Ratha et al., "Convolution on Splash 2", Proceedings of IEEE Symposium on FPGAS for Custom Computing Machines, Apr. 19, 1995, pp. 204-213, Los Alamitos, California.
Ratha et al., "FPGA-based coprocessor for text string extraction", IEEE, Sep. 11-13, 2000, pp. 217-221.
Roberts, "Internet Still Growing Dramatically Says Internet Founder", Press Release, Caspian Networks, Inc.—Virtual Pressroom.
Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.
Roy, "A bounded search algorithm for segmented channel routing for FPGS's and associated channel architecture issues", IEEE, Nov. 11, 1993, pp. 1695-1705, vol. 12.
Sachin Tandon, "A Programmable Architecture for Real-Time Derivative Trading", Master's Thesis, University of Edinburgh, 2003.
Schmerken, "With Hyperfeed Litigation Pending, Exegy Launches Low-Latency Ticker Plant", in Wall Street & Technology Blog, Mar. 20, 2007, pp. 1-2.
Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.
Schuehler et al., "Architecture for a Hardware Based, TCP/IP Content Scanning System", IEEE Micro, 24(1):62-69, Jan.-Feb. 2004, USA.
Schuehler et al., "TCP-Splitter: A TCP/IP Flow Monitor in Reconfigurable Hardware", Hot Interconnects 10 (HotI-10), Stanford, CA, Aug. 21-23, 2002, pp. 127-131.
Search Results from IEEE Xplore for "Deterministic Finite Automaton current states", dated Dec. 28, 2010, 2 pages, citing COLE, "Real-Time Computation by n-Dimensional Iterative Arrays of Finite-State Machines", 1966; KASHYAP, "Syntactic Decision Rules for Recognition of Spoken Words and Phrases Using a Stochastic Automaton", 1979; Rouvellou et al., "Inference of a Probabilistic Finite State Machine from its Output", 1995; and Yi et al., "A Method of Instance Learning based on Finite-State Automaton and its Application on TCM Medical Cases", 2010, et. al.
Seki et al., "High Speed Computation of Shogi With FPGA", Proceedings of 58th Convention Architecture, Software Science, Engineering, Mar. 9, 1999, pp. 1-133-1-134.
Shah, "Understanding Network Processors", Version 1.0, University of California-Berkeley, Sep. 4, 2001.
Shalunov et al., "Bulk TCP Use and Performance on Internet 2", ACM SIGCOMM Internet Measurement Workshop, 2001.
Shirazi et al, "Quantitative Analysis of FPGA-based Database Searching", Journal of VLSI Signal Processing Systems for Signal, Image, and Video Technology, May 2001, pp. 85-96, vol. 28, No. 1/2, Kluwer Academic Publishers, Dordrecht, NL.
Sidhu et al., "Fast Regular Expression Matching Using FPGAs", IEEE Symposium on Field Programmable Custom computing Machines (FCCM 2001), Apr. 2001.
Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.
Singh et al., "The EarlyBird System for Real-Time Detection on Unknown Worms", Technical report CS2003-0761, Aug. 2003.
Sourdis and Pnevmatikatos, "Fast, Large-Scale String Match for a 10Gbps FPGA-based Network Intrusion Detection System", 13th International Conference on Field Programmable Logic and Applications, 2003.
Steinbach et al., "A Comparison of Document Clustering Techniques", KDD Workshop on Text Mining, 2000.
Tan et al., "A High Throughput String Matching Architecture for Intrusion Detection and Prevention", ISCA 2005: 32nd Annual International Symposium on Computer Architecture, pp. 112-122, 2005.
Tang et al., "A Novel Data Format Conversion Method Based on FPGA", Cross Strait Quad-Regional Radio Science and Wireless Technology Conference, Jul. 26, 2011, pp. 1204-1207.
Dharmapurikar, "Fast and Scalable Pattern Matching for Content Filtering", ACM, ANCS 05, 2005, pp. 183-192.
Ebeling et al., "RaPiD—Reconfigurable Pipelined Datapath", University of Washington, Dept. of Computer Science and Engineering, Sep. 23, 1996, Seattle, WA.
Exegy Inc., "Exegy and HyperFeed to Unveil Exelerate TP at SIA Conference", Release Date: Jun. 20, 2006, downloaded from http://news.thomasnet.com/companystory/488004 on Jun. 19, 2007, 4 pages.
Exegy Inc., "First Exegy Ticker Plant Deployed", Release Date: Oct. 17, 2006, downloaded from http://news.thomasnet.com/companystory/496530 on Jun. 19, 2007, 5 pages.
Extended European Search Report for EP Application 13849798.7 dated Jul. 14, 2016.
Feldman, "High Frequency Traders Get Boost From FPGA Acceleration", Jun. 8, 2007, downloaded from http://www.hpcwire.com/hpc.1600113.html on Jun. 19, 2007, 4 pages.
Feldmann, "BLT: Bi-Layer Tracing of HTTP and TCP/IP", AT&T Labs-Research, Florham Park, NJ, USA.
Fernandez, "Template Matching of Binary Targets in Grey-Scale Images: A Nonparametric Approach", Pattern Recognition, 1997, pp. 1175-1182, vol. 30, No. 7.
Forgy, "RETE: A Fast Algorithm for the Many Pattern/Many Object Pattern Matching Problem", Artificial Intelligence, 1982, pp. 17-37, vol. 19.
Franklin et al., "An Architecture for Fast Processing of Large Unstructured Data Sets." Proc. of 22nd Int'l Conf. on Computer Design, Oct. 2004, pp. 280-287.
Franklin et al., "Assisting Network Intrusion Detection with Reconfigurable Hardware", Symposium on Field-Programmable Custom Computing Machines (FCCM 2002), Apr. 2002, Napa, California.
Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.
Gavrila et al., "Multi-feature Hierarchical Template Matching Using Distance Transforms", IEEE, Aug. 16-20, 1998, vol. 1, pp. 439-444.
Google Search Results Page for "field programmable gate array financial calculation stock market" over dates of Jan. 1, 1990-May 21, 2002, 1 page.
Guerdoux-Jamet et al., "Systolic Filter for Fast DNA Similarity Search", IEEE, 1995, pp. 145-156.
Gunther et al., "Assessing Document Relevance with Run-Time Reconfigurable Machines", FPGAs for Custom Computing Machines, 1996, Proceedings, IEEE Symposium on, pp. 10-17, Napa Valley, CA, Apr. 17, 1996.

(56) References Cited

OTHER PUBLICATIONS

Gupta et al., "High-Speed Implementations of Rule-Based Systems," ACM Transactions on Computer Systems, May 1989, pp. 119-146, vol. 7, Issue 2.

Gupta et al., "Packet Classification on Multiple Fields", Computer Systems Laboratory, Stanford University, Stanford, CA.

Gupta et al., "PMM: A Parallel Architecture for Production Systems," Proceedings of the IEEE, Apr. 1992, pp. 693-696, vol. 2.

Gurtov, "Effect of Delays on TCP Performance", Cellular Systems Development, Sonera Corporation, online at http://cs.helsinki.fi/u/gurtov/papers/pwc01.pdf.

Gyang, "NCBI BLASTN Stage 1 in Reconfigurable Hardware," Technical Report WUCSE-2005-30, Aug. 2004, Department of Computer Science and Engineering, Washington University, St. Louis, MO.

Halaas et al., "A Recursive MISD Architecture for Pattern Matching", IEEE Transactions on Very Large Scale Integration, vol. 12, No. 7, pp. 727-734, Jul. 2004.

Harris, "Pete's Blog: Can FPGAs Overcome the FUD?", Low-Latency.com, May 14, 2007, URL: http://www.a-teamgroup.com/article/pete-blog-can-fpgas-overcome-the-fud/.

Hauck et al., "Software Technologies for Reconfigurable Systems", Northwestern University, Dept. of ECE, Technical Report, 1996.

Hayes, "Computer Architecture and Organization", Second Edition, 1988, pp. 448-459, McGraw-Hill, Inc.

Herbordt et al, "Single Pass, BLAST-Like, Approximate String Matching on FPGAs", 14th Annual IEEE Symposium on Field-Programmable Custom Computing Machines (FCCM'06), Apr. 2006, pp. 1-10, IEEE.

Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.

Hirsch, "Tech Predictions for 2008", Reconfigurable Computing, Jan. 16, 2008, URL: http://fpgacomputing.blogspot.com/2008_01_01_archive.html.

Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.

Hutchings et al., "Assisting Network Intrusion Detection with Reconfigurable Hardware", FCCM 2002: 10th Annual IEEE Symposium on Field-Programmable Custom Computing Machines, 2002.

International Preliminary Report on Patentability (Chapter I) for PCT/US2015/027348 dated Nov. 3, 2016.

International Search Report and Written Opinion for PCT/US2013/066224 dated Jan. 16, 2014.

Jacobson et al., "RFC 1072: TCP Extensions for Long-Delay Paths", Oct. 1988.

Jacobson et al., "tcpdump—dump traffic on a network", Jun. 30, 1997, online at www.cse.cuhk.edu.hk/~cslui/CEG4430/tcpdump.ps.gz.

Johnson et al., "Pattern Matching in Reconfigurable Logic for Packet Classification", College of Computing, Georgia Institute of Technology, Atlanta, GA.

Jones et al., "A Probabilistic Model of Information Retrieval: Development and Status", Information Processing and Management, Aug. 1998, 76 pages.

Keutzer et al., "A Survey of Programmable Platforms—Network Proc", University of California-Berkeley, pp. 1-29.

Koloniari et al., "Content-Based Routing of Path Queries in Peer-to-Peer Systems", pp. 1-19, E. Bertino et al. (Eds.): EDBT 2004, LNCS 2992, pp. 29-47, 2004, copyright by Springer-Verlag, Germany.

Krishnamurthy et al., "Biosequence Similarity Search on the Mercury System", Proceedings of the 15th IEEE International Conference on Application-Specific Systems, Architectures, and Processors (ASAP04), Sep. 2004, pp. 365-375.

Kulig et al., "System and Method for Controlling Transmission of Data Packets Over an Information Network", pending U.S. Patent Application.

Lancaster et al., "Acceleration of Ungapped Extension in Mercury BLAST", Seventh (7th) Workshop on Media and Streaming Processors, Nov. 12, 2005, Thirty-Eighth (38th) International Symposium on Microarchitecture (MICRO-38), Barcelona, Spain.

Li et al., "Large-Scale IP Traceback in High-Speed Internet: Practical Techniques and Theoretical Foundation", Proceedings of the 2004 IEEE Symposium on Security and Privacy, 2004, pp. 1-15.

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.

Lockwood et al., "Hello, World: A Simple Application for the Field Programmable Port Extender (FPX)", Washington University, Department of Computer Science, Technical Report WUCS-00-12, Jul. 11, 2000.

Lockwood et al., "Parallel FPGA Programming over Backplane Chassis", Washington University, Department of Computer Science, Technical Report WUCS-00-11, Jun. 12, 2000.

Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.

Lockwood, "An Open Platform for Development of Network Processing Modules in Reprogrammable Hardware", IEC DesignCon 2001, Santa Clara, CA, Jan. 2001, Paper WB-19.

Lockwood, "Building Networks with Reprogrammable Hardware", Field Programmable Port Extender: Jan. 2002 Gigabit Workshop Tutorial, Washington University, St. Louis, MO, Jan. 3-4, 2002.

Lockwood, "Evolvable Internet Hardware Platforms", NASA/DoD Workshop on Evolvable Hardware (EHW'01), Long Beach, CA, Jul. 12-14, 2001, pp. 271-279.

Tau et al., "Transit Note #114: A First Generation DPGA Implementation", Jan. 1995, 9 pages.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Taylor et al., "Generalized RAD Module Interface Specification of the Field Programmable Port Extender (FPX) Version 2", Washington University, Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St. Louis, MO, Jan. 3-4, 2002.

Taylor et al., "Scalable Packet Classification using Distributed Crossproducting of Field Labels", Proceedings of IEEE Infocom, Mar. 2005, pp. 1-12, vol. 20, No. 1.

Taylor, "Models, Algorithms, and Architectures for Scalable Packet Classification", doctoral thesis, Department of Computer Science and Engineering, Washington University, St. Louis, MO, Aug. 2004, pp. 1-201.

Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.

Uluski et al., "Characterizing Antivirus Workload Execution", SIGARCH Comput. Archit. News, vol. 33, No. 1, pp. 90-98, Mar. 2005.

Villasenor et al., "Configurable Computing Solutions for Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.

Waldvogel et al., "Scalable High-Speed Prefix Matching", ACM Transactions on Computer Systems, Nov. 2001, pp. 440-482, vol. 19, No. 4.

(56) References Cited

OTHER PUBLICATIONS

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.
Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.
Web-Pop (Professional Options Package) (www.pmpublishing.com).
West et al., "An FPGA-Based Search Engine for Unstructured Database", Proc. of 2nd Workshop on Application Specific Processors, Dec. 2003, San Diego, CA.
Wooster et al., "HTTPDUMP Network HTTP Packet Snooper", Apr. 25, 1996.
Yamaguchi et al., "An Approach for Homology Search with Reconfigurable Hardware", Google, 2001, pp. 374-375.
Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.
Yan et al., "Enhancing Collaborative Spam Detection with Bloom Filters", 2006, IEEE, pp. 414-425.
Yoshitani et al., "Performance Evaluation of Parallel Volume Rendering Machine Re Volver/C40", Study Report of Information Processing Society, Mar. 5, 1999, pp. 79-84, vol. 99, No. 21.
Office Action for U.S. Appl. No. 14/694,595 dated Nov. 30, 2017.
Search Results from IEEE Xplore for "Deterministic Finite Automaton current states", dated Dec. 28, 2010, 2 pages, citing Cole, "Real-Time Computation by n-Dimensional Iterative Arrays of Finite-State Machines", 1966; Kashyap, "Syntactic Decision Rules for Recognition of Spoken Words and Phrases Using a Stochastic Automaton", 1979; Rouvellou, "Inference of a Probabilistic Finite State Machine from its Output", 1995; and Yi, "A Method of Instance Learning based on Finite-State Automaton and its Application on TCM Medical Cases", 2010.

\* cited by examiner

```
struct RecordEntry{
    xuint16 record_size;
    xuint16 num_fields;
    xuint16 *offset_array;
    char *data_pointer;
};

// Method to read out a given field
char * GetField(RecordEntry *record, int field_id)
{
    char *myfield;  // location to store field
    int start_offset = offset_array[field_id];
    int end_offset = record_size;  // Assume end of record
    if (num_fields > field_id)  // ...unless there's another field after ours
    {
        end_offset = num_fields[field_id+1];
    }
    int field_len = end_offset - start_offset;
    myfield = new char[field_len];
    memcpy(myfield, &data_pointer[offset_array[field_id]], field_len);
    return myfield;
}
```

Figure 25

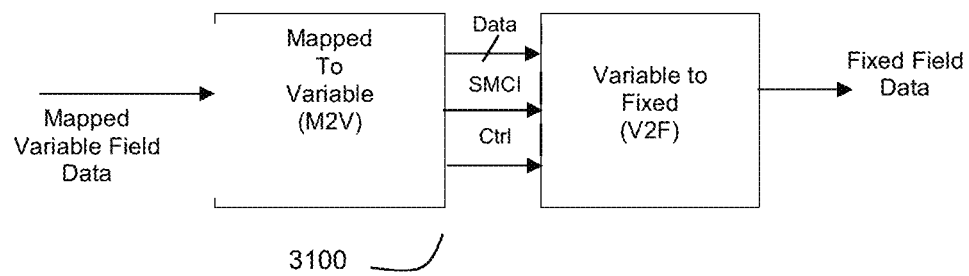
Figure 31
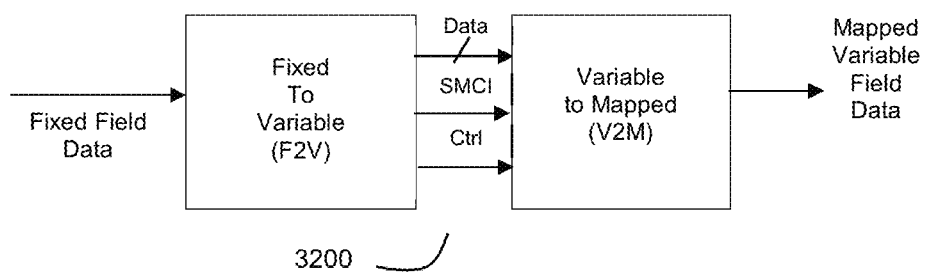
Figure 32
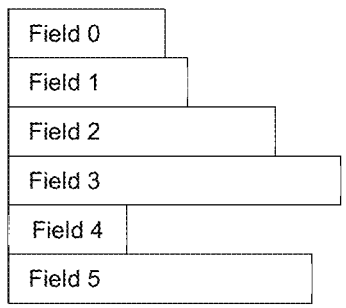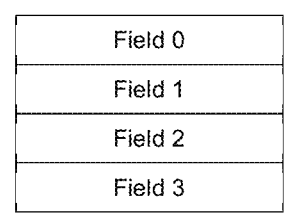
Figure 33(a)          Figure 33(b)

```
//Define set of valid fields and lengths for record layout 1
Layout layout1(type="fixed-field") {
    field field1(offset=1, length=1, data_type=ASCII_TEXT);
    field field2(offset=2, length=20, data_type=ASCII_TEXT);
    field field3(offset=22, length=6); //data_type is optional
}
Layout layout2(type="fixed-field") {
    field field1(offset=1, length=8, data_type=ASCII_TEXT);
    field field2(offset=9, length=8,
data_type=BIG_ENDIAN_UINT64);
    field field3(offset=17, length=4);
}
Detection_Rules layout1 {
    (layout1.field1 == "Y" && layout1.field3 != "ABCDEF") ||
(layout1.field1 == "N");
}
Detection_Rules layout2 {
    (layout2.field1 == "ABCDEFGH" || layout2.field2 >= 8192 ||
layout2.field3 IsNumeric);
}
```

Figure 34(a)

```
//Define set of valid fields and lengths for record layout 1
Layout layout1(type="delimited") { // "mapped" for mapped input
    field field1(data_type=ASCII_TEXT);
    field field2(data_type=ASCII_TEXT);
    field field3();
}
Layout layout2(type="delimited") {
    field field1(data_type=ASCII_TEXT);
    field field2(data_type=BIG_ENDIAN_UINT64);
}
Detection_Rules layout1 {
    (layout1.field1 == "Y" && layout1.field3 != "ABCDEF") ||
(layout1.field1 == "N");
}
Detection_Rules layout2 {
    (layout2.field1 == "ABCDEFGH" || layout2.field2 >= 8192);
}
```

Figure 34(b)

METHOD AND APPARATUS FOR ACCELERATED DATA TRANSLATION USING RECORD LAYOUT DETECTION

CROSS-REFERENCE AND PRIORITY CLAIM TO RELATED PATENT APPLICATIONS

This patent application claims priority to U.S. provisional patent application Ser. No. 61/983,414, filed Apr. 23, 2014, the entire disclosure of which is incorporated herein by reference.

This patent application is related to (1) U.S. patent application Ser. No. 14/694,595, entitled "Method and Apparatus for Accelerated Record Layout Detection", filed this same day, (2) U.S. patent application Ser. No. 14/694,622, entitled "Method and Apparatus for Record Pivoting to Accelerate Processing of Data Fields", filed this same day and now U.S. Pat. No. 9,633,097, and (3) PCT patent application serial no. PCT/US15/27348, entitled "Method and Apparatus for Accelerated Data Translation", filed this same day, all of which claim priority to U.S. provisional patent application Ser. No. 61/983,414, filed Apr. 23, 2014, the entire disclosures of each of which are incorporated herein by reference.

This patent application is also related to (1) U.S. provisional patent application Ser. No. 61/793,285, filed Mar. 15, 2013, (2) U.S. provisional patent application Ser. No. 61/717,496, filed Oct. 23, 2012, (3) U.S. nonprovisional patent application Ser. No. 14/060,313, filed Oct. 22, 2013 and published as U.S. Pat. App. Pub. 2014/0114908, and (4) U.S. nonprovisional patent application Ser. No. 14/060,339, filed Oct. 22, 2013 and published as U.S. Pat. App. Pub. 2014/0114929, the entire disclosures of which are incorporated herein by reference.

INTRODUCTION

Data can be streamed through computer systems in any of a number of formats. For example, as described in the cross-referenced patent applications, a delimited data format is a common format used for passing data between data processing systems or over networks, particularly with respect to passing record-oriented data. Delimited data formats are platform-independent, and they use a very simple set of tags to represent data. With a delimited data format, data characters are organized into a plurality of fields. A field delimiter (FDL) character is used to separate data fields, a record delimiter (RDL) character is used to separate records, and a shield character is used to shield data characters within data fields that also happen to serve as the field delimiter character or the record delimiter character.

The comma separated value (CSV) format is a common delimited data format. With the CSV format, a comma is typically used as the FDL character, a newline is typically used as the RDL character, and a quotation mark is typically used as the shield character. However, other characters can be employed. For example, a pipe or tab character as the FDL character, an apostrophe character as the shield character, etc. FIG. 1 shows an exemplary portion of a record in a delimited data format.

In the example of FIG. 1, the record is a patient medical record 100 comprising a plurality of different fields (e.g., name, address, etc.). The data from this record 100 can be represented in the CSV format via data 102 in FIG. 1. Each field 104$i$ of the record can be separated by the FDL character 106. However, it may be the case that the character used as the FDL character 106 also exists within the data as a data character. In the example of FIG. 1, this is shown by the commas 110 that are present in the data for Fields 1 and 3 ($104_1$ and $104_3$). In such situations, to prevent a misinterpretation of these commas as field delimiters, the CSV format operates to use a shield character 108 at the start and end of the field that contains the data character 110 which matches the FDL character 106. In the example of FIG. 1, quote marks serve as the shield character 108. Thus, the data St. Louis, Mo. becomes "St. Louis, Mo.". The use of shield characters raises another possible misinterpretation with respect to data characters 112 in a field that happen to match the shield character 108 (see the quotation marks used for the data string ("Jim") in Field 1 ($104_0$). To prevent a misinterpretation of these quotation marks as shield characters, the CSV format also operates to use a shield character 108 adjacent the data character that happens to match the shield character. Thus, the data string ("Jim") appears as (""Jim""") in the CSV format.

Delimited data formats present significant challenges in connection with processing the delimited data using software. The inherently serial process of moving byte by byte through a file to look for delimiters and shield characters does not map well to general purpose processors. For example, suppose it is desired to validate whether the zip code field of the file shown in FIG. 1 contains a valid zip code. A software-based system would need to process each byte of the file in order through Field 4 ($104_4$) to determine that Field 4 has been located. Only then can the processing software validate the zip code data. This byte-by-byte processing requirement creates a bottleneck that detracts from the throughput of a processing system.

As solution to this problem, the cross-referenced patent applications disclose various techniques for performing high speed format translations of incoming data, where the incoming data is arranged in a delimited data format.

In accordance with an exemplary aspect disclosed by the cross-referenced patent applications, the data in the delimited data format can be translated into outgoing data having a structured format, the structured format being configured to permit a downstream processing component to jump directly to a field of interest in the outgoing data without requiring that component to analyze all of the bytes leading up to the field of interest.

An example of a structured format that can be used toward this end is a fixed field format. With a fixed field format, each field of the outgoing data has a fixed length and is populated with data characters that belong to the same field of the incoming data. If there are not enough data characters for that incoming field to fill the fixed length of the outgoing field, then padding characters can be added to the outgoing field. By employing fields of a fixed length, any downstream processing can quickly and easily target specific fields of the outgoing data for further processing by simply jumping to the location of the targeted field. Because the fixed field layout is well-defined, a downstream processing component will be able to know the byte offset for the field of interest, which means that only simple pointer arithmetic would be needed for the processing component to jump to the field of interest.

Another example of a structured format that can be used is a mapped variable field format, where the fields of a record can be of variable length. With a mapped variable field format, each field of the outgoing data can have a variable length based on the amount of data to be populated into the field. Header information can then be used to identify where the field and record boundaries are located (such as through the use of record length and field offset identifiers) to permit a downstream processing component to jump directly to a field of interest in the outgoing data without requiring that component to analyze all of the bytes leading up to the field of interest.

In an exemplary embodiment by the cross-referenced patent applications, a reconfigurable logic device can be employed to perform this data translation. As used herein, the term "reconfigurable logic" refers to any logic technology whose form and function can be significantly altered (i.e., reconfigured) in the field post-manufacture. This is to be contrasted with a general purpose processor (GPP), whose function can change post-manufacture, but whose form is fixed at manufacture. An example of a reconfigurable logic device is a programmable logic device (PLD), such as a field programmable gate array (FPGA). As used herein, the term "general-purpose processor" (or "GPP") refers to a hardware device having a fixed form and whose functionality is variable, wherein this variable functionality is defined by fetching instructions and executing those instructions, of which a conventional central processing unit (CPU) is a common example. Exemplary embodiments of GPPs include an Intel Xeon processor and an AMD Opteron processor. Furthermore, as used herein, the term "software" refers to data processing functionality that is deployed on a GPP or other processing devices, wherein software cannot be used to change or define the form of the device on which it is loaded. By contrast, the term "firmware", as used herein, refers to data processing functionality that is deployed on reconfigurable logic or other processing devices, wherein firmware may be used to change or define the form of the device on which it is loaded.

Furthermore, the data translation task can be broken down into a plurality of subtasks, where each subtask can be performed by a plurality of data processing modules arranged to operate in a pipelined fashion with respect to each other. Thus, while a downstream module in the pipeline is performing a subtask on data that was previously processed by an upstream module in the pipeline, the upstream module in the pipeline can be simultaneously performing its subtask on more recently received data. An exemplary data translation pipeline described by the cross-referenced patent applications can comprise (1) a first module configured to convert the incoming data arranged in the delimited data format to an internal format stripped of the field delimiter characters and the record delimiter characters of the incoming data while preserving the data characters of the incoming fields, (2) a second module downstream from the first module, the second module configured to remove the shield characters from the converted data having the internal format, and (3) a third module downstream from the second module, the third module configured to translate the output of the second module to the outgoing data having the fixed field format or the mapped variable field format.

Through such a modular approach, the pipeline is amenable to accelerated data translation via any of a number of platforms. As mentioned above, reconfigurable logic can be used as a platform for deploying the modules as hardware logic operating at hardware processing speeds via firmware deployed on a reconfigurable logic device. Moreover, such a pipeline is also amenable to implementation on graphics processor units (GPUs), application-specific integrated circuits (ASICs), chip multi-processors (CMPs), and other multi-processor architectures.

The cross-referenced patent applications also disclose that the pipeline can be configured to ingest and process multiple characters per clock cycle. This data parallelism can be another source for acceleration relative to conventional solutions.

The inventors further disclose that data translation pipelines can be employed to translate data from any of a number of incoming data formats to any of a number of outgoing data formats, such as incoming fixed field-to-outgoing mapped field, and incoming mapped field-to-outgoing fixed field, among others.

Further still, the inventors disclose that when the streaming data of a given format exhibits a number of different record layouts within that format, record layout detection can be performed to facilitate downstream translation and/or processing tasks. Such record layout detection can be achieved using software and/or hardware, as discussed below.

Further still, the inventors disclose that the streaming data can be pivoted to group fields of interest across different records together to facilitate downstream field-specific data processing. For example, field-specific encryption operations can benefit from such an upstream pivot of the streaming data.

These and other features and advantages of the present invention will be described hereinafter to those having ordinary skill in the art.

BRIEF DESCRIPTION OF THE DRAWINGS

FIG. 25 depicts exemplary code for jumping directly to a desired field in mapped variable field data.

FIGS. 31 and 32 depict example pipelines for translating mapped data to fixed field data and translating fixed field data to mapped data, respectively.

FIGS. 33(a) and (b) depict examples of record layout differences for fixed field data.

FIGS. 34(a) and (b) depict examples of predicate definitions that can be used to define record layouts.

DETAILED DESCRIPTION

Figure 1:
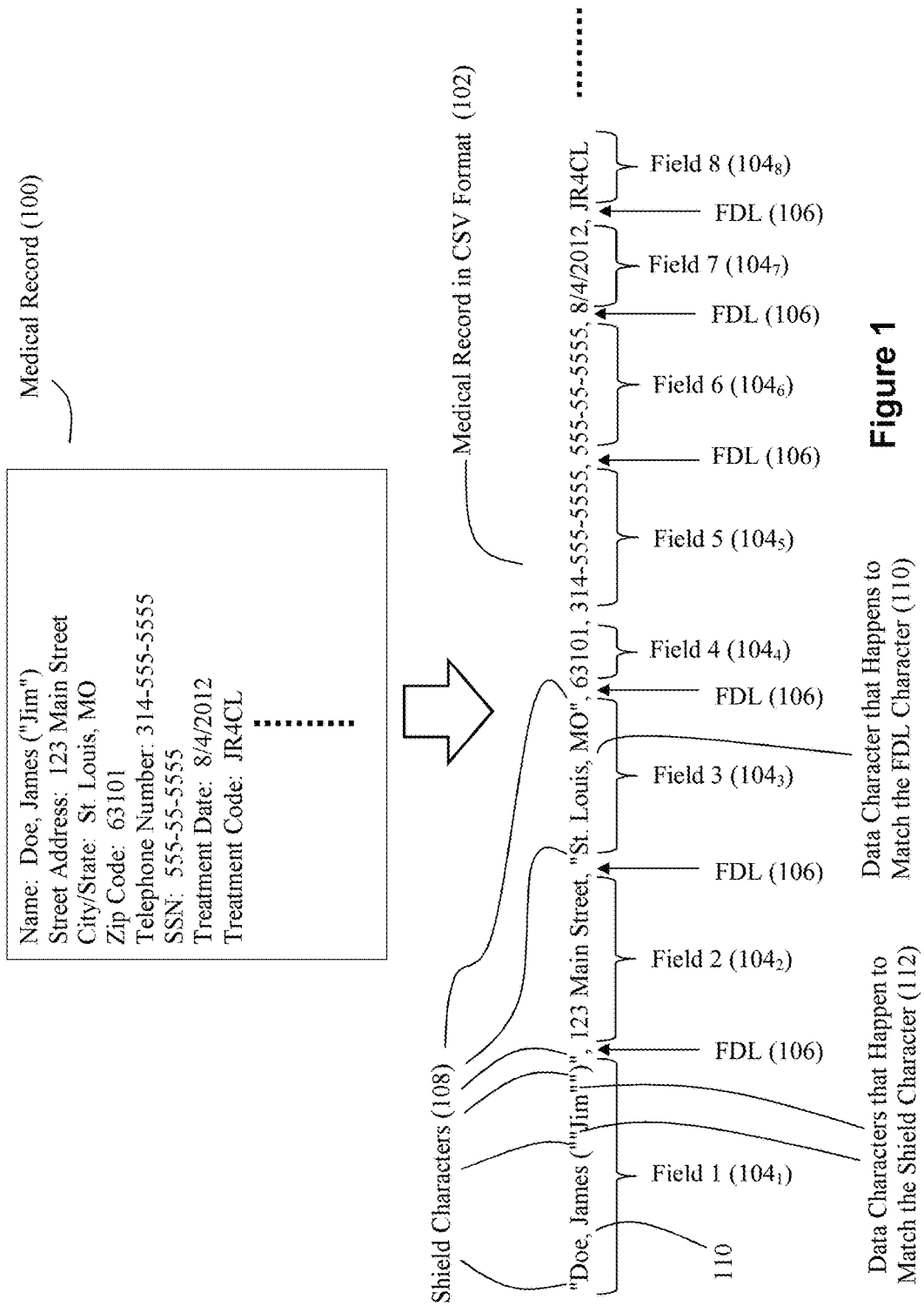
FIG. 1 depicts an example of data organized into a delimited data format.
Figure 2:
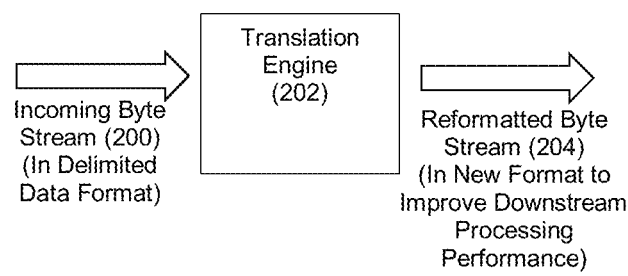
FIG. 2 depicts an exemplary translation engine in accordance with a disclosed embodiment.

FIG. 2 depicts an exemplary translation engine 202 that is configured to translate an incoming byte stream 200 having a delimited data format into a reformatted byte stream 204 having the structured format that is geared toward high performance downstream processing such that a downstream processing component can jump directly to fields without analyzing the data characters of the reformatted byte stream 204. As noted, this structured format can be a format such as a fixed field format or a variable mapped field format. Once again, FIG. 1 shows exemplary data that can serve as byte stream 200. As will be understood, the bytes of the byte stream 200 can serve as data characters, record delimiters characters, field delimiter characters, and shield characters.

Translation engine 202 may be deployed on a processor, which may include multiple processors, including processors of different types. For example, in example embodiments, the translation engine 202 may be deployed in whole or in part on a reconfigurable logic device, a graphics processing unit (GPU), a multi-core processor, and/or a cell processor to provide acceleration.

Figure 3:
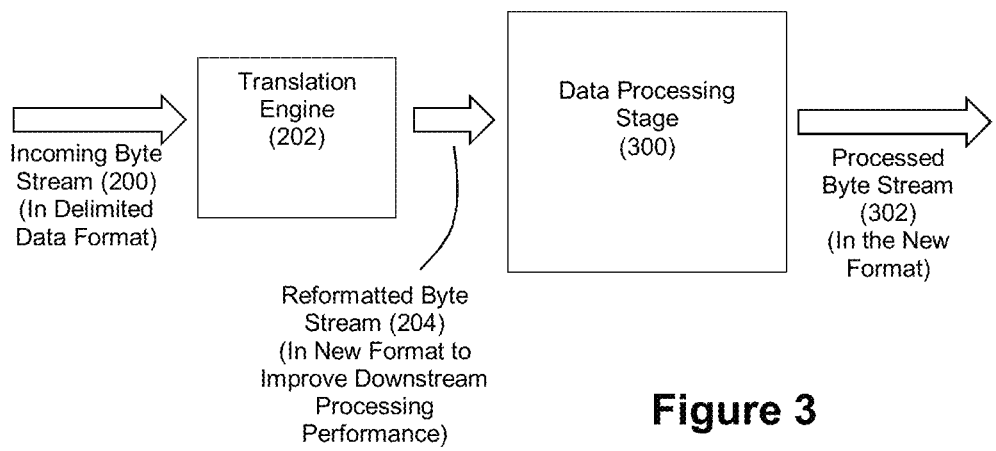
FIG. 3 depicts an exemplary system comprising a translation engine and a data processing stage downstream from the translation engine.

FIG. 3 shows the delivery of the reformatted byte stream 204 to a data processing stage. The data processing stage will be able to select fields of the reformatted byte stream for targeted processing without further analyzing the data characters of the reformatted byte stream 204, thereby greatly improving the throughput performance of the system. The data processing stage then performs data processing operations on the selected fields to generate a processed byte stream 302. This processed byte stream 302 can also exhibit the structured format of the reformatted byte stream 204. The data processing stage 300 can be implemented in software via a GPP, in firmware via reconfigurable logic, or any other platform desired by a practitioner (e.g., a GPU, multi-core processor, cell processor, etc.).

For example, the data processing stage can be configured to perform various processing operations as part of data quality checking in connection with extract, transfer, and load (ETL) operations for a database. Some exemplary processing operations can include:

Address Validation: A field expected to contain an address can have the address data validated as to whether it exhibits a correct postal service-recognized address format.

Email Validation: A field expected to contain an email address can be validated as to whether it exhibits a correct email address format.

Date Validation: A field expected to contain a date can be validated as to whether it exhibits a date in the correct range and format.

Query/Replace: The data characters in a select field can be translated from one set to another set (e.g., mapping codes from one code set to another code set or replacing codes with natural language descriptions of such codes).

Field Masking/Tokenization: The data characters in a selected field can be obfuscated or tokenized for security purposes.

Filtering/Searching: The data characters in selected fields can be matched against various search criteria.

It should be understood that these are but a few of exemplary data processing operations that can be performed by the data processing stage 300.

Furthermore, it should be understood that these data processing operations can be legacy data processing operations that are implemented in software on processors of a practitioner. Also, if desired, a practitioner can deploy such data processing operations via reconfigurable logic to achieve still further acceleration. Examples of hardware-accelerated data processing operations that can be performed by the data processing stage 300 include data processing operations such as regular expression pattern matching, approximate pattern matching, encryption/decryption, compression/decompression, rule processing, data indexing, and others, such as those disclosed by U.S. Pat. Nos. 7,636,703, 7,702,629, 8,095,508 and U.S. Pat. App. Pubs. 2007/0237327, 2008/0114725, 2009/0060197, and 2009/0287628, the entire disclosures of each of which being incorporated herein by reference.

Figure 4:
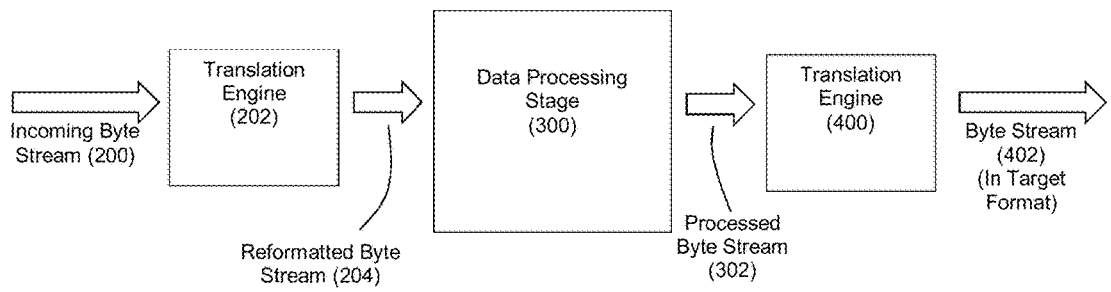
FIG. 4 depicts an exemplary system comprising a translation engine, a data processing stage downstream from the translation engine, and a translation engine downstream from the data processing stage.

FIG. 4 depicts an exemplary embodiment where the processed byte stream 302 is translated by a translation engine 400 into a byte stream 402 having a target format. For example, a practitioner may desire that the system re-translate the byte stream 302 back into a delimited data format. In such an embodiment, the translation engine 400 can perform the complementary inverse of the translation operations performed by translation engine 202 to return the data to the delimited data format. Translation engine 400 can also be hardware-accelerated via reconfigurable logic and modularized via processing modules arranged in a pipeline as explained in connection with the translation engine 202.

Figure 5:
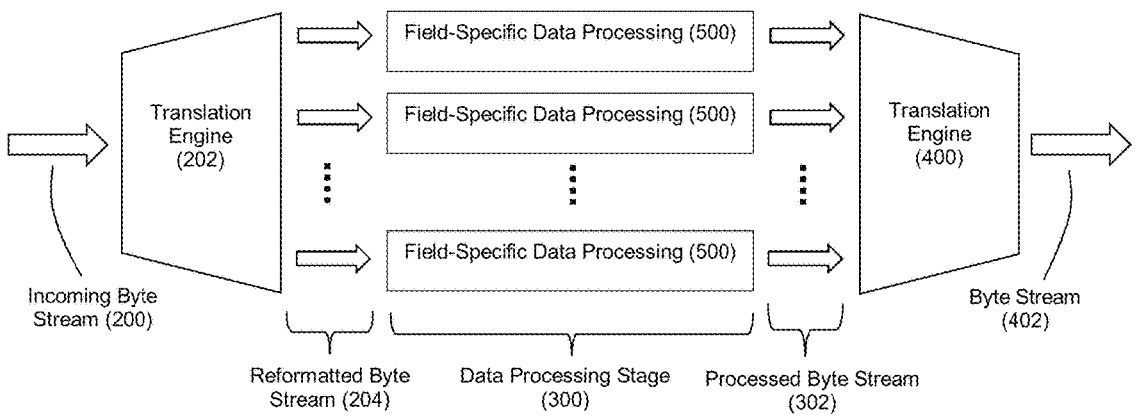
FIG. 5 depicts an exemplary system similar to that of FIG. 4, specifically showing field-specific data processing operations within the data processing stage.

FIG. 5 depicts a similar system that highlights how the output of the translation engine 202 can feed field-specific data processing operations 500 at the data processing stage 300. It should also be understood that for software-based embodiments of the data processing stage 300, record-specific threads can be running in parallel to provide additional acceleration.

Figure 6:
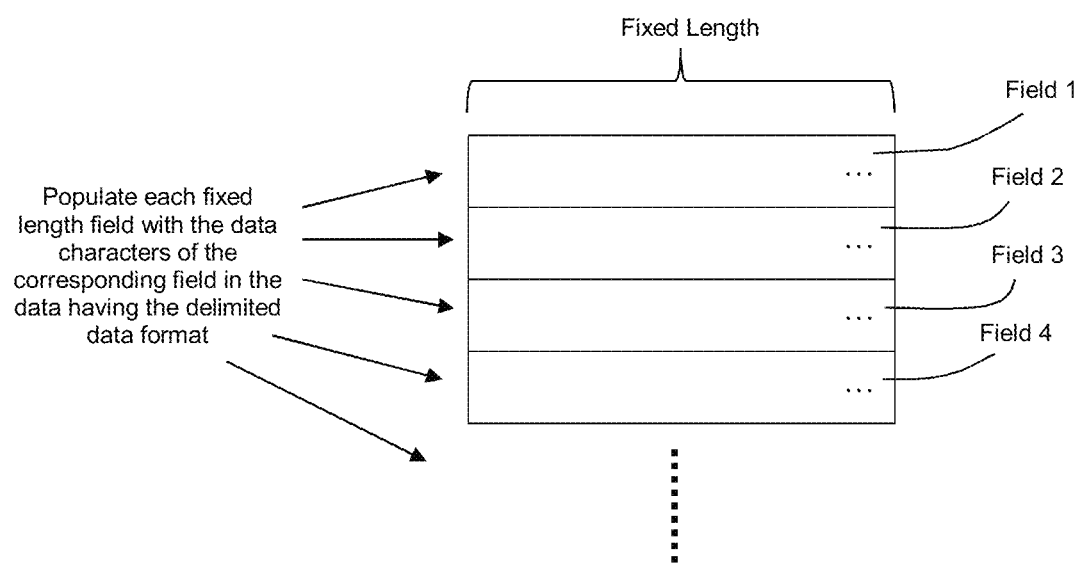
FIG. 6 depicts an exemplary fixed field format.
Figure 7:
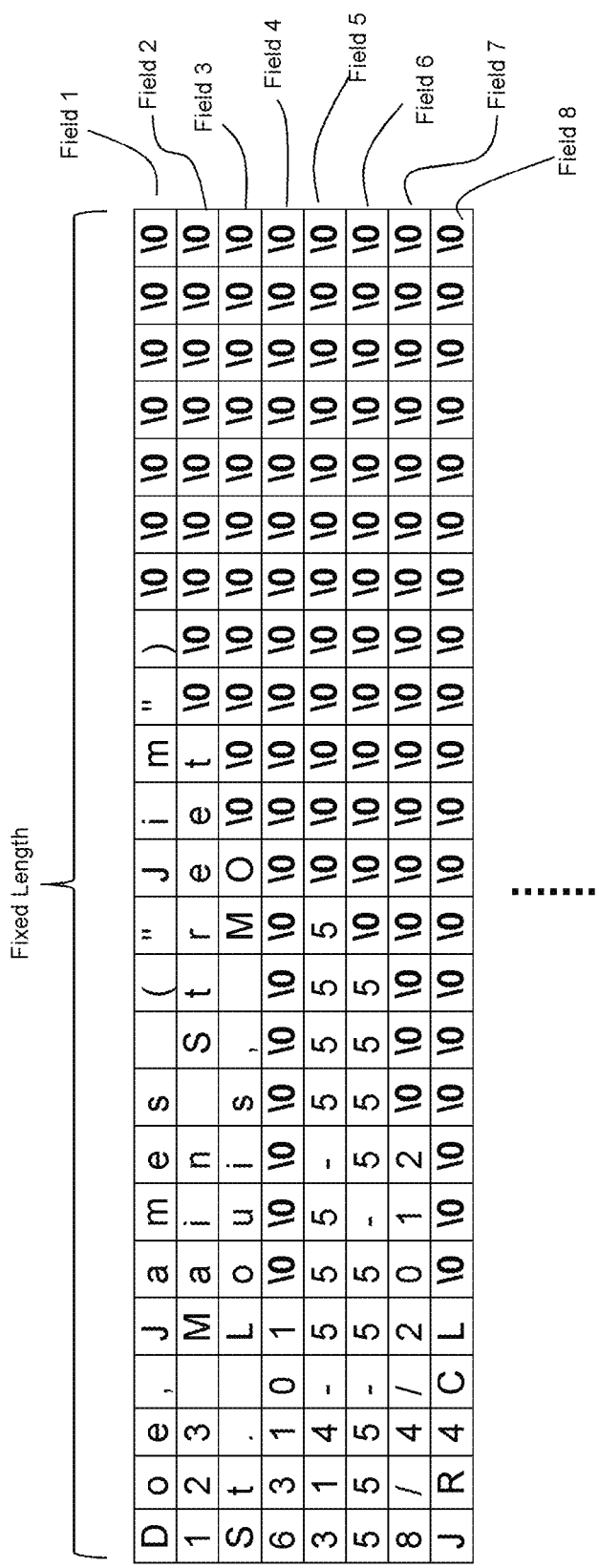
FIG. 7 depicts the data of FIG. 1 organized in a fixed field format.

FIG. 6 depicts an exemplary fixed field format that can be exhibited by byte stream 204. Each field of the data has a fixed length (e.g., 128 bytes, etc.). The translation engine 202 can operate to populate each field of the fixed field output with data characters of the corresponding field in the byte stream having the delimited data format. Should there not be enough data characters in the byte stream to fill the fixed field, padding characters can be added to complete the field. In the event that there is insufficient space in the fixed field for all data characters in a field of the delimited data format byte stream, the translation engine 202 can flag a data overflow condition and take appropriate measures through exception handling logic. FIG. 7 depicts an example where the data of FIG. 1 has been translated into a fixed field format where each field has a fixed length of 24 bytes. It should be well understood that a field length of 24 bytes is exemplary only, and other field lengths can be readily employed. It should also be understood that each field need not have the same fixed length. For example, a practitioner can choose to define a field length of 36 bytes for Field 1, a field length of 64 bytes for Field 2, a field length of 64 bytes for Field 3, a field length of 16 bytes for Field 4, and so on. A practitioner can choose such fixed field lengths for each field based on expected characteristics of the data.

Figure 8A:
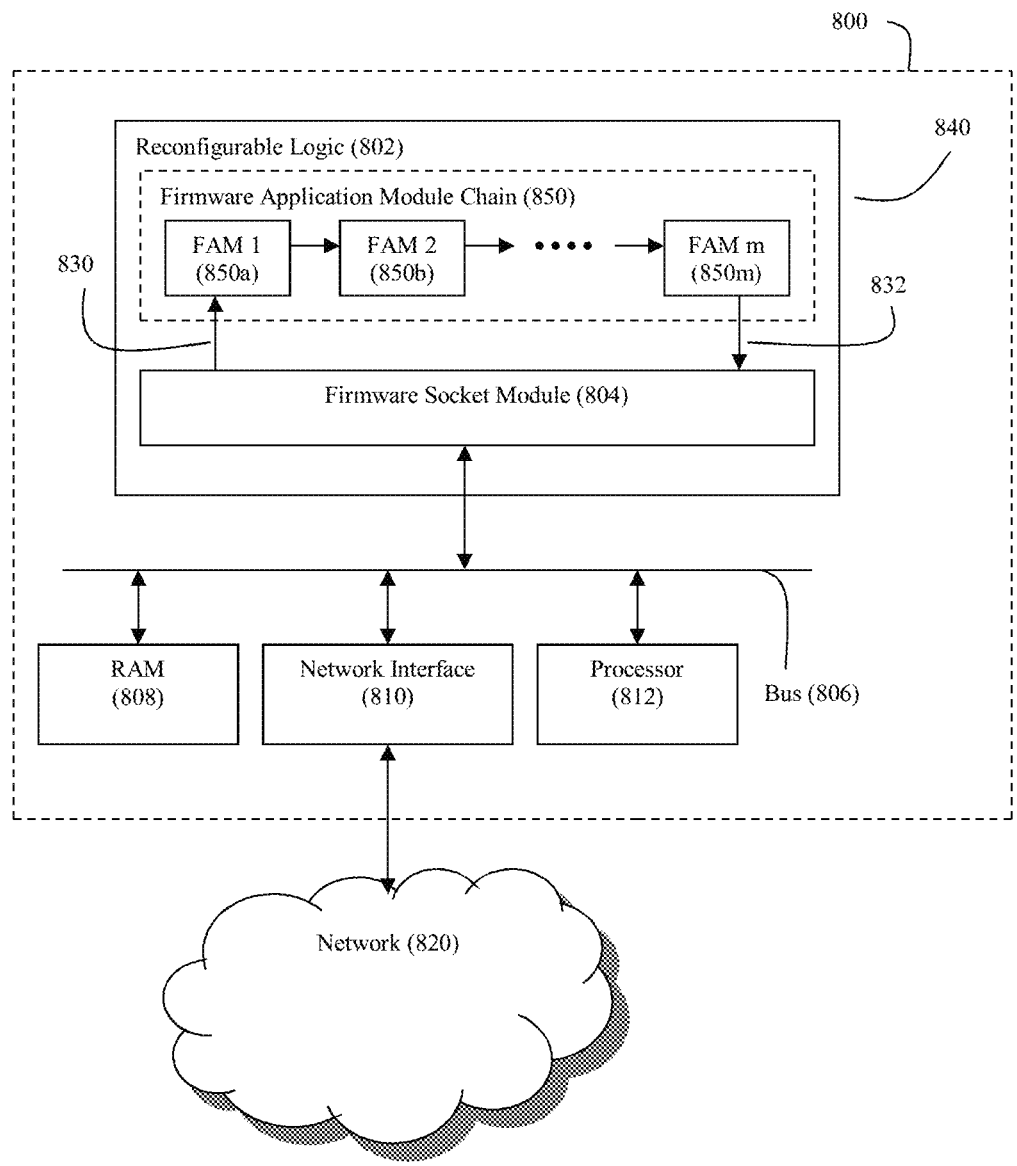
FIGS. 8(a) and (b) depict examples of suitable platforms for the translation engine.

In an embodiment where the translation engine 202 is implemented in reconfigurable logic, examples of suitable platforms for such a translation engine 202 are shown in FIGS. 8(a) and (b). FIG. 8(a) depicts a system 800 employs a hardware-accelerated data processing capability through coprocessor 840 to process the incoming byte stream 200. Within system 800, a coprocessor 840 is positioned to receive byte stream 200 that streams into the system 800 from a network 820 (via network interface 810).

The computer system defined by processor 812 and RAM 808 can be any commodity computer system as would be understood by those having ordinary skill in the art. For example, the computer system may be an Intel Xeon system or an AMD Opteron system. Thus, processor 812, which serves as the central or main processor for system 800, preferably comprises a GPP (although this need not be the case).

In this exemplary embodiment, the coprocessor 840 comprises a reconfigurable logic device 802. Preferably, the byte stream 200 streams into the reconfigurable logic device 802 by way of system bus 806, although other design architectures are possible (see FIG. 9(b)). The reconfigurable logic device 802 can be a field programmable gate array (FPGA), although this need not be the case. System bus 806 can also interconnect the reconfigurable logic device 802 with the processor 812 as well as RAM 808. In an exemplary embodiment, system bus 806 may be a PCI-X bus or a PCI-Express bus, although this need not be the case.

The reconfigurable logic device 802 has firmware modules deployed thereon that define its functionality. The firmware socket module 804 handles the data movement requirements (both command data and target data) into and out of the reconfigurable logic device, thereby providing a consistent application interface to the firmware application module (FAM) chain 850 that is also deployed on the reconfigurable logic device. The FAMs 850i of the FAM chain 850 are configured to perform specified data processing operations on any data that streams through the chain 850 from the firmware socket module 804. Examples of FAMs that can be deployed on reconfigurable logic in accordance with the exemplary translation engine 202 are described below.

The specific data processing operation that is performed by a FAM is controlled/parameterized by the command data that FAM receives from the firmware socket module 804. This command data can be FAM-specific, and upon receipt of the command, the FAM will arrange itself to carry out the data processing operation controlled by the received command. For example, within a FAM that is configured to perform a shield character find operation, the FAM's shield character find operation can be parameterized to define the character that will be used as the shield character. In this way, a FAM that is configured to perform a shield character find operation can be readily re-arranged to perform a different shield character find operation by simply loading parameters for a new shield character in that FAM. As another example, a command can be issued to the one or more FAMs that are configured to find a delimiter character (e.g, a record delimiter character or field delimiter character) so that the FAM can be tailored to different delimiter characters without requiring a full reconfiguration of the reconfigurable logic device.

Once a FAM has been arranged to perform the data processing operation specified by a received command, that FAM is ready to carry out its specified data processing operation on the data stream that it receives from the firmware socket module. Thus, a FAM can be arranged through an appropriate command to process a specified stream of data in a specified manner. Once the FAM has completed its data processing operation, another command can be sent to that FAM that will cause the FAM to re-arrange itself to alter the nature of the data processing operation performed thereby. Not only will the FAM operate at hardware speeds (thereby providing a high throughput of data through the FAM), but the FAMs can also be flexibly reprogrammed to change the parameters of their data processing operations.

The FAM chain 850 preferably comprises a plurality of firmware application modules (FAMs) 850a, 850b, . . . that are arranged in a pipelined sequence. However, it should be noted that within the firmware pipeline, one or more parallel paths of FAMs 850i can be employed. For example, the firmware chain may comprise three FAMs arranged in a first pipelined path (e.g., FAMs 850a, 850b, 850c) and four FAMs arranged in a second pipelined path (e.g., FAMs 850d, 850e, 850f, and 850g), wherein the first and second pipelined paths are parallel with each other. Furthermore, the firmware pipeline can have one or more paths branch off from an existing pipeline path. A practitioner of the present invention can design an appropriate arrangement of FAMs for FAM chain 850 based on the processing needs of a given translation operation.

A communication path 830 connects the firmware socket module 804 with the input of the first one of the pipelined FAMs 850a. The input of the first FAM 850a serves as the entry point into the FAM chain 850. A communication path 832 connects the output of the final one of the pipelined FAMs 850m with the firmware socket module 804. The output of the final FAM 850m serves as the exit point from the FAM chain 850. Both communication path 830 and communication path 832 are preferably multi-bit paths.

The nature of the software and hardware/software interfaces used by system 800, particularly in connection with data flow into and out of the firmware socket module are described in greater detail in U.S. Patent Application Publication 2007/0174841, the entire disclosure of which is incorporated herein by reference.

Figure 8B:
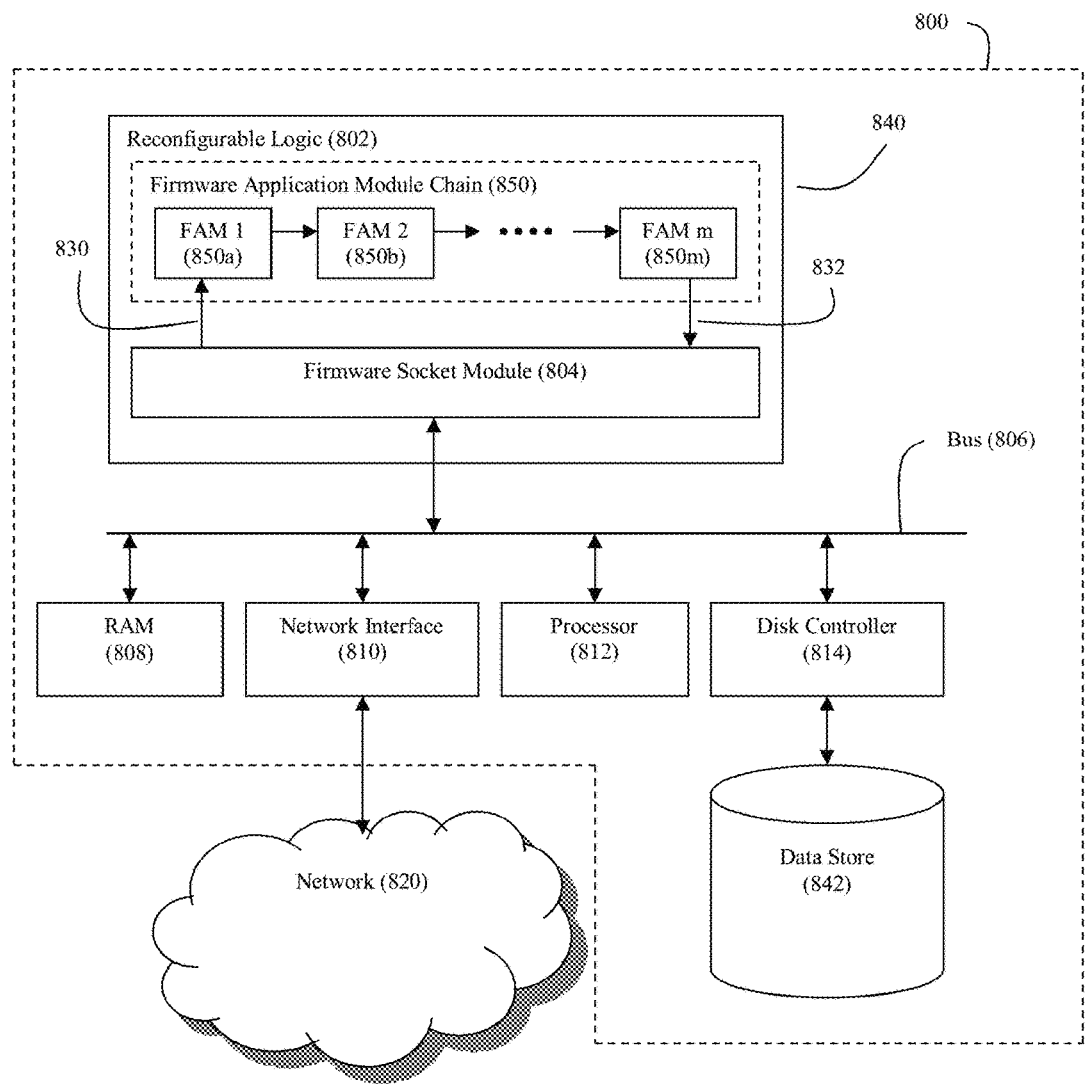

FIG. 8(b) depicts another exemplary embodiment for system 800. In the example of FIG. 8(b), system 800 includes a data store 842 that is in communication with bus 806 via disk controller 814. Thus, the byte stream 200 that is streamed through the coprocessor 840 may also emanate from data store 842. Furthermore, the data store 842 can be the target destination for the output from the translation engine 202 and/or the data processing stage 300 if desired by a practitioner. Data store 842 can be any data storage device/system, but it is preferably some form of mass storage medium. For example, data store 842 can be a magnetic storage device such as an array of Seagate disks.

Figure 9A:
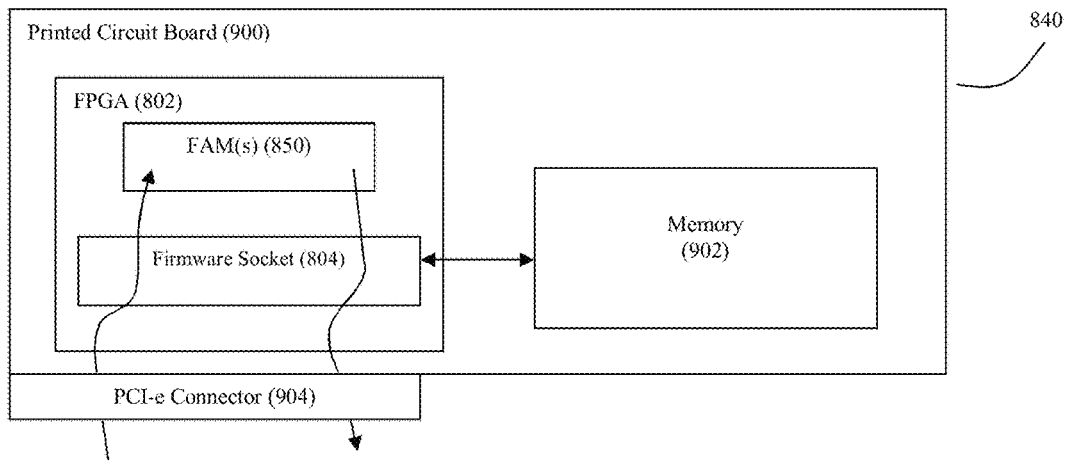
FIGS. 9(a) and (b) depict exemplary printed circuit boards for use as a coprocessor for the embodiments of FIGS. 8(a) and (b).

FIG. 9(a) depicts a printed circuit board or card 900 that can be connected to the PCI-X or PCI-e bus 806 of a commodity computer system for use as a coprocessor 840 in system 800 for any of the embodiments of FIGS. 8(a)-(b). In the example of FIG. 9(a), the printed circuit board includes an FPGA 802 (such as a Xilinx Virtex 5 or an Altera Stratix V FPGA) that is in communication with a memory device 902 and a PCI-e bus connector 904. A preferred memory device 902 comprises SRAM and DRAM memory. A preferred PCI-X or PCI-e bus connector 904 is a standard card edge connector.

Figure 9B:
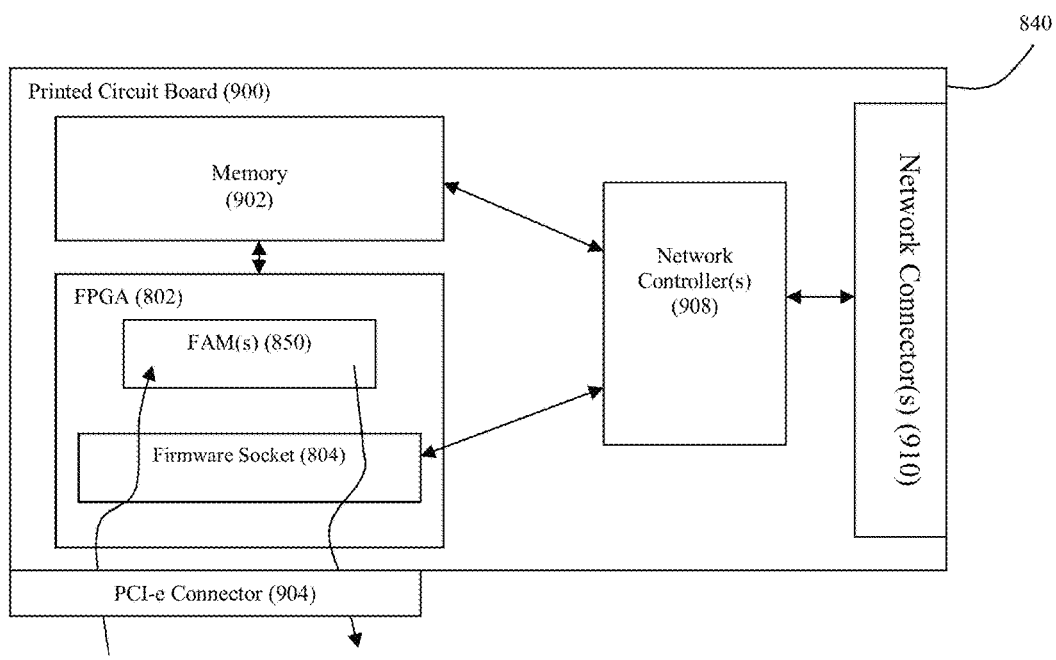

FIG. 9(b) depicts an alternate configuration for a printed circuit board/card 900. In the example of FIG. 9(b), one or more network controllers 908, and one or more network connectors 910 are also installed on the printed circuit board 900. Any network interface technology can be supported, as is understood in the art. Hardware logic can be used as the internal connector between the FPGA, memory, and network controller. It should be noted that a disk interface technology can be used in addition to or in place of the network controller and network connector shown in FIG. 9(b).

Figure 10:
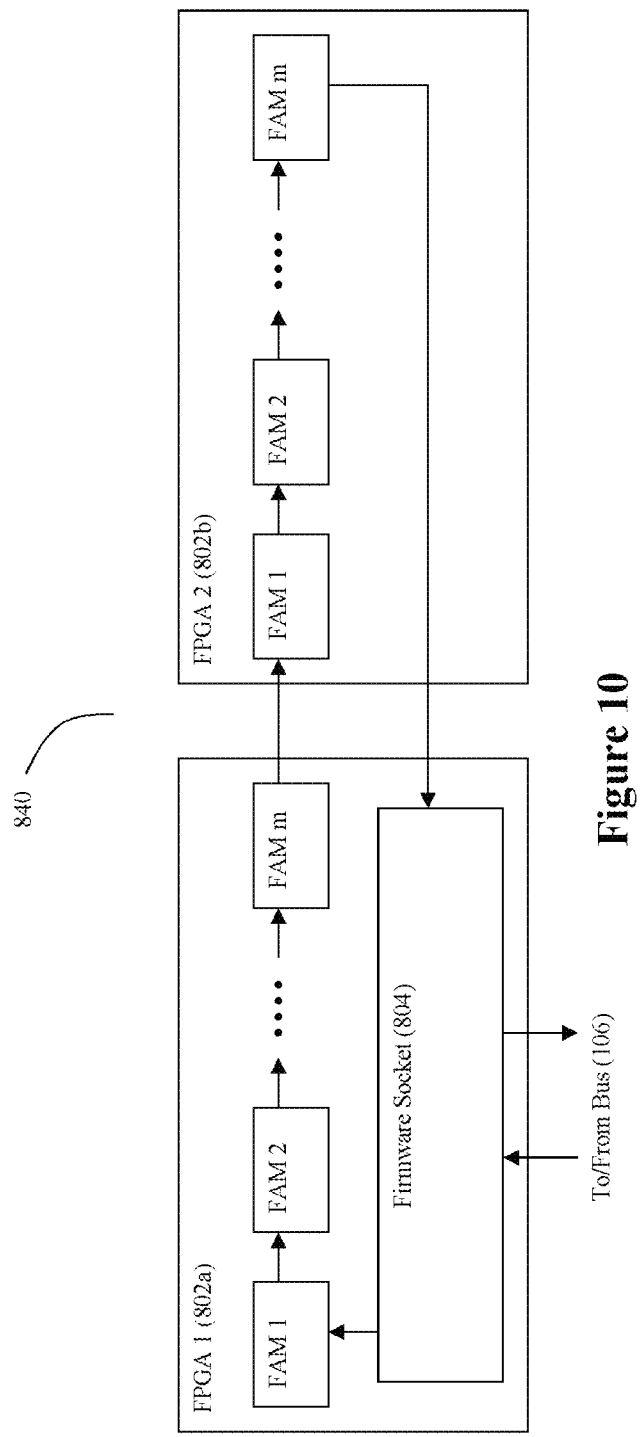
FIG. 10 depicts an example of how a firmware pipeline can be deployed across multiple reconfigurable logic devices.

It is worth noting that in either the configuration of FIG. 9(a) or 9(b), the firmware socket 804 can make memory 902 accessible to the bus 806, which thereby makes memory 902 available for use by an OS kernel as the buffers for transfers to the FAMs from a data source with access to the bus. It is also worth noting that while a single FPGA 802 is shown on the printed circuit boards of FIGS. 9(a) and (b), it should be understood that multiple FPGAs can be supported by either including more than one FPGA on the printed circuit board 900 or by installing more than one printed circuit board 900 in the system 800. FIG. 10 depicts an example where numerous FAMs in a single pipeline are deployed across multiple FPGAs.

Translation Engine 202—Fixed Field Format

Figure 11:
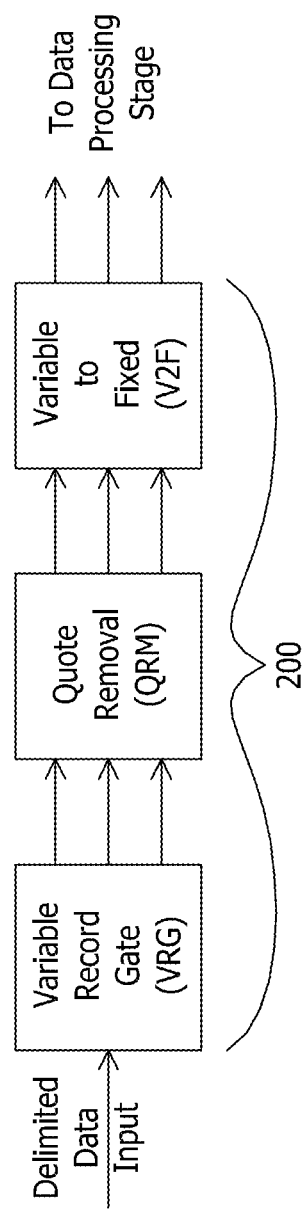
FIG. 11 depicts an example of a pipeline that can be deployed by a translation engine to convert delimited data to fixed field data.

FIG. 11 depicts an exemplary pipeline that can be employed by the translation engine 202 to convert delimited data to a fixed field format. The pipeline can comprise (1) a first module configured to convert the incoming data arranged in the delimited data format to an internal format stripped of the field delimiter characters and the record delimiter characters of the incoming data while preserving the data characters of the incoming fields, (2) a second module downstream from the first module, the second module configured to remove the shield characters from the converted data having the internal format, and (3) a third module downstream from the second module, the third module configured to translate the output of the second module to the outgoing data having the fixed field format. In this example, the first module can be referred to as a variable record gate (VRG) module, the second module can be referred to as a quote removal module (QRM) given that quote marks are used as the shield character in this example, and the third module can be referred to as a variable-to-fixed (V2F) module. Each module can be configured to operate in parallel in a pipelined manner. As such, while the V2F module is operating on data previously processed by the VRG and QRM modules, the QRM module is operating on data previously processed by the VRG module, and the VRG module is operating on newly received data, and so on as data continues to stream into the pipeline.

Figure 12:
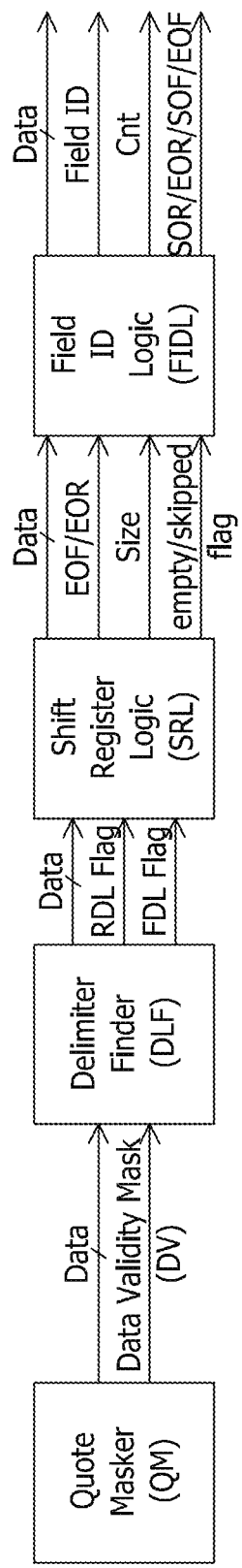
FIG. 12 depicts an exemplary pipeline for a variable record gate (VRG) module.

VRG Module:

FIG. 12 depicts an exemplary arrangement for a VRG module. The components of the VRG module shown in FIG. 12 can also be implemented as modular circuits in a pipelined chain. The VRG module can generate an output byte stream that is marked with control data to identify information such as which bytes correspond to a start of record, an end of record, a start of field, and an end of field. Thus, downstream modules need not reparse the bytes to gather that information. With reference to the operations described herein, it should be understood that the various circuit components of the VRG module can process the bytes of the byte stream in chunks (e.g., 64 bit (8 byte) or 128 bit (16 byte) chunks) per clock cycle. Thus, the component circuits can be configured to provide data parallelism by ingesting and processing multiple characters in the byte stream per clock cycle.

A first circuit in the VRG can be configured to process the shield characters that are present in the byte stream 200 to distinguish between the bytes that are eligible for downstream consideration as to whether they correspond to a delimiter character (e.g., the bytes that are present in a field that has not been shielded by a shield character) and the bytes that are ineligible for downstream consideration as to whether they correspond to a delimiter character (e.g., the bytes that are present in a field that has been shielded by a shield character). In this example, such a circuit can be referred to as a quote masker (QM) circuit.

A second circuit in the VRG that is downstream from the QM circuit can be configured to process the output of the QM circuit to locate the presence of delimiter characters in the byte stream. In this example, such a circuit can be referred to as a delimiter finder (DLF) circuit.

A third circuit in the VRG that is downstream from the DLF circuit can be configured to process the output of the DLF circuit to detect empty fields, remove the delimiter characters from the byte stream, and mark the bytes which correspond to data characters at the start of a record and end of a record. In this example, such a circuit can be referred to as a shift register logic (SRL) circuit.

A fourth circuit in the VRG that is downstream from the SRL circuit can be configured to process the output of the SRL circuit to generate a field identifier that identifies which field each data character of the byte stream belongs to and mark the bytes which correspond to data characters at the start of a field and end of a field. In this example, such a circuit can be referred to as a field ID logic (FIDL) circuit.

Figure 13:
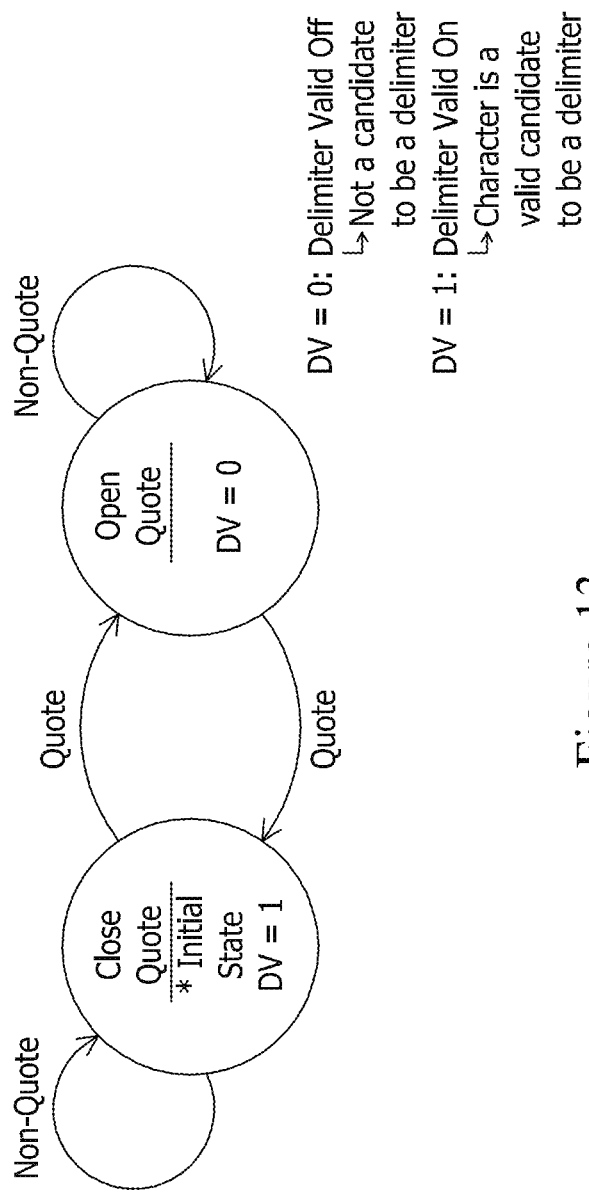
FIG. 13 depicts a state machine for an exemplary quote masker circuit.

FIG. 13 provides additional detail regarding the QM circuit. Once again, in this example, the shield character is a quote mark, so quotes will be used throughout this example to refer to the shield character. However, it should be understood that characters other than quote marks could be used as the shield character. As noted, the QM circuit is configured to mark each byte of the byte stream with an indicator of whether or not it is a valid candidate as a delimiter (i.e. NOT protected by the shield character). FIG. 13 depicts exemplary state diagrams that can be employed by the QM circuit to implement this task. FIG. 13 shows two states: CLOSED ("Close Quote") and OPEN ("Open Quote"). In the CLOSED state, which is the initialization state, the quotes have been closed, and characters are open for consideration as a delimiter. While in this state, any character that is not a quote character will be marked with a "Delimiter Valid" (DV) flag set to true, meaning that the character is a candidate delimiter character. Upon observing a quote character, this machine will transition to the OPEN state, meaning that the data is inside a quote and thus shielded by the quote character. Any character other than a quote character will be marked with a DV flag set to false, indicating that the character is not a candidate to be a delimiter. Upon detection of another quote character, this state machine will transition back to CLOSED, meaning that next character is no longer being shielded by quote marks. This toggling behavior also accommodates the possible presence of double quotes in the byte stream which are meant to internally shield data characters that happen to be quote marks (see the portion of Field 1 in FIG. 1 comprising "Jim"—all of Field 1 has been shielded by quote marks, so that quote mask should not change upon encountering the internal double quotes in the byte stream). From the open data state, if a quote mark is detected in the byte stream, the state machine will transition to the closed quote state, while any other character in the byte stream means the state machine will remain in the open data state.

It should be understood with the diagram of FIG. 13 that one can ignore the DV status bits for the actual quote characters because configuration restrictions prevent shield characters and delimiter characters from overlapping. In this model, some quotes will be marked as valid, and others will not, but regardless of their marking they will never be considered a delimiter, as will be understood upon review of FIG. 14.

The QM circuit thus outputs the bytes of the byte stream where each byte is associated with a DV flag to indicate whether the associated byte should be processed to assess whether it contains a delimiter character.

Figure 14A:
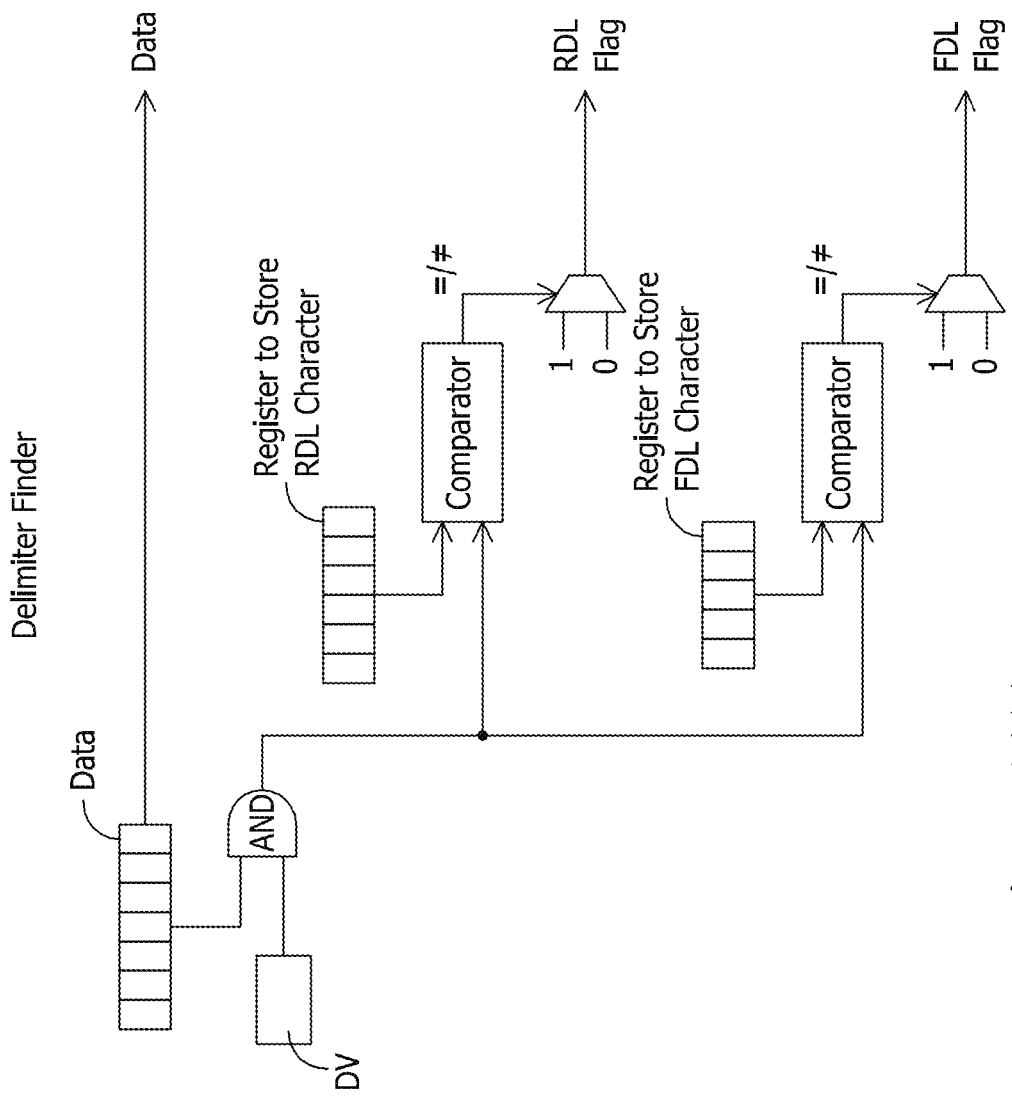
FIGS. 14(a) and (b) depict exemplary delimiter finder circuits.
Figure 14B:
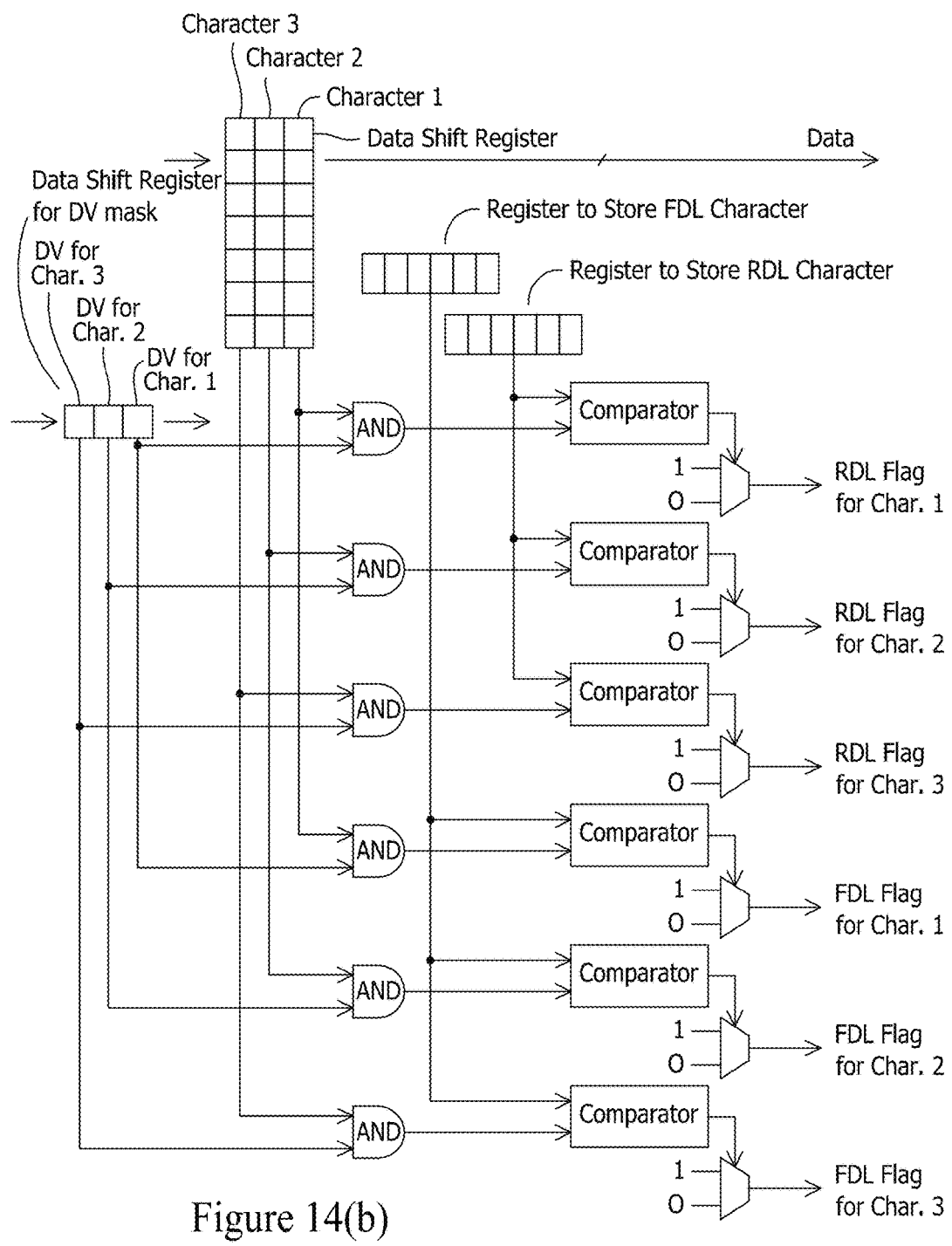

FIG. 14(*a*) provides additional detail regarding an example of a DLF circuit. A data register can be loaded with the current byte under consideration. A mask register can be loaded with the DV flag associated with the byte loaded in the register. A first match key register can be loaded with the RDL character, and a second match key register can be loaded with the FDL character. The byte in the data register can be logically ANDed with the DV data in the mask register. Thus, from the description above, (1) if a byte has been identified by the QM register as being eligible for consideration as to whether it contains a delimiter character, its associated DV flag is equal to 1, and the output of the AND operation will pass the byte to a matching stage, and (2) if a byte has been identified by the DV register as being ineligible for consideration as to whether it contains a delimiter character, its associated DV flag is equal to 0, and the output of the AND operation will pass a zero value to a matching stage (thereby causing the matching stage to find no match with respect to the delimiter characters which are assumed to be different characters than the zero value).

A first comparator in the matching stage compares the RDL character with the AND operation output. Based on the outcome of that comparison, a control signal can be applied to a multiplexer to govern whether an RDL flag associated with the byte under consideration will go to a state indicating the byte under consideration corresponds to the RDL character (e.g., high) or to a state indicating the byte under consideration does not correspond to the RDL character (e.g., low). Similar matching logic can be employed to test the AND operation output against the FDL character to yield an FDL flag associated with the byte under consideration. Furthermore, for embodiments where the DLF circuit is implemented in reconfigurable logic, the parallelism capabilities provided by the reconfigurable logic mean that the RDL character matching operation and the FDL character matching operation can be performed simultaneously.

Thus, the output of the DLF circuit shown by FIG. 14(*a*) will be a stream of outgoing bytes and their associated RDL and FDL flags.

FIG. 14(*b*) depicts an example of a DLF circuit where the DLF circuit is configured to ingest multiple characters per clock cycle (e.g., 3 characters per clock cycle as shown in the example of FIG. 14(*b*)). Thus, the data shift register through which the byte stream is passed will have a multi-character data width (once again, a 3 character width in this example). Similarly, the data shift register through which the DV mask is passed will also have a data width that corresponds to the data width of the data shift register for the byte stream. Each clock cycle, the 3 characters of the data shift register and the DV masks corresponding to those three characters can be processed in parallel through replicated AND gates, comparators, and multiplexers to test the characters for matches against the RDL character and the FDL character. Upon completion of a cycle, the data shift registers can be configured to perform a shift by three characters to load the next set of characters for processing.

Figure 15:
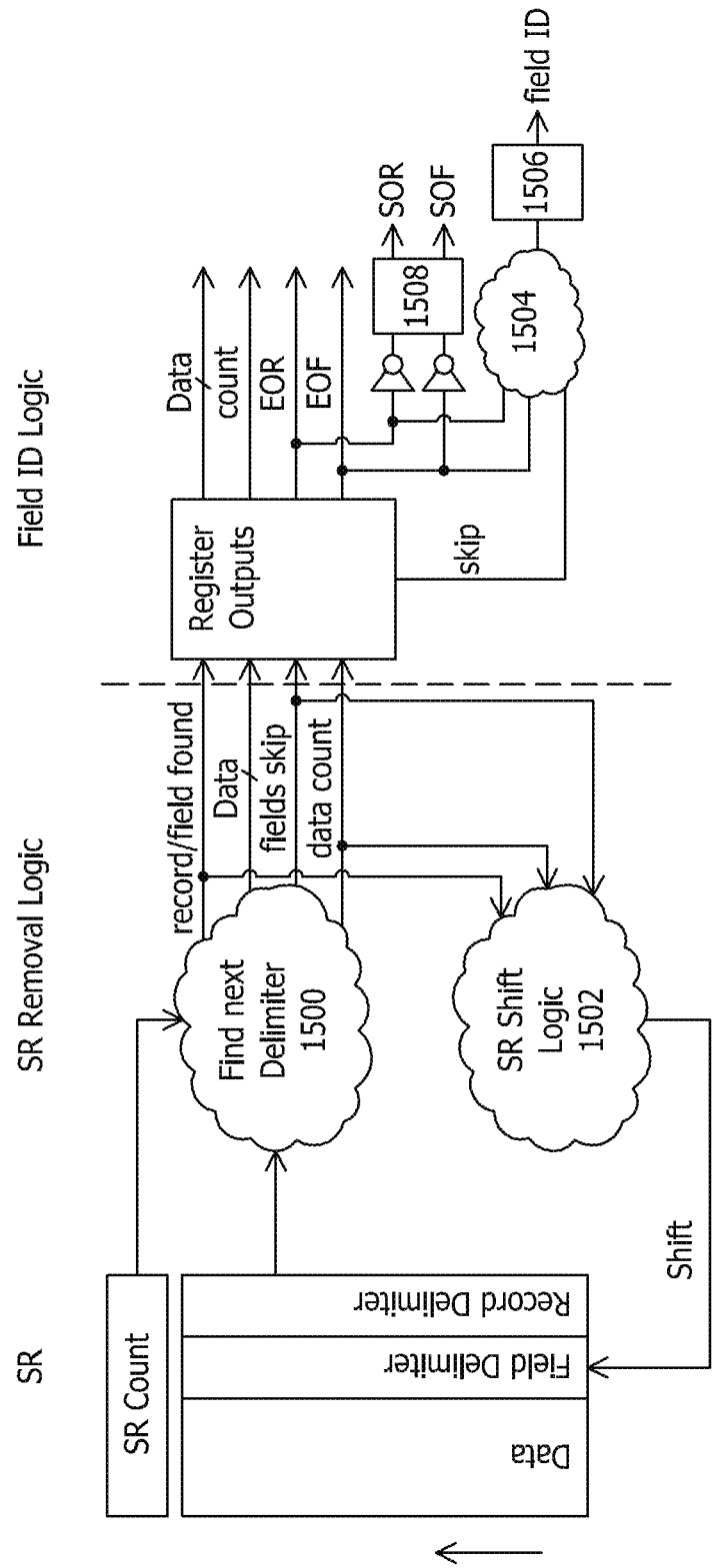
FIG. 15 depicts an exemplary shift register logic circuit and an exemplary field identifier logic circuit.

FIG. 15 provides additional detail regarding the SRL circuit and the FIDL circuit. The SRL circuit and the FIDL circuit can cooperate to pack the data headed downstream. FDL and RDL characters are removed from the byte stream, a count of skipped fields (e.g., empty fields) is generated, and the data characters that serve as field and record boundaries are marked. Further still, each field can be tagged with a field identifier for use by downstream processing. The output of the FIDL circuit can thus be the data characters of the byte stream and control data associated with those characters. This control data can take the form of a structured module chain interface (SMCI) protocol. The SMCI protocol can include a start of field (SOF) data, end of field (EOF) data, start of record (SOR) data, end of record (EOR) data, field identifier data, and count data, the count data being indicative of how many bytes should be consumed (e.g., how many bytes are valid in a transaction (transmission of a data word). For a data width of 8 bytes, for example, the count can range from 0-8 depending upon how many of the bytes are valid.

The SRL circuit of FIG. 15 can employ three shift registers—a data shift register through which the characters of the byte stream are pushed, a RDL shift register through which the RDL flag data is pushed, and a FDL shift register through which the FDL flag data is pushed.

Logic 1500 can be configured to:
Find the "leading" delimiter in the FDL or RDL register (the first character in the data register for which the corresponding FDL or RDL flag is high). The record/field found flag can be set as appropriate when a leading delimiter is found.
Check the RDL and FDL flags following the leading delimiter to determine if an empty or skipped field/record is present. An empty/skipped field is a field with no data. Such an empty/skipped field appears in the byte stream as back to back FDL characters (as indicated by the FDL flag data). An empty/skipped record is a record with no data. Such an empty/skipped record appears in the byte stream as back to back RDL characters (as indicated by the RDL flag data).
If there are back to back delimiters in the byte stream, determine a count of the empty fields/records and pull those off the shift register. This count is communicated as the Fields Skip output of the SRL circuit in FIG. 15.
If non-empty fields are found, use the position of the delimiter (communicated as a bit in the field/record found register) to indicate how much data to pull off for the given field. This information can be communicated as the Data Count output of the SRL circuit in FIG. 15.

The shift logic 1502 can then operate in a fashion to cause the shift register to consume or strip off the delimiters. Thus, when delimiter characters are found in the byte stream based on the SMCI data, the shift logic 1502 can cause the shift register to shift out the delimiter characters while holding a data valid signal low. In this fashion, the delimiter characters are effectively dropped from the outgoing data stream.

The FIDL circuit then takes in the output of the SRL circuit in a register output and processes that output to generate an EOR flag and EOF flag for the data characters in the byte stream. Based on the delimiter following the data being pulled, the logic can determine whether to send an EOF or EOR marker (by checking the delimiter that triggered then end of the field/record). Logic 1504 and 1506 operate as a counter that increments the Field ID each time a new field in a record is encountered (in response to the skipped count, the EOR flag and the EOF flag). Thus, the Field ID can operate as an array index such that the first field has a Field ID of 0, the second field has a Field ID of 1, and so on. Furthermore logic 1508 operates to generate SOR and SOF flags from the EOR and EOF flags. The SOR/SOF/EOF/EOR data, count data, and Field ID data produced by the FIDL circuit can serve as the SMCI protocol control data associated with the outgoing bytes.

It should also be understood that the VRG module can be internally pipelined such that the QM circuit, the DLF circuit, the SRL circuit, and the FIDL circuit are configured to operate simultaneously in a pipelined fashion.

Figure 16:
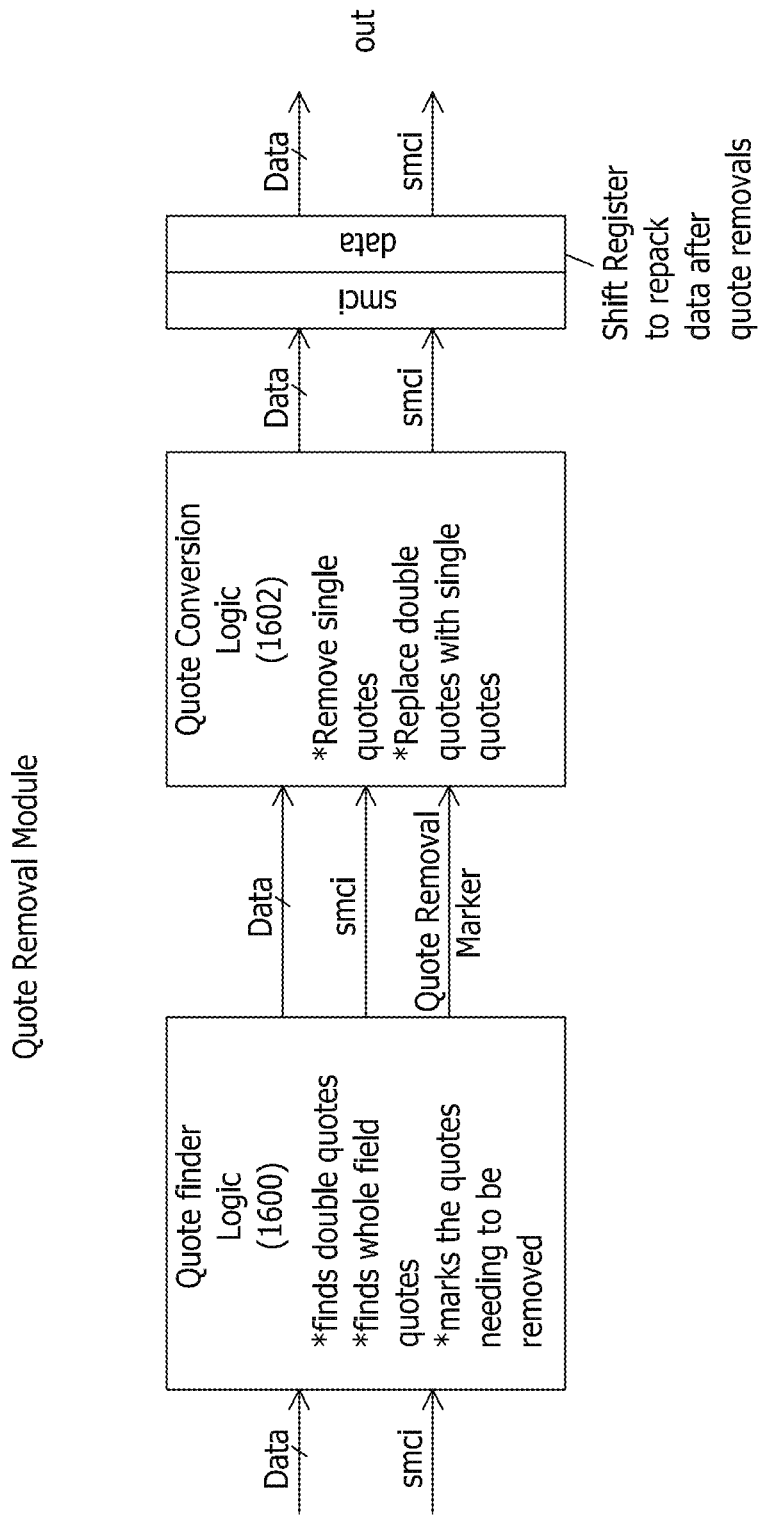
FIG. 16 depicts an exemplary quote removal (QRM) module.

QRM Module:
FIG. 16 depicts an exemplary arrangement for a QRM module. The QRM module is configured to strip the quotes used as the start and end of a field as shield characters and convert two consecutive quotes into a single quote.

The quote finder logic 1600 receives the data and SMCI signal from the VRG module output, and performs matching operations on the data to locate the characters that match the quote character. If a quote character in the data stream is at the start of a field (as indicated by the SOF flag in the SMCI control data), then the quote finder logic 1600 can mark that quote character for removal. If a quote character in the data stream is at the end of a field (as indicated by the EOF flag in the SMCI control data), then the quote finder logic 1600 can also mark that quote character for removal. Furthermore, if consecutive quote characters are found in the data stream, then the quote finder logic can mark the first quote for removal. Alternatively, the quote finder logic can be configured to merely mark the locations of quote characters in the data stream.

Thus, the quote finder logic 1600 provides the data stream, its associated SMCI control data, and the quote removal markers to quote conversion logic 1602. The quote conversion logic is configured to remove the single quotes from the data stream and replace the double quotes with single quotes. A shift register repacks the data from the quote conversion logic to accommodate the quote removals. Thus, the output of the shift register comprises the data stream and its corresponding SMCI control data.

The QRM module can also be internally pipelined such that the quote finder logic 1600, the quote conversion logic 1602 and shift register operate simultaneously in a pipelined fashion.

Figure 17A:
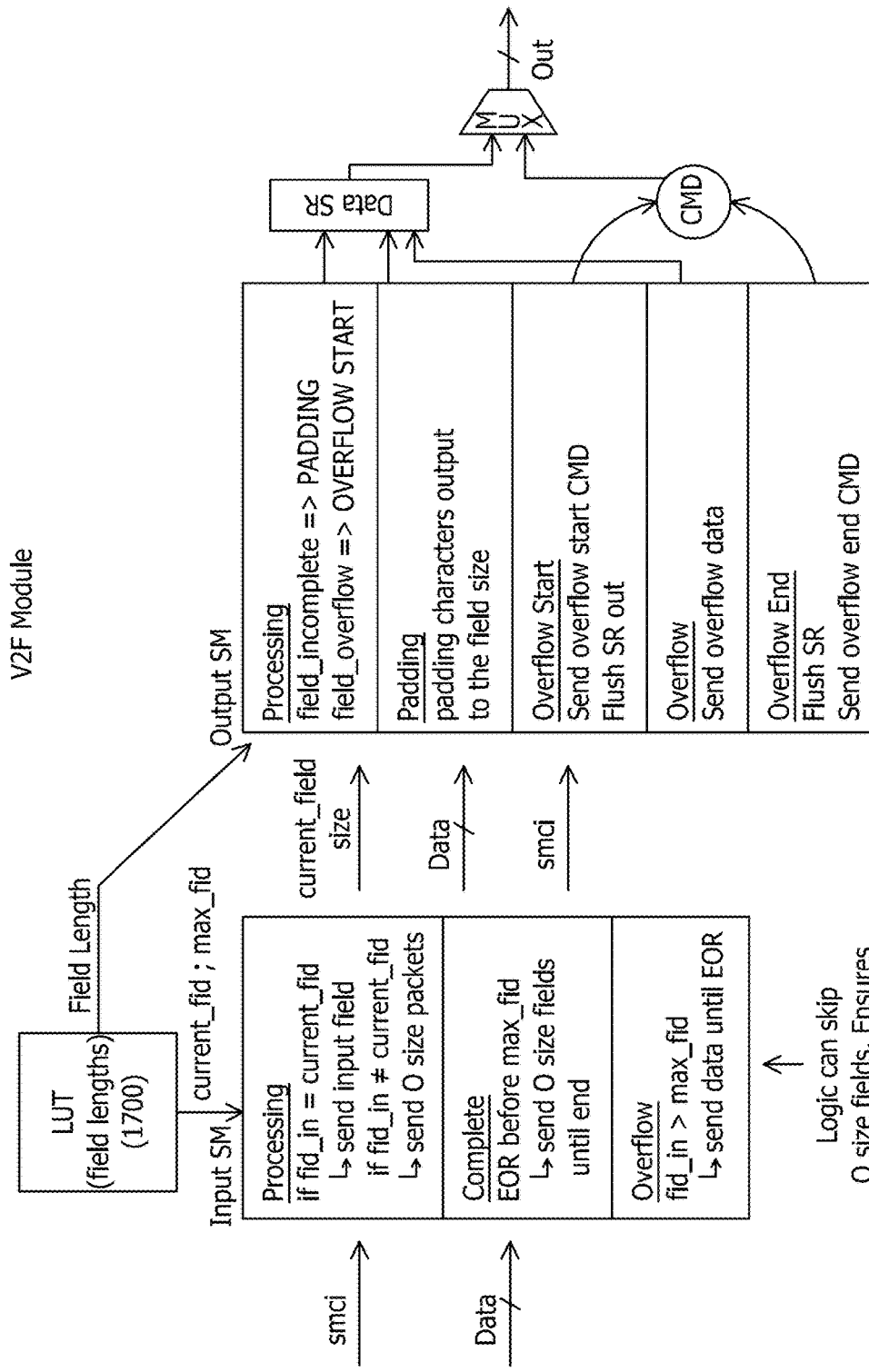
FIG. 17(a) depicts an exemplary variable-to-fixed (V2F) module.

V2F Module:
FIG. 17(a) depicts an exemplary arrangement for a V2F module. The V2F module can hold a map of field lengths to use for the fixed field format. The V2F module can use this map to fit the fields of the data stream to their appropriate length in accordance with the target fixed field format. The V2F module will pad out any field in the data stream shorter than the specification field length with a padding character, which can be a configurable special character. For ease of reference, these padding characters can be referred to as zeros for purposes of discussion. The V2F module will also output an overflow error for any field in the data stream longer than the specification field length.

The LUT stores a table of field widths that can be sent in from software. This table will thus have the length for each field as specified by software on startup. Thus, it should be understood that through these specified field lengths, each of the fields of the output fixed field formatted-data can have its own length that need not be the same length as the other fields. The index into this table represents the ID of a given field, and the value at that location represents the given field length. The last field identifier, and consequently the last populated field in the LUT, is stored in a last field identifier (max_fid) which is stored separately from the LUT. It is worth noting that some fields in this table can have a specified length of zero, meaning they are to be eliminated from output data records. (This can be used to eliminate fields that are generally not present in the input data.)

Figure 17B:
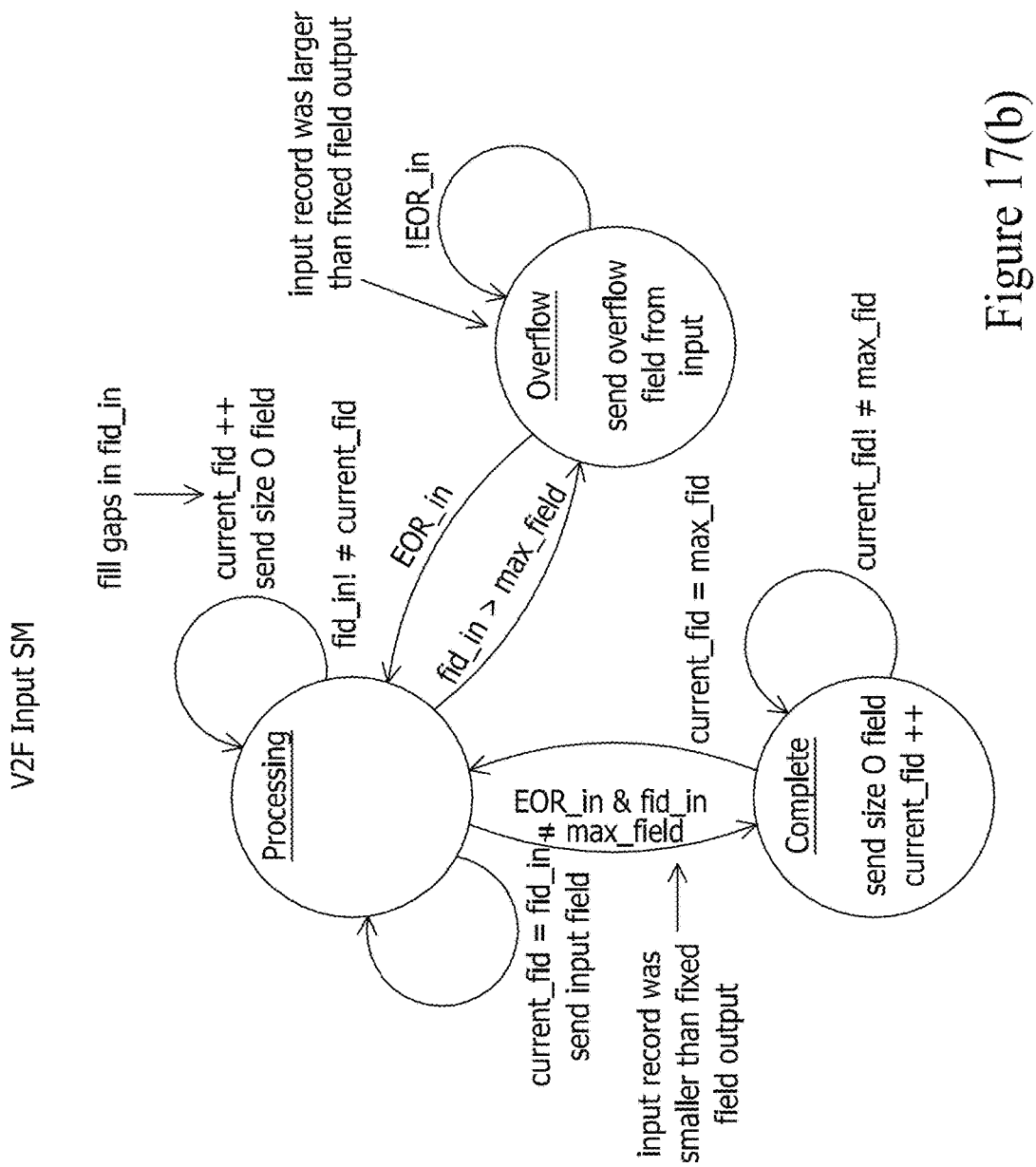
FIG. 17(b) depicts a state machine for the V2F module of FIG. 17(a).

An input state machine takes in the data stream and SMCI control data from the QRM module and compares it with the field identifiers from the LUT to reconcile the incoming fields with the expected fields for each record. The start of each field for the incoming data is marked in the SMCI data by the SOF flag while the end of each field is marked in the SMCI data by the EOF flag. Further still, the Field ID of the SMCI data will identify the field to which the current data of the data stream corresponds. From this information, the input state machine can transition between states of PROCESSING, COMPLETE, and OVERFLOW. FIG. 17(*b*) depicts an exemplary state machine diagram for the input state machine of FIG. 17(*a*).

In the PROCESSING state, if the field identifier for the incoming data (fid_in) matches the field identifier for the current field from the LUT (current_fid), then the incoming data can be sent to the output state machine for processing. However, while in the PROCESSING state, if fid_in does not match current_fid (and an EOR marker is not present), then this means that a gap in the incoming fields exists, and an empty field should be sent to the output state machine for processing. The next current_fid from the LUT is then processed.

If fid_in is greater than max_fid while the input state machine is in the PROCESSING state, the state machine transitions to the OVERFLOW state. This condition indicates that the input record included more fields than expected. While in the OVERFLOW state, the input state machine sends the overflow fields to the output state machine until an EOR marker is encountered in the incoming data. Upon encountering the EOR market in the incoming data, the input state machine will transition back to the PROCESSING state.

If fid_in does not match max_fid and the EOR marker is present in the incoming data while the input state machine is in the PROCESSING state, this means that the incoming record had fewer fields than expected and we transition to the COMPLETE state. While in the COMPLETE state, the input state machine sends size zero fields to the output state machine and increments to the next current_fid from the LUT. Once current_fid reaches max_fid, the input state machine transitions back to the PROCESSING state.

The input state machine reports a data value indicative of the size of each identified field as it receives SOF markers from the input SMCI interface (current_field_size). For empty fields that are added to fill in a gap in a record, the current_field_size can be zero. For non-empty fields, a counter can be employed to identify how many bytes are present in each field (from the SOF and EOF markers in the SMCI control data associated with the incoming data).

The output state machine operates to fill fields with bytes of the incoming data or padding characters as necessary, and identify those fields which are overflowing with bytes of the incoming data as necessary. The output state machine can progress from a PROCESSING state (during which time the data stream fills the output data shift register that contains the output field) to a PADDING state (during which time padding characters are added to the output field) upon detection of a field incomplete condition. The field incomplete condition can occur if the current_field_size for an input field is less than the corresponding field length for the output field. Once the output field has been filled to the current_field_size, the output state machine can transition to the PADDING state.

While in the PADDING state, the remaining space in the output field is filled with padding characters until the padding characters added to the output field have caused the output field to reach the size of its field length. The output state machine can then return to the PROCESSING state.

The output state machine can also progress from the PROCESSING state to the OVERFLOW START state upon detection of a field overflow condition. The field overflow condition can occur if the current_field_size for an input field is greater than the corresponding field length for the output field. If this condition is detected, the output state machine can transition to the OVERFLOW START state. When in the OVERFLOW START state, an overflow start command (CMD) can be sent and the data shift register is flushed. The output state machine then progresses to the OVERFLOW state (during which time the overflow data is sent). Upon encountering the EOF flag for the overflowing field, the output state machine will progress to the OVERFLOW END state. During the OVERFLOW END state, an overflow end command (CMD) can be sent, and the shift register is flushed. Thus, overflowing fields are framed by overflow commands in the output data.

A command/data multiplexer is configured to provide either the CMDs from the output state machine or the content of the data shift register (SR) as an output. The state of the output state machine will govern which multiplexer input is passed as the multiplexer output. Thus, if the output state machine is in the OVERFLOW START or OVERFLOW END states, the multiplexer will pass command data indicative of these states to the output. While the output state machine is in the PROCESSING, PADDING, or OVERFLOW states, the multiplexer will pass the content of the output data shift register to the output. Accordingly, the V2F will output a fixed field of data when no overflows are detected. If an overflow is detected, a CMD signal frames the overflow data so that exception handling can further process the overflowing field.

Thus, the V2F module is able to deliver the data of the input byte stream 200 to the data processing stage 300 as a byte stream in a fixed field format.

Figure 18:
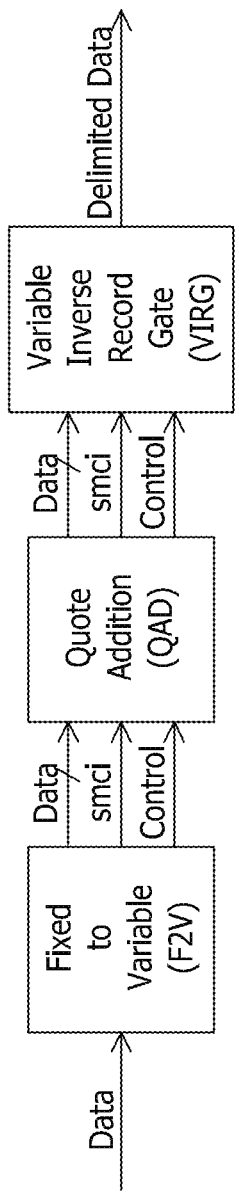
FIG. 18 depicts an exemplary pipeline that can be deployed by a translation engine to convert fixed field data to delimited data.

Translation Engine 400—Fixed Field Format:

If it is desired to translate the processed data output of the data processing stage back to a delimited data format, the translation engine 400 can be configured with a pipeline of processing modules that effectively perform the inverse of the operations performed by the pipeline of FIG. 11. FIG. 18 depicts an exemplary pipeline that can be deployed by the translation engine 400. A fixed-to-variable (F2V) module can convert the incoming data in a fixed field format to the variable format having the SMCI control protocol. A quote addition (QAD) module downstream from the F2V module can insert shield characters into the data stream at appropriate locations as per the target delimited data format. A variable inverse record gate (VIRG) module downstream form the QAD module can insert FDL and RDL characters into the data stream at appropriate locations to thereby generate an output data stream in the target delimited data format.

Figure 19:
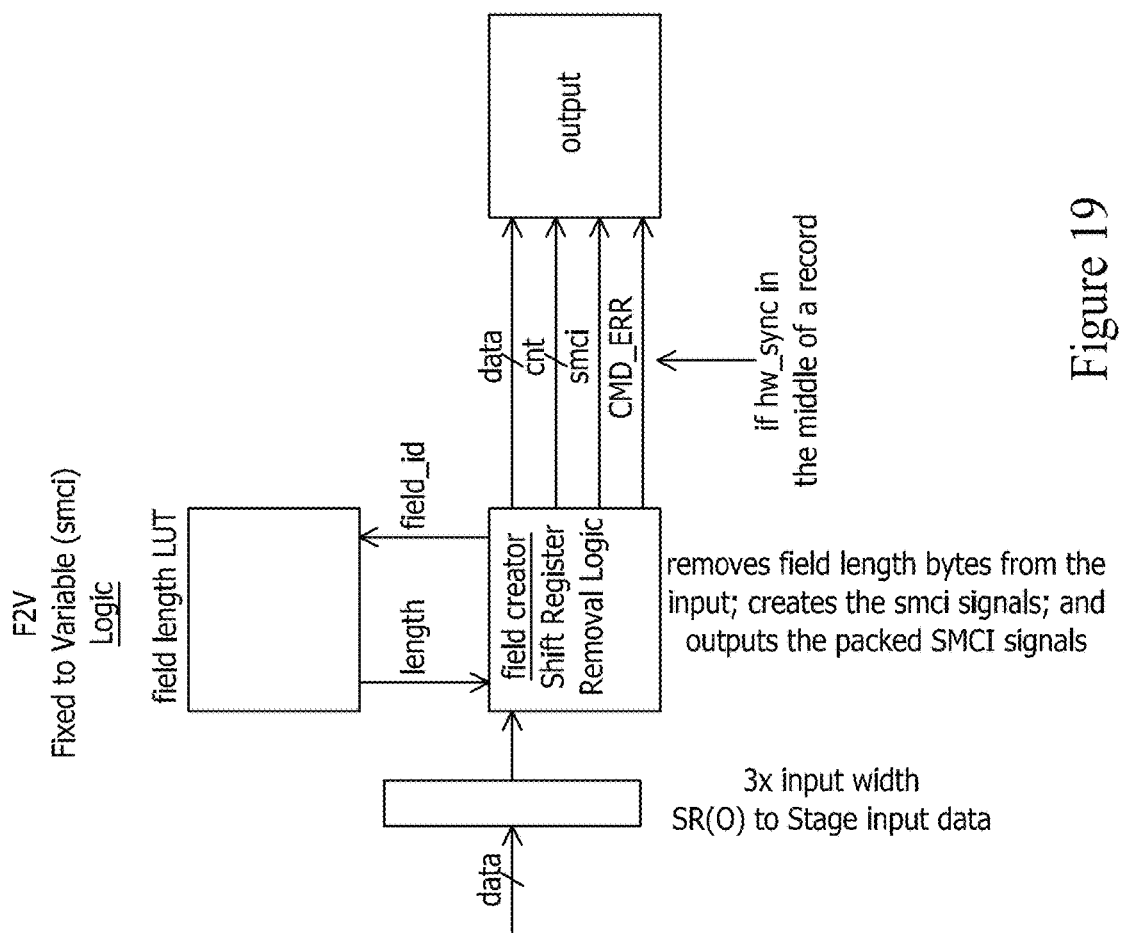
FIG. 19 depicts an exemplary fixed-to-variable (F2V) module.

FIG. 19 depicts an exemplary embodiment for the F2V module. Incoming data is shifted through a shift register, and a LUT of field lengths is used to ascertain the length of each incoming field. A field creator delineates the different fields of the incoming data and generates the associated SMCI control protocol data for those fields.

Figure 20:
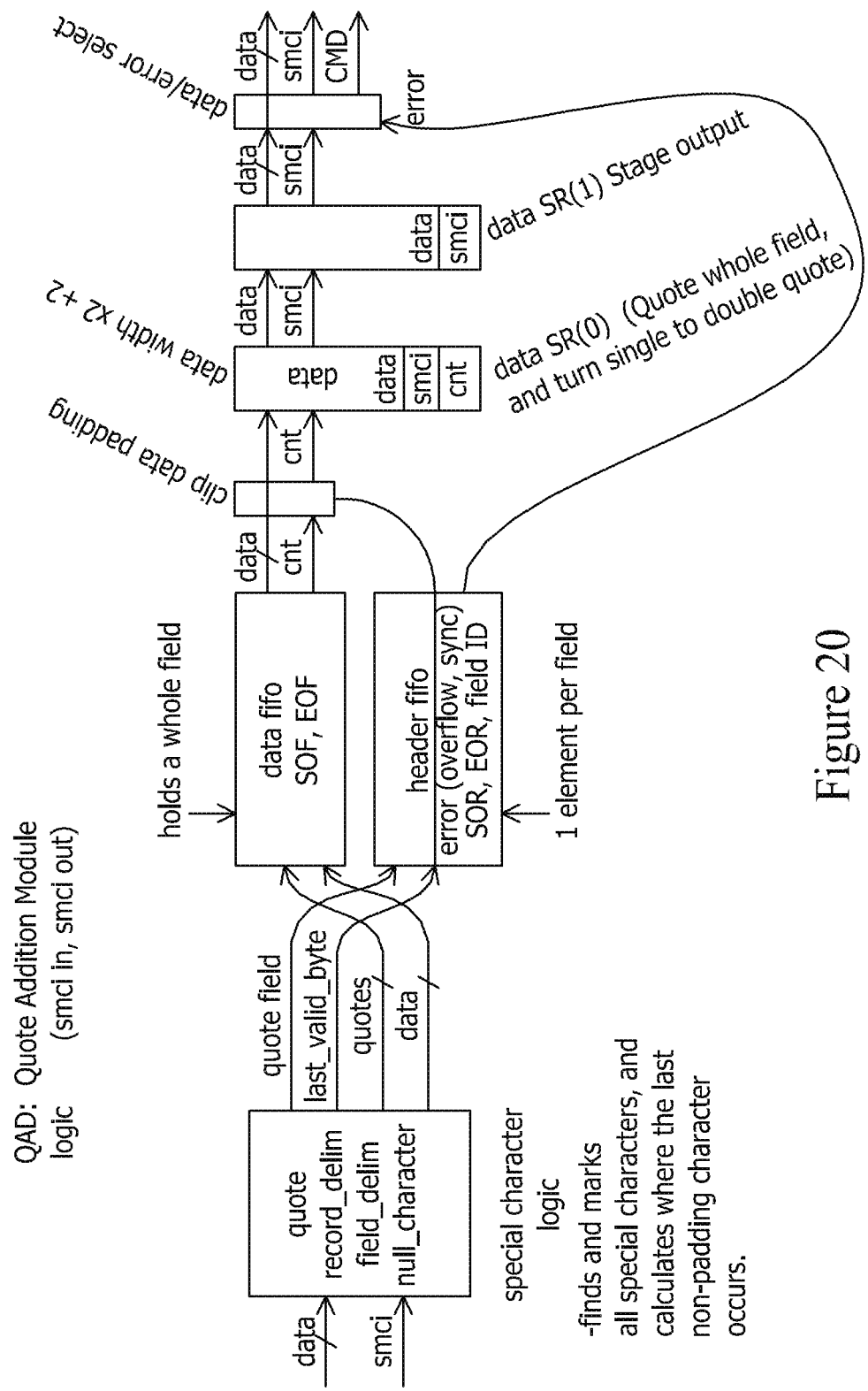
FIG. 20 depicts an exemplary quote addition (QAD) module.

FIG. 20 depicts an exemplary embodiment for the QAD module. The QAD module can inspect the incoming data for shield characters and delimiter characters to insert shield characters at appropriate locations as per the delimited data format. For example, if it detects a data character within a field that does not serve as an FDL character but matches the FDL character, the QAD module will operate to wrap that field with quote marks. The QAD module can also operate to strip the incoming data of padding characters that may have been added to the fields to fillout the fixed fields. A special character logic in the QAD module can operate to detect and mark all special characters (shield characters, FDL characters, and RDL characters) in the data stream for populating the data and header queues. A padding clipper that then culls the data stream of padding characters and shift registers can be employed to repack the outgoing data.

Figure 21:
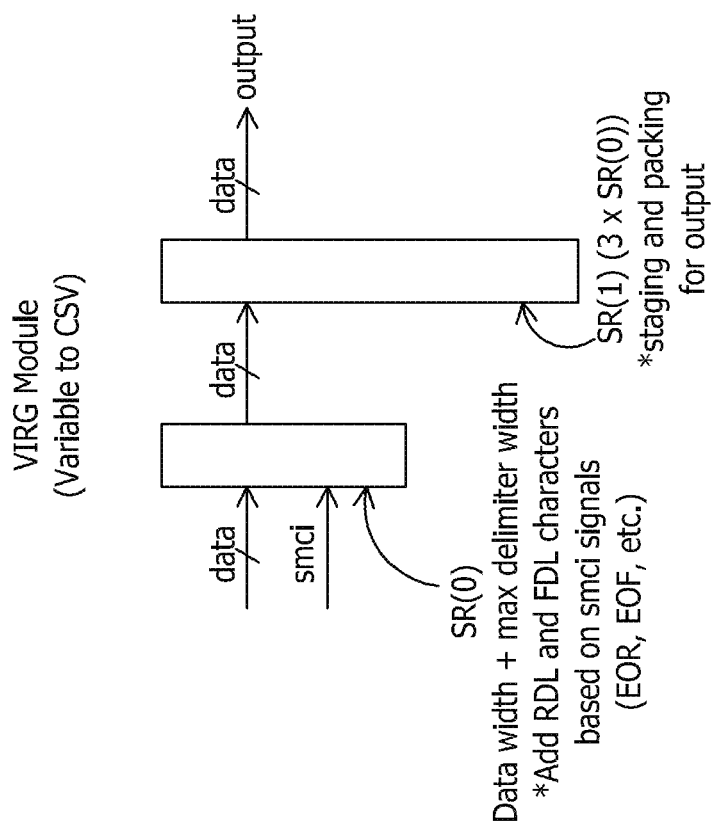
FIG. 21 depicts an exemplary variable inverse record gate (VIR) module.

FIG. 21 depicts an exemplary VIR module. The VIR module can take in the data output from the QAD module together with the associated SMCI control data to insert actual RDL characters and FDL characters at appropriate locations in the data stream via processing logic triggered by the SMCI control data and corresponding shift registers. Thus, the output of the VIR module will be a stream of data in the delimited data format.

Translation Engine 202—Mapped Variable Field Format

Figure 23:
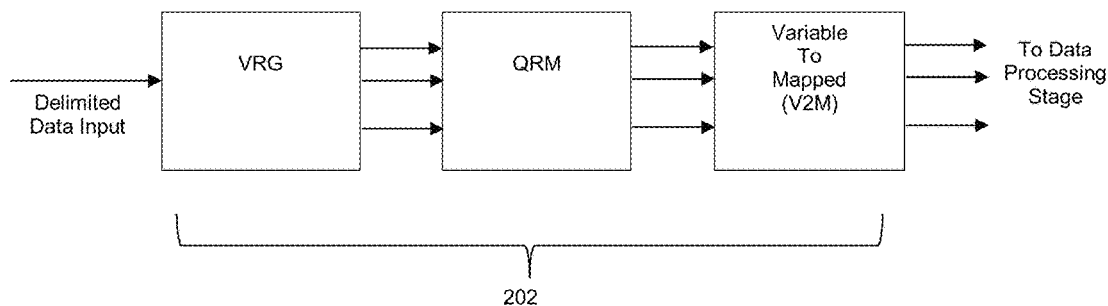
FIG. 23 depicts an example of a pipeline that can be deployed by a translation engine to convert delimited data to mapped variable field data.

FIG. 23 depicts an exemplary pipeline that can be employed by the translation engine 202 to convert delimited data to a mapped variable field format. The pipeline can comprise (1) a first module configured to convert the incoming data arranged in the delimited data format to an internal format stripped of the field delimiter characters and the record delimiter characters of the incoming data while preserving the data characters of the incoming fields, (2) a second module downstream from the first module, the second module configured to remove the shield characters from the converted data having the internal format, and (3) a third module downstream from the second module, the third module configured to translate the output of the second module to the outgoing data having the variable mapped field format. In this example, the first module can be a VRG module as described above, and the second module can be a QRM module as described above. The third module can be referred to as a variable-to-mapped (V2M) module. Each module can be configured to operate in parallel in a pipelined manner. As such, while the V2M module is operating on data previously processed by the VRG and QRM modules, the QRM module is operating on data previously processed by the VRG module, and the VRG module is operating on newly received data, and so on as data continues to stream into the pipeline.

Figure 24:
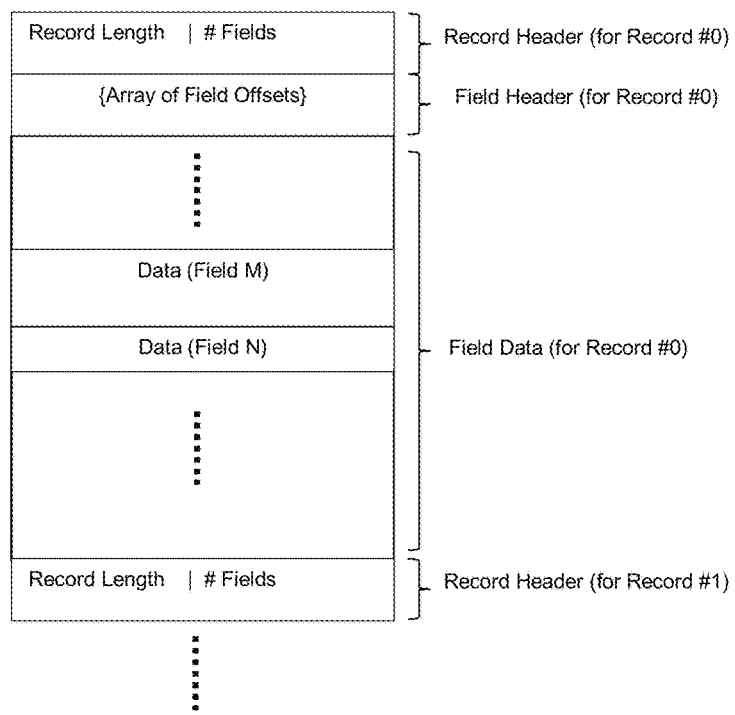
FIG. 24 depicts an exemplary mapped variable field format.

FIG. 24 depicts an exemplary mapped variable field format that can be exhibited by byte stream 204 produced by the pipeline of FIG. 23. Each record can have a variable length, wherein the record comprises data fields, also of variable length. Header information is included with the records to map the record boundaries and field boundaries. For example, a record header can include a length for the subject record and a count of the number of fields contained in the record. The field header can identify offsets into the record for each field. This can be expressed as an array of integer values, where each integer value represents the offset to a given field in the record such that the first integer in the array maps to a first field of the record, a second integer in the array maps to a second field of the record, and so on. The field header can then be followed by the data fields of the record. These fields can have a variable length, thereby providing for a more compact record where the need for padding bytes can be eliminated. Once again, the field offsets of the field header provide a mapping function that allows for direct access of a desired field. Thus, the translation engine 202 of FIG. 23 can populate the fields and the headers with data and information to tailor the record size as appropriate for the data.

FIG. 25 depicts an exemplary snippet of code that allows for direct access to a desired field of a record. To retrieve a specific field's starting address, for example, a client would simply need to index into the field array of the field header and add the indexed offset to the address of the beginning of the message (record).

Figure 26:
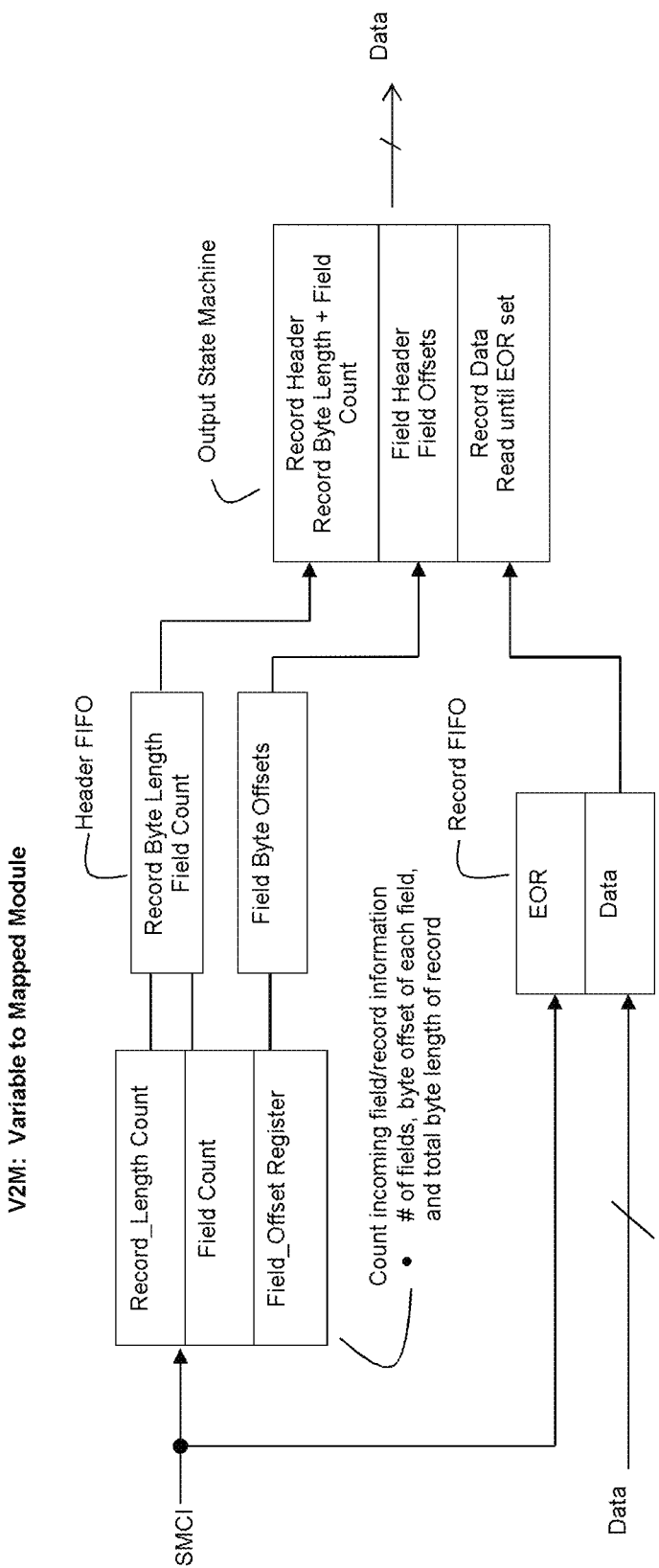
FIG. 26 depicts an exemplary variable-to-mapped (V2M) module.

V2M Module:

FIG. 26 depicts an exemplary arrangement for a V2M module. The V2M module can convert the data in the SMCI format from the QRM module to generate outgoing data in the variable mapped field format.

Incoming data is stored in a record FIFO buffer. The record FIFO buffer also includes a register that will identify when an EOR signal is present in the SMCI information, marking the end of that record. Depending upon the maximum record size, the record FIFO buffer can be internal memory in the hardware (e.g., internal to an FPGA chip for an embodiment where the V2M module is deployed on an FPGA) or it can be external to the hardware. The size of the record FIFO should be sufficient to buffer an entire record.

Registers are also used to keep a running count of incoming field and record information so that the V2M module can track the number of fields in each record, the byte offsets of each field of the record, and the total byte length of each record. Upon encountering appropriate markers in the SMCI control data, the header FIFO buffer can be written to include information such as the field offsets and record byte length/field count.

An output state machine then operates to generate the outgoing data in the mapped variable field format using data from the record FIFO buffer to populate the record fields, and using the information in the header FIFO buffer to populate the record header and field header. Upon encountering an EOR signal in the SMCI control data, the V2M can then progress to the next record to construct the mapped variable field output.

Thus, the V2M module is able to deliver the data of the input byte stream 200 to the data processing stage 300 as a byte stream in a mapped variable field format.

Figure 27:
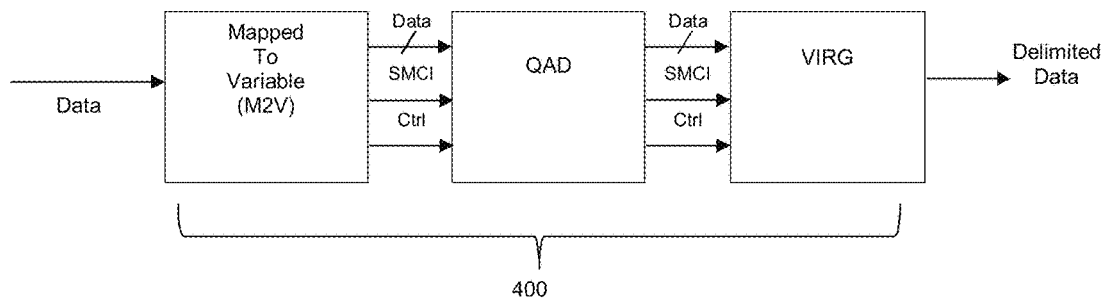
FIG. 27 depicts an exemplary pipeline that can be deployed by a translation engine to convert mapped variable field data to delimited data.

Translation Engine 400—Mapped Variable Field Format:

If, for an embodiment where mapped variable field formatting is used, it is desired to translate the processed data output of the data processing stage back to a delimited data format, the translation engine 400 can be configured with a pipeline of processing modules that effectively perform the inverse of the operations performed by the pipeline of FIG. 23. FIG. 27 depicts an exemplary pipeline that can be deployed by the translation engine 400 for this purpose. A mapped-to-variable (M2V) module can convert the incoming data in a mapped variable field format to the variable format having the SMCI control protocol. A QAD module as described above downstream from the M2V module can insert shield characters into the data stream at appropriate locations as per the target delimited data format. A VIR module as described above downstream from the QAD module can insert FDL and RDL characters into the data stream at appropriate locations to thereby generate an output data stream in the target delimited data format.

Figure 28:
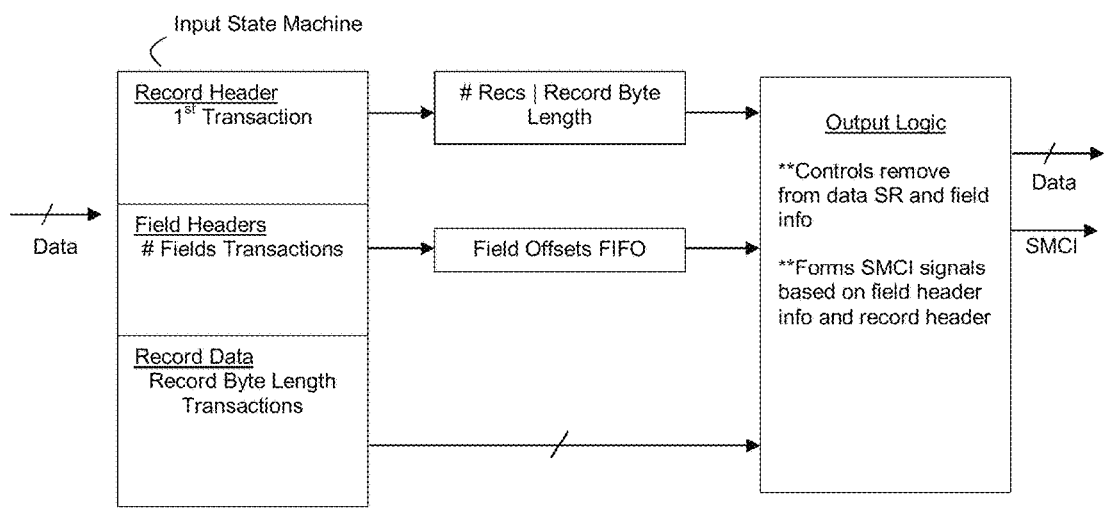
FIG. 28 depicts an exemplary mapped-to-variable (M2V) module.

FIG. 28 depicts an exemplary embodiment for the M2V module. Incoming data is processed by an input state machine to interpret the record header and field header of each record to identify where the field boundaries in the data exist. Record header data and field header data are stored in staging registers. Output logic can process the data in the various registers to remove the header data and generate appropriate SMCI control data for the field data that is parsed directly from the input stream.

Additional Translations Supported by a Translation Engine 202 or 400:

Each embodiment described above leverages the internal variable format using SMCI protocol to translate data from a first format to a second format. That is, the VRG module converts data in a delimited data format to data in the internal variable format having the SMCI protocol. The F2V module converts data in a fixed field format to data in the internal variable format having the SMCI protocol. The M2V module converts data in a mapped variable field format to data in the internal variable format having the SMCI protocol. Also, The VIRG module converts data in the internal variable format having the SMCI protocol to data in the delimited data format. The V2F module converts data in the internal variable format having the SMCI protocol to data in the fixed field format. The V2M module converts data in the internal variable format having the SMCI protocol to data in the mapped variable field format. Thus, given the commonality of the internal variable format having the SMCI protocol, this means that the VRG, F2V, M2V, VIRG, V2F, and V2M modules can be mixed and matched in processing pipelines to achieve any of a number of desired translations. So, by simply rearranging the translation pipeline using the modules described above, the translation engine 400 or 202 may translate any of a number of first data formats to any of a number of second data formats. As examples, a translation engine 202 or 400 can be configured to translate incoming data in a fixed field format to outgoing data in a mapped variable format and/or translate incoming data in a mapped variable field format to outgoing data in a fixed field format.

If, for an embodiment where data in a mapped variable field format is received, it is desired to translate this data to a fixed field format, the translation engine 400 or 202 can be configured with a pipeline 3100 of processing modules that comprise the M2V module and a V2F module downstream from the M2V module, as shown by FIG. 31. Each module can be configured to operate in parallel in a pipelined manner. As described in connection with FIGS. 27-28, the M2V module may convert incoming mapped variable field format data to the variable format having the SMCI protocol. Moreover, as described in connection with FIGS. 11 and 17(a), the V2F module may convert data in the variable field format having the SMCI protocol into fixed field data. Such an exemplary pipeline 3100 can be deployed by a translation engine 400 or 202 for this purpose. Moreover, it should be understood that the V2F module need not necessarily be directly connected to the output of the M2V module. For example, it may be the case that an intervening module exists in the pipeline 3100 to perform a desired operation on the data output by the M2V module.

If, for an embodiment where data in a fixed field format is received, it is desired to translate this data to a mapped variable field format, the translation engine 400 or 202 can be configured with a pipeline 3200 of processing modules that comprise the F2V module and a V2M module downstream from the F2V module, as shown by FIG. 32. Each module can be configured to operate in parallel in a pipelined manner. As described in connection with FIGS. 18-19, the F2V module may convert incoming fixed field format data to the variable format having the SMCI protocol. Moreover, as described in connection with FIGS. 23 and 26, the V2M module may convert data in the variable field format having the SMCI protocol into mapped variable field format data. Such an exemplary pipeline 3200 can be deployed by a translation engine 400 or 202 for this purpose. Moreover, as with the example of FIG. 31, it should be understood that the V2M module need not necessarily be directly connected to the output of the F2V module. For example, it may be the case that an intervening module exists in the pipeline 3200 to perform a desired operation on the data output by the F2V module.

Further still, it should be understood that translation engine 400 need not perform the complementary inverse of the translation performed by an upstream translation engine 202. That is, translation engine 202 can be configured to translate incoming data in a delimited data format to data having a fixed field format (for processing by a data processing stage 300), while translation engine 400 can be configured to translate the fixed field data exiting the data processing stage 300 to a mapped variable format. Similarly, translation engine 202 can be configured to translate incoming data in a fixed field format to data having a mapped variable field format (for processing a data processing stage 300), while translation engine 400 can be configured to translate the mapped variable field data exiting the data processing stage 300 to a delimited data format.

Multi-Layout File Processing

Records analyzed by the translation engine 202 or 400 may have varying formats, as described above in detail. As another challenge, records analyzed by the translation engine 202 or 400 may also have varying layouts for a given format. That is, for some embodiments, it may be the case that a data stream may include a plurality of records in a given data format (e.g., fixed field, mapped field, or delimited), but these records to be translated or otherwise processed may exhibit various layouts.

FIGS. 33(a) and 33(b) illustrate examples of two fixed field records with different record layouts. As shown in FIG. 33(a), a first fixed field record layout has six fields, and each field has different lengths (as illustrated by the width of each rectangle representing a field). As shown in FIG. 33(b), a second fixed field record layout has four fields, and each field is the same size in terms of number of bytes. While this example discussed fixed field record layouts, it should be understood that different record layouts may also exist for data in a mapped variable field format and data in a delimited data format. Further still, the differences in record layouts need not be differences with regard to the number or length of the fields. For example, the differences between layouts could be different data types in various fields (e.g., numeric versus ASCII text data, differences in permissible characters or numerals in certain fields, etc.) For example, a first record layout may be for a medical record (where Field 0 contains a patient's name, Field 1 contains text describing a known medical allergy for the patient, Field 2 contains the patient's street address, Field 3 contains the patient's city, Field 4 contains the patient's state, and Field 5 contains a patient's zip code) while a second record layout may be for a cell phone customer record (where Field 0 contains the customer's name, Field 1 contains the customer's cell phone number, Field 2 contains the customer's street address, Field 3 contains the customer's city, Field 4 contains the customer's state, and Field 5 contains a customer's zip code). To distinguishing characteristic between these two record layouts may be that Field 1 for the medical record layout is a text field that may contain any of a number of alphanumeric characters while Field 1 for the cell phone customer record is a numeric field whose values may only include integers between 0-9. To facilitate proper translation and/or targeting of downstream processing, it is desirable for a translation engine 202 or 400 to recognize different record layouts for incoming data. It is also desirable for the translation engine 202 or 400 to be able to adapt on-the-fly to layout changes without lengthy hardware and/or software reconfigurations.

The record layout describes information about the record for downstream processing modules, and knowledge of the layout allows for different processing rules to be performed on the data based on a determined layout. The layout of a record may be user-defined, and based on the user-defined layout, a processing module may specify from a broad range of layout formats while being agnostic to the input file format. For example, layouts can be constructed from user-specific input clauses put together by Boolean logic (e.g. byte_offset[16:19]=="ABCD" AND IS_NUMERIC(byte_offset[3:0])=="TRUE").

Such a layout agnostic system allows a computing system, such as a reconfigurable logic device, to process records that may exhibit different numbers of fields, field lengths, and/or data types in a common stream while detecting the layout type. After the layout type has been detected, the computing system may apply different processing rules based on the detected layout type.

Specifying the Rules for Layouts

A user may specify a number of input record layouts that describe the set of legal record layouts for a given general input data format in the input stream. Along with each record layout, the user can specify a set of Boolean logic expressions, each of which describes when a particular record layout is recognized. Each Boolean logic expression can be made up of one or more predicates that contain a named field reference, an operator, and either a constant-valued expression or a data type classification such as "numeric". Examples of operators include equals (==), greater than (>), greater than or equal (>=), check if the field is of numeric type (isNumeric( )), etc. A predicate is a short statement that, when evaluated, returns true or false based on the outcome of the comparison. These predicates can then be fed in to a larger Boolean expression that completely specifies a given Layout ID.

FIG. 34(*a*) shows an example input specification that serves to distinguish between two fixed field record layouts. The layout blocks in FIG. 34(*a*) describe the valid field byte offsets from the beginning of the record, the length of each field, and the type of the data contained in the field for each layout. Following that layout description, the detection rule section includes the criteria used to detect the layout of incoming data elements. The user describes one detection rule block for each layout. This completely describes the Boolean expression that, when true, specifies which layout a given record belongs to. Note that it is possible for there to be a "tie" when two Detection_Rules blocks resolve to the same byte offset values. In this case, an ambiguity resolution mechanism can be employed, such as a rule where the first one specified in the input file will always be chosen by the detector. This is essentially a priority encoding of the Detection_Rules section depending on the order in which they are specified in the input configuration file. However, it should be understood that alternate techniques could be employed, including flagging such ambiguous records as errors to be processed outside the system.

FIG. 34(*b*) shows an example of the layout and detection rules for mapped and delimited input data. Note that in the case of delimited and mapped input formats, the number of fields in the record is discovered in the record parsing process. Also, the field lengths can vary from record to record. In the case where the number of bytes in the field is fewer than the user specified constant in the Boolean expression or the field does not exist in the record the expression will evaluate to false and that layout will not be chosen.

The detection logic for record type identification can be compiled into a Boolean logic tree for each detection rule. For software layout detection, each tree can be evaluated in the order specified via a configuration file, and the first that evaluates to "true" specifies the layout. When using hardware layout detection, the individual expressions can be further compiled into a Lookup Table. The inputs to this LUT are the output of the evaluation of each predicate. The output of the LUT is the "true" or "false" for that detection rule.

Also note that as an optional enhancement to this step, the detection rules could optionally be compiled together into a single logic tree that is traversed in one step to determine record layout. This could also be broken into lookup tables for hardware acceleration.

The computing system may detect the layout type using a combined software and hardware approach or exclusively using hardware. Either the software/hardware layout detection technique or the hardware layout detection technique may be applied to the existing processing pipelines described above. Further, both layout detection techniques can detect a layout in any of the three data formats described above (delimited, mapped, fixed field). However, the precise technique for detecting the layout varies depending on the input data format, as described herein.

Multi-Layout File Processing: Software Embodiment—Fixed Field

Figure 35:
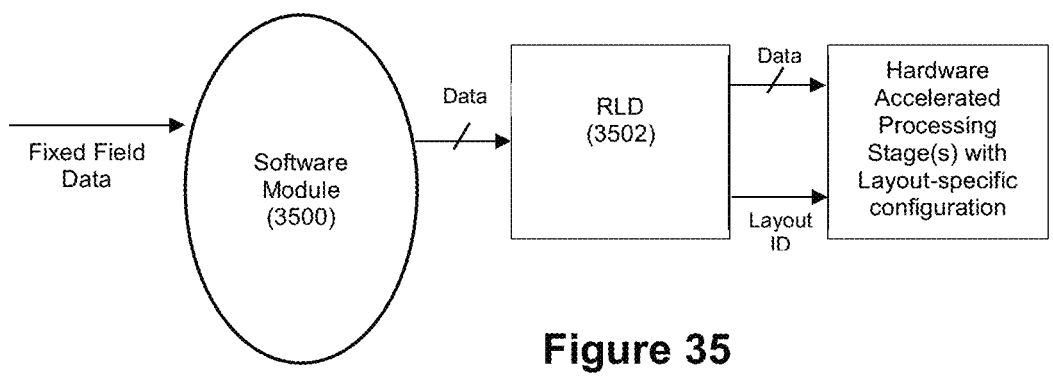
FIG. 35 depicts an example record layout detection pipeline for a hybrid software/hardware embodiment that processes incoming fixed field data.

In the software embodiment, the configuration of the processing pipeline depends on the input data format. FIG. 35 illustrates the processing pipeline for fixed field input data. The fixed field input data processing pipeline includes a software module 3500, a hardware record layout detector (RLD) 3502 downstream from the software module 3500, and various other hardware-accelerated stages, which may include any of the hardware accelerated modules and stages described above or any combination of the hardware accelerated modules and stages. As an example, the hardware RLD 3502 can be implemented in reconfigurable logic, such as a field programmable gate array (FPGA).

As a beginning step, the software module 3500 parses through the input data. Because the input data is fixed field, the software does not need complex parsing, and the data stream may be operated on directly. While parsing the data, the software module determines the record layout based on input rules defined by a set of Boolean predicates as discussed above in connection with FIGS. 34(*a*) and (*b*). For example, predicates may include a Boolean determination as to whether a field length is a certain length, whether a field or byte offset contains ASCII or numeric text, or whether a field contains a specific string, etc. An evaluation of a predicate returns either a true or false signal that can be combined with other predicates to determine a layout. A configuration table can store the layout specifications, and the software module can load the predicates and rules from the configuration table to define how the software module will analyze the incoming data. Thus, the software module can be adapted to detect new record layouts by simply changing the content of the configuration table.

After the software module determines the record layout using the predicates, the software module prepends the record header with a Layout ID. For fixed field data, the record header may be 8 bytes long at the beginning of each record, and the four most significant bytes of the record header may indicate the record length, while the least significant four bytes of the header may indicate the Layout ID.

After the software module prepends the header, the software module may pass the prepended record to the RLD hardware module 3502. The RLD hardware module 3502 examines the least significant four bytes of the record header and generates a Layout ID signal. The Layout ID signal generated by the RLD can be added to a subset of the SMCI protocol signals that may accompany the outgoing data.

Figure 36A:
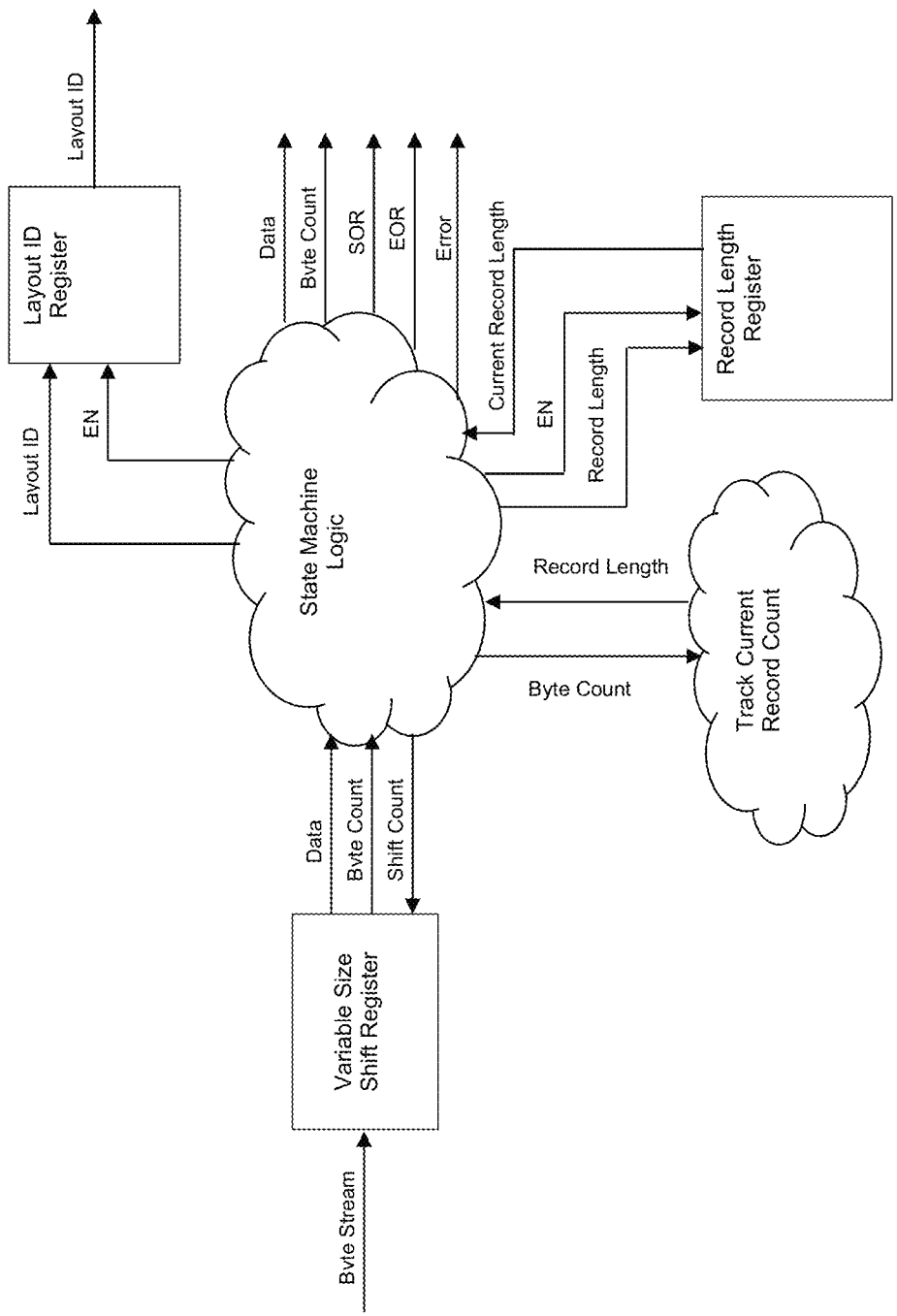
FIG. 36(a) depicts an exemplary architecture for a hardware record layout detection module in connection with the example of FIG. 35.

FIG. 36(a) depicts an example embodiment for the RLD 3502. With RLD 3502, the data streams into a shift register logic component, which can be a variable size shift register. The shift register logic takes in up to N bytes per clock cycle and shifts out 0 to N bytes per clock cycle as requested by downstream logic. N can be configured during logic synthesis. This component allows the RLD 3502 to control the amount of data pulled from the input stream per cycle and dynamically separate record boundaries. The amount of data pulled from the shift register is controlled by state machine logic. At the beginning of each record, the state machine logic parses the Layout ID and Record Length out of the header for the incoming data. The state machine has three states: (1) S_PARSE_HEADER, (2) S_OUTPUT_ERROR, and (3) S_OUTPUT_RECORD, as shown by FIG. 36(b).

Figure 36B:
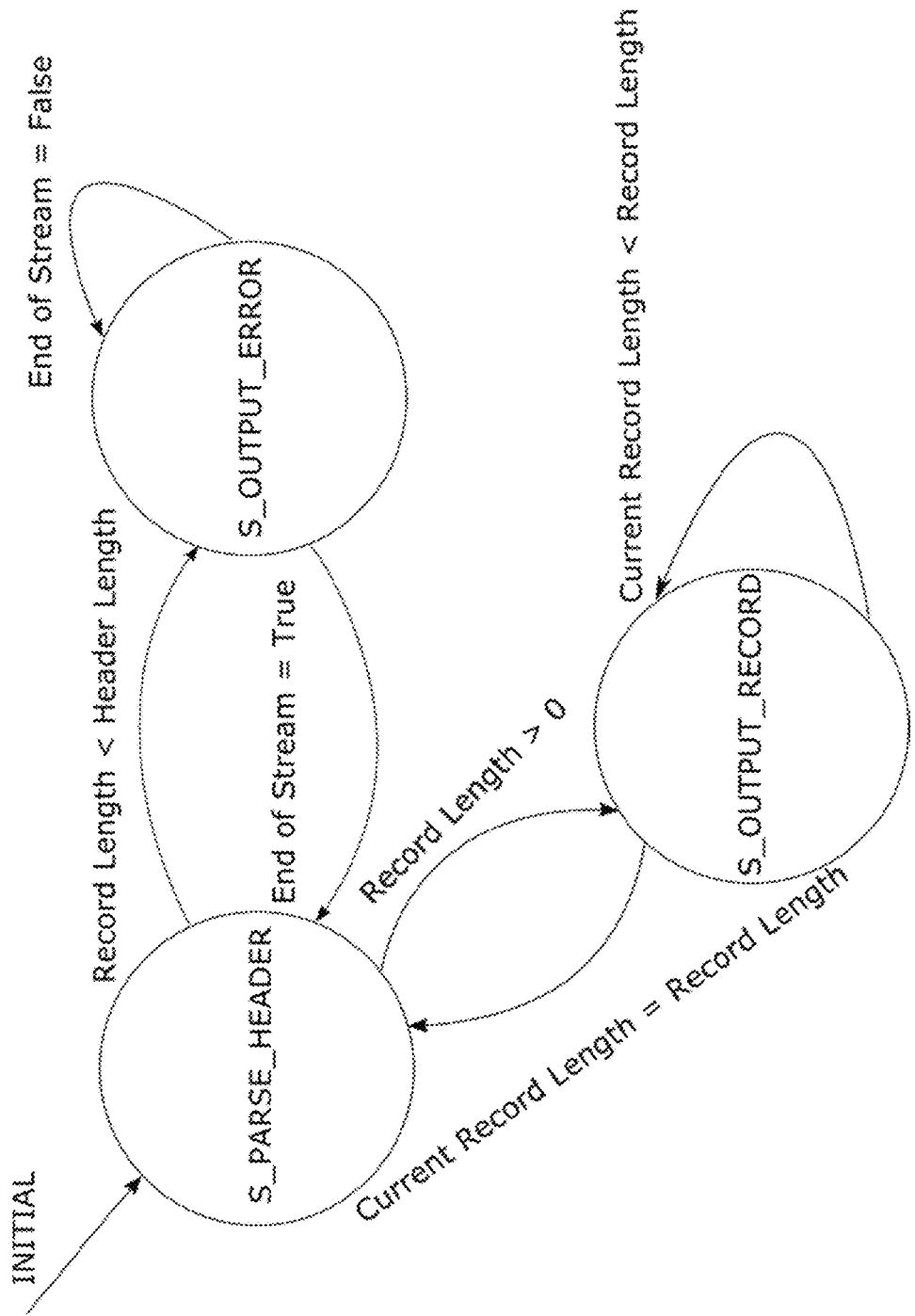
FIG. 36(b) depicts an exemplary state machine for the record layout detection module of FIG. 36(a).

With reference to FIG. 36(b), the state machine logic is initialized to the S_PARSE_HEADER state. It performs bounds checking on the header length since there are illegal length values possible. In this scenario the header is specified to be a fixed (but configurable) number of bytes and the record length includes the header bytes in the record byte count. There is an error condition where the record length value is specified to be less than the header length and therefore cannot be correct. If this case is detected, the state machine transitions to the S_OUTPUT_ERROR state and immediately inserts an error command into the stream. This indicates to the downstream processing modules (and possibly eventually to software) that the data that follows is not able to be processed. Then, the rest of the data is streamed out unprocessed until the end of the stream is received and transitions back to the S_PARSE_HEADER_STATE.

In the case where the headers are correctly formed, the state machine logic transitions to the S_OUTPUT_RECORD state. In this state the layout ID and the record length are stored in registers for the duration of that record. A counter is initialized to count up the amount of data that has been streamed. The data is then streamed out, with appropriate start of record (SoR) signals and layout ID, set on the output bus. Once the counter matches the record length, the end of record (EoR) signal is set for the final transaction on the bus for the current record. The state machine logic then transitions back into the S_PARSE_HEADER state.

As discussed below, RLD 3502 can be characterized as a RLD in a first mode (or "Mode 1").

Multi-layout File Processing: Software Embodiment—Mapped Variable Field

Figure 37:
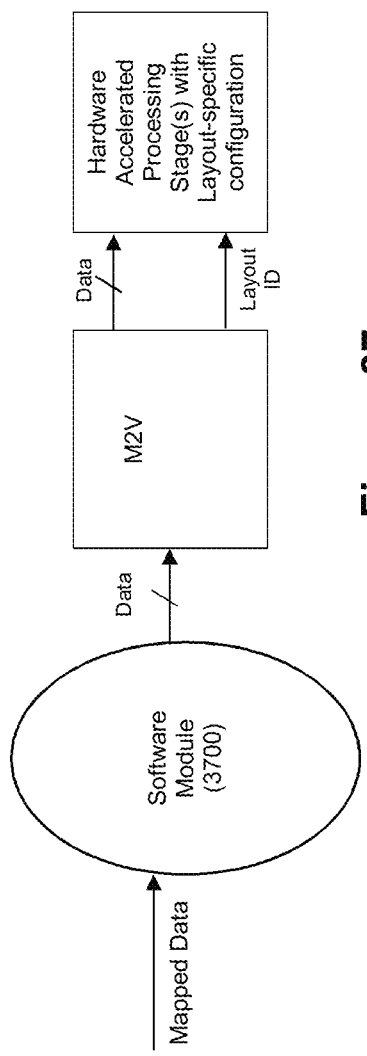
FIG. 37 depicts an example record layout detection pipeline for a hybrid software/hardware embodiment that processes incoming mapped field data.

In another software embodiment, FIG. 37 illustrates a configuration of a processing pipeline for data in a mapped variable field format. The mapped data input processing pipeline includes a software module 3700, an augmented M2V module, and various other hardware-accelerated stages, which may include any of the hardware accelerated modules and stages described above or any combination of the hardware accelerated modules and stages.

Like the fixed field software module, the software module 3700 illustrated in FIG. 37 parses the input data. Because the input data is mapped, the software does not need complex parsing, and the data stream may be operated on directly. While parsing the data, the software module determines the record layout based on the input predicates. After the software module determines the record layout, the software module prepends the record header with a Layout ID. For mapped data, as an example, a 4 byte Layout ID can be added as the second word in the record.

After the software module prepends the header, the software module may pass the prepended record to the augmented M2V hardware module. The augmented M2V hardware module may operate similarly to the M2V module described above with reference to FIG. 27, although the augmented M2V module in FIG. 37 may include additional logic to process the Layout ID header field and generate the Layout ID signal for the record in a manner similar to that for RLD 3502.

In an alternate design, a header for the mapped field data can be designed to place the layout identification in the same position as it exists for the fixed field example above, in which case an RLD 3502 can be positioned between the software module and the M2V module. In another alternate design, an RLD similar to the RLD 3502 can be positioned between the software module and the M2V module, where the similar RLD is configured to target the layout information in the incoming header.

Multi-Layout File Processing: Software Embodiment—Delimited Format

Figure 38:
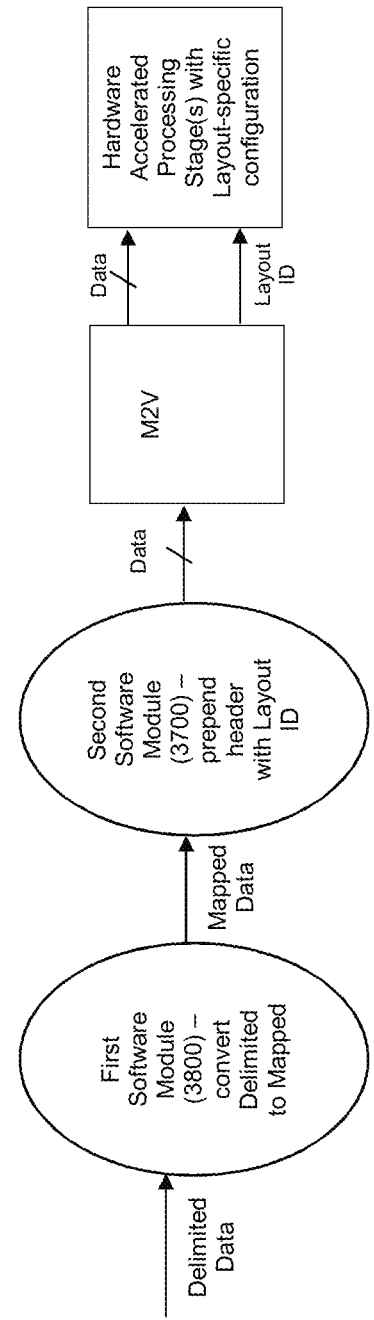
FIG. 38 depicts an example record layout detection pipeline for a hybrid software/hardware embodiment that processes incoming delimited data.

In another software embodiment, FIG. 38 illustrates a configuration of a processing pipeline for data in a delimited data format. The delimited data format software embodiment includes the same modules as the mapped software embodiment, except the delimited software embodiment further includes a software module 3800 at the beginning of the processing pipeline that converts the delimited data into mapped data. It should be understood that the software module 3800 could be replaced with a hardware pipeline for translating the delimited data to the mapped data.

Delimited input data poses a performance challenge because every byte in the input stream must be inspected. In this embodiment, the second software module 3700 separates the task of parsing the input data from detecting the record layout. The second software module 3700 in FIG. 38 parses each record to process the portions referenced by the user input predicates to determine the Layout ID. After the second software module determines the layout, the second software module may add the Layout ID as a header to the converted mapped data. The first and the second software modules 3700 and 3800 may be pipelined to improve performance, but the performance of the software module is expected to be much slower than the performance of a purely hardware module because, relative to hardware implementation, checking against multiple predicates while parsing each byte of data operates slowly in software.

As mentioned above in connection with FIG. 37, in an alternate design, a header for the delimited data can be designed to place the layout identification in the same position as it exists for the fixed field example above, in which case an RLD 3502 can be positioned between the software module 3700 and the M2V module. In another alternate design, an RLD similar to the RLD 3502 can be positioned between the software module 3700 and the M2V module, where the similar RLD is configured to target the layout information in the incoming header.

Multi-Layout File Processing: Hardware Embodiment

Figure 39:
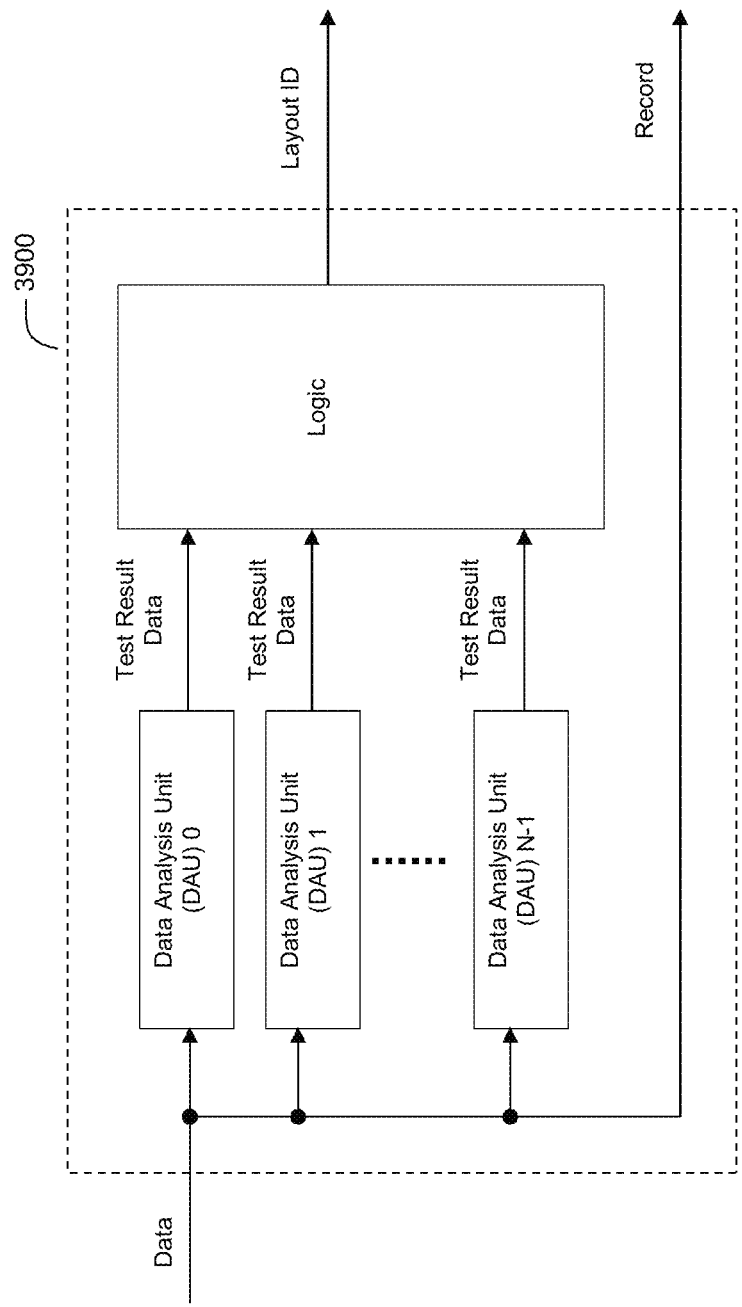
FIG. 39 depicts another exemplary architecture for a hardware record layout detection module.

To accelerate record layout detection, the RLD can be implemented in hardware. As an example, the RLD can be implemented in reconfigurable logic, such as an FPGA. It should also be understood that the RLD could be deployed on platforms such as GPUs, multi-core processors, and/or cell processors to provide acceleration. FIG. 39 depicts an example hardware architecture for an RLD 3900. The RLD 3900 may comprise a plurality of data analysis units (DAUs) arranged in a parallel orientation, and a logic component downstream from the DAUs. The DAUs can process an incoming record in parallel to test the record data against the layout specification predicates described above in connection with FIGS. 34(a) and (b). Thus, the DAUs can output test result data for each predicate condition in parallel to the logic component. The logic component in turn can analyze the test result data from the various DAUs to determine whether all of the conditions for any of the record layouts have been met. If so, the RLD can output a record layout identifier in association with the subject record. The nature of the test operations performed by the DAUs and the combinatorial logic implemented by the logic component can be defined by the predicate data for the various layouts under consideration and stored in a configuration table.

Figure 40:
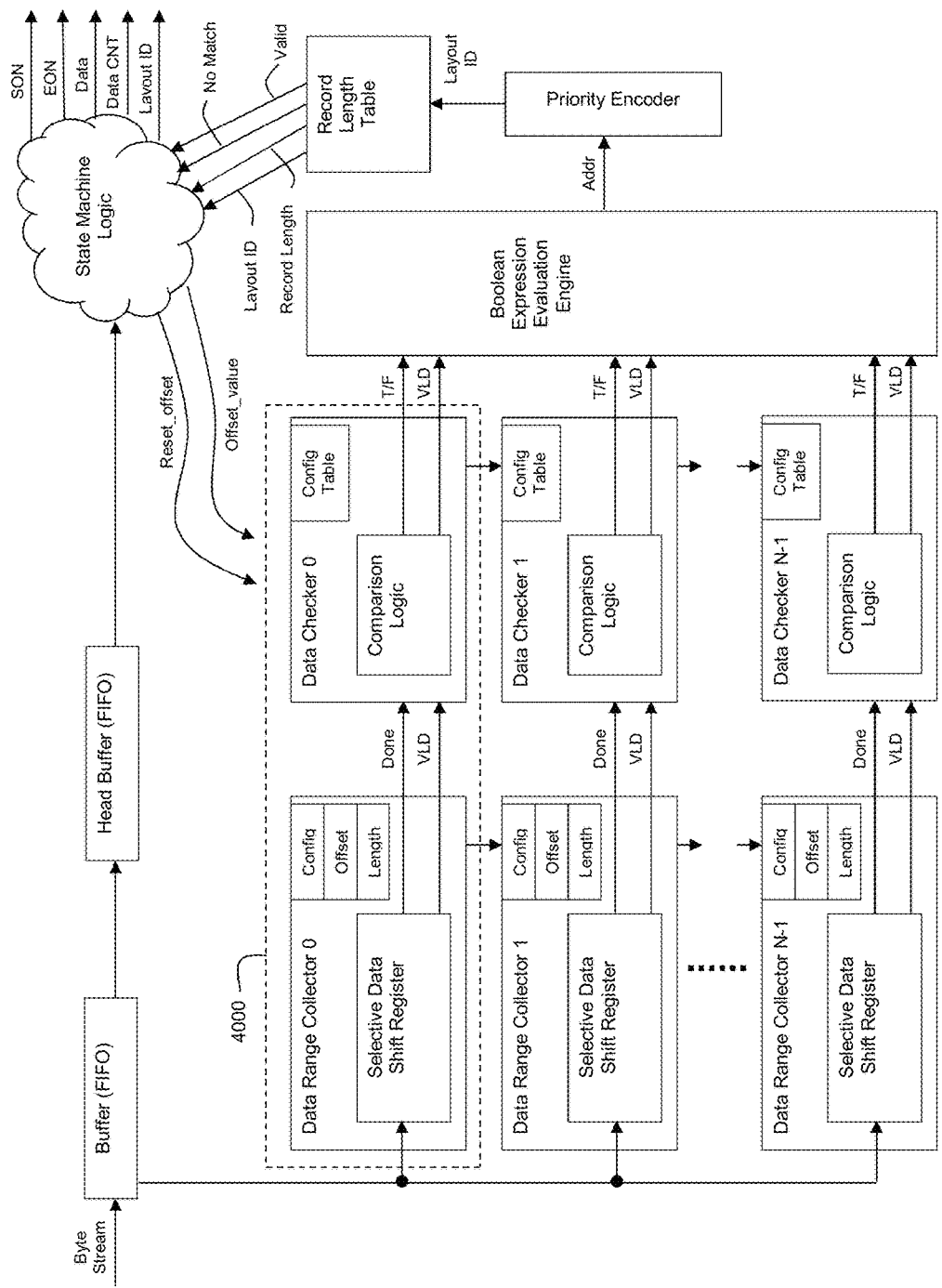
FIG. 40 depicts an exemplary hardware architecture for a hardware record layout detection module that processes incoming fixed field data.

FIG. 40 illustrates an example embodiment for the RLD 3900 where the RLD is configured to process incoming fixed field data. In this example, each DAU is a predicate evaluation logic pipeline that comprises a Data Range Collector and a downstream Data Checker. Furthermore, the logic component in this example comprises a Boolean Expression Evaluation Engine, a Priority Encoder, a Record Length Table, and State Machine Logic.

As shown by FIG. 40, the data stream is buffered in a FIFO and then fed into a number of Predicate Evaluation Logic pipelines 4000. The outputs of all these pipelines are then evaluated in a Boolean Expression Evaluation Engine, followed by a Priority Encoder which then determines the layout ID. The layout ID is then fed into a record look up table as the address. The output of this table is the record length, layout ID, and an error signal to indicate if none of the Boolean logic expression matched.

To evaluate each Boolean logic predicate, the data is streamed to each Predicate Evaluation Logic pipeline in parallel. The RLD logic can evaluate up to N Boolean logic predicates in parallel, where N is a compile time parameter. Each Predicate Evaluation Logic pipeline 4000 contains one Data Range Collector and a downstream Data Checker. The Data Range Collector is configured before each run to determine which byte offsets from record start it should send on its output. This is accomplished in a Selective Data Shift Register which buffers a window of the data and provides taps to offsets within the window. Once the data for the predicate has been gathered, it is sent to the Data Checker in parallel along with a valid signal. The Data Checker logic evaluates the predicate to true or false by comparing data observed in the data stream to constant values set up before streaming the data. The type of comparison is also based on an operation code from the configuration table. The Data Checker uses these inputs, evaluates the predicate, and controls a true_false signal to indicate the result of the evaluation and a vld (i.e. valid) signal to indicate that the expression evaluation has finished. The valid signal thus serves to identify when the true_false signal will truly be indicative of whether the subject predicate is in fact true or false with respect to the record.

The outputs of all the Predicate Evaluation Logic pipelines are then fed in to the Boolean Expression Engine. This engine takes in a configuration that is the result of the compiled user rules from a configuration table/file and outputs an address that represents which Boolean expressions were valid. The Boolean Expression engine can be implemented as a set of Lookup Tables that encode the Boolean logic for small input sizes or a hashing scheme can be used to scale to larger numbers of expressions. The output is then fed to the priority encoder which chooses the preferred expression based on the order the user specified the expression in the configuration file/table. The output of this is the assigned Layout ID used directly as the address into a Record Length Table. The Record Length Table is populated before the data is streamed to the FPGA and contains the byte lengths of the records for each layout. It also contains a "No Match" bit that indicates that the Layout ID is not valid and that the input record did not match any of the available layouts. A valid signal is also used to indicate that the layout has been determined. These outputs are sent as inputs to the State Machine Logic which then generates the outgoing record with an accompanying Layout ID.

The State Machine (SM) Logic controls how much data to read out of the Head Buffer FIFO, setting the SoR/EoR signals, Layout ID, and when to reset the Predicate Evaluation Logic offset. The reset of the Predicate Evaluation Logic enables the data range collectors to properly track the byte offsets of each incoming record. The SM Logic has three states: S_IDLE, S_DATA and S_ERROR. Upon reset, the state is set to S_IDLE. If a Valid signal is received from the Record Length Table with No Match logic high, the state machine transitions to the S_ERROR state. In this state, an error command is inserted into the stream and then all data is passed through until the end of stream is reached then the state transitions to S_IDLE. If a Valid signal is received with No Match low, it transitions to the S_DATA state. On transition from S_IDLE to S_DATA, the record length and layout ID are stored in registers. A counter is initialized and data is streamed out of the module for the current record. The Predicate Evaluation Logic pipelines are then sent the record length value and they reset their state to know on which byte to start looking for the next record. When the counter reaches the record length, the state machine transitions to state S_IDLE and begins processing the next record.

As discussed below, RLD shown by FIG. 40 can be characterized as a RLD in a second mode (or "Mode 2").

A hardware RLD similar to that shown by FIG. 40 can be used to processed incoming data in a mapped format or a delimited data format. Such a hardware RLD that processes incoming data in a mapped format or a delimited data format can be characterized as a RLD in a third mode (or "Mode 3").

Figure 41:
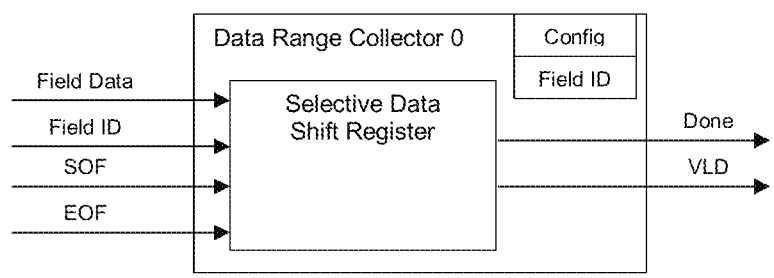
FIG. 41 depicts an example of a data collection component that can be used in an embodiment of a hardware record layout detection module that processes incoming mapped field data or delimited data.

As noted, for the hardware RLD operating in Mode 3, the majority of the logic is shared with Mode 2. However, instead of collecting arbitrary byte offsets from the beginning of the record, the data range collectors collect an entire field before sending the data to the data checker. For Mode 3, the data range collector configuration table holds field indexes instead of the byte offsets and lengths as in Mode 2. FIG. 41 depicts an example of a data range collector for a Mode 3 embodiment, where a configuration table stores a field identifier used by the selective data shift register to target a field of interest. While this simplifies the logic somewhat, having variable-sized fields leads to a complication: the field size may contain more bytes than the buffer has capacity for. In this case, we take the first n bytes of the field and use that for the comparison, where n is the compiled size of the data collector buffers. Mode 3 introduces another error condition due to the unbounded size of the record. If the Head buffer FIFO is full and the layout has not been detected, then the record is streamed out with a "large record" error command prepended to the stream. To handle this case, the state machine takes in the full signal from the Head Buffer FIFO and evaluates for this condition. If none of the Boolean expressions evaluate to true, the record is sent out with a "bad expression" error command prepended. Note that we are able to simply move to the next record here since we know the record boundaries (i.e. only the current record need to be discarded, the detection can resume on the next record).

In the hardware embodiment, the RLD for either Mode 2 or Mode 3, joins the hardware data pipeline to determine the record's layout. The location of the RLD in the pipeline depends on the input data format (delimited, fixed field, or mapped).

Figure 42:
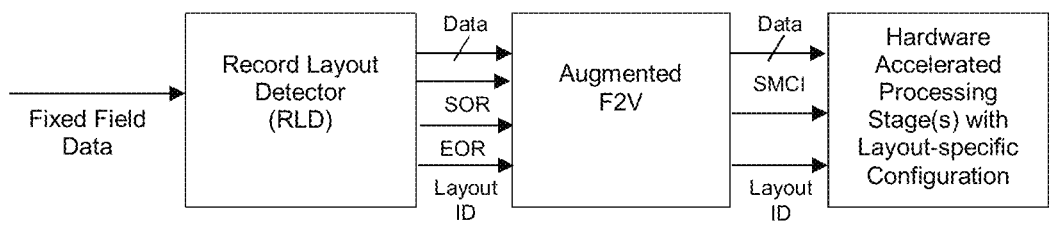
FIG. 42 depicts an example of a pipeline that includes the record layout detector for processing fixed field data.

To process multi-layout fixed field data input on the data stream directly in hardware, the RLD detects the layout before any other modules of the pipeline. FIG. 42 illustrates a layout detection pipeline for fixed field format input data. The pipeline of FIG. 42 includes the RLD for "Mode 2", an augmented F2V module, and various other hardware-accelerated stages, which may include any of the hardware accelerated modules and stages described above or any combination of the hardware accelerated modules and stages. The RLD may be configured to detect the record layout and generate a Layout ID signal, which may be used by the subsequent pipeline modules to perform layout-specific processing based on the Layout ID. The augmented F2V module is similar to the F2V module described above in that the augmented F2V module converts the data from a fixed field format to the variable format having the SMCI protocol, however, the augmented F2V module also receives the Layout ID signal as an additional input (as well as SOR and EOR signals as additional inputs), and it uses the Layout ID to look up the size of the fields for the record layout specified by the Layout ID in a look-up table (LUT) stored within the augmented F2V.

Figure 43:
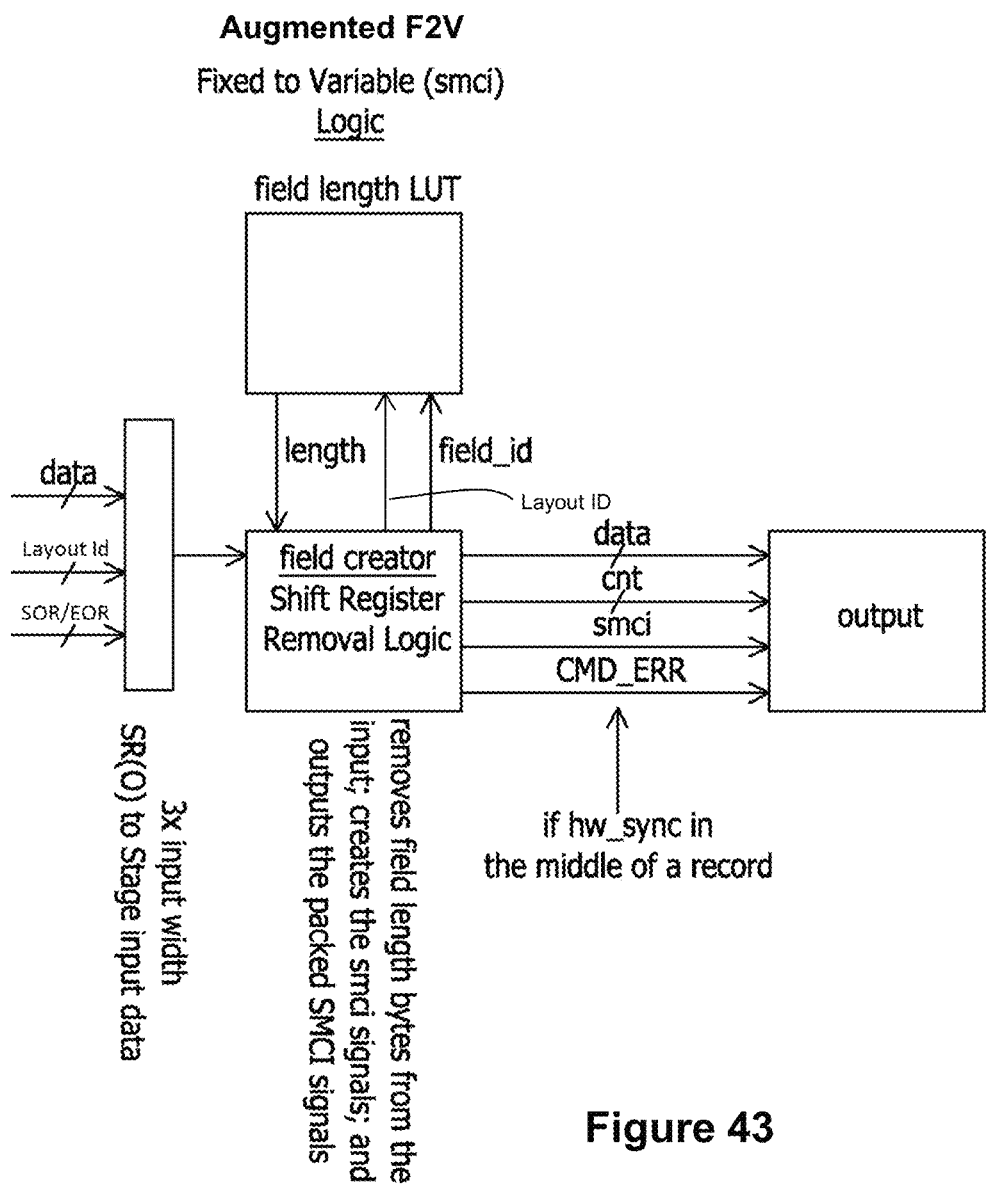
FIG. 43 depicts an example of an F2V module augmented to take into consideration record layout.

FIG. 43 illustrates the augmented F2V module. As mentioned, in operation, the augmented F2V operates similarly to the F2V in FIG. 19. However, the augmented F2V also receives the Layout ID signal, and an SOR/EOR signal. The augmented F2V may create the field length LUT based on user input regarding the different types of record layouts. For example, the user input the two record layouts illustrated in FIGS. 33(a) and (b), and the augmented F2V may store the first and second record layouts illustrated in FIGS. 33(a) and (b) in the LUT. Further, the Layout ID may assist in determining the length of the field sizes in the fixed field data. Based on these inputs, the augmented F2V may convert the fixed field data into the variable format having SMCI control protocol in the same way as described above with reference to FIG. 19.

Moreover, it should be understood that the other processing modules described above with respect to translation engines 202 and 400 can be augmented so that field-specific operations are augmented to take into consideration field lengths and the like that vary by record layout. Typically, this can be handled by using the Layout ID as an index into a properly configured LUT that identifies field lengths and the like by record layout.

Figure 44A:
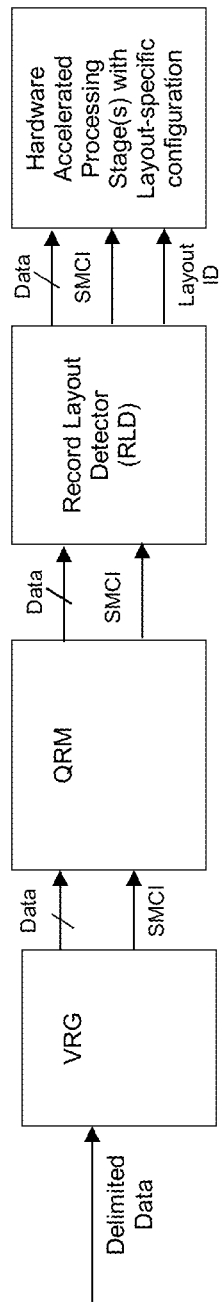
FIG. 44(a) depicts an example of a pipeline that includes the record layout detector for processing delimited data.

To process multi-layout delimited data input in the data stream directly in hardware, the delimited parsing modules (VRG and QRM) remain at the front of the processing pipeline. FIG. 44(a) illustrates a layout detection pipeline for delimited data. The pipeline of FIG. 44(a) includes the VRG module, the QRM module, the RLD operating in a third mode, and various other hardware-accelerated stages. The VRG module and the QRM module operate the same as the VRG module and the QRM module described above in FIG. 11. The RLD follows the VRG and QRM modules in the processing pipeline and performs layout detection.

Figure 44B:
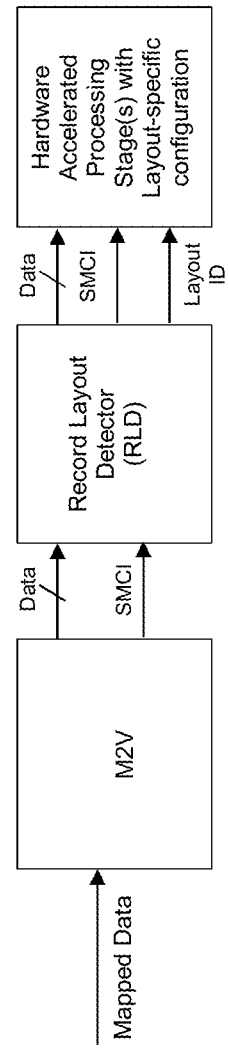
FIG. 44(b) depicts an example of a pipeline that includes the record layout detector for processing mapped field data.

To process multi-layout mapped variable data input on the data stream directly in hardware, a very similar pipeline process to that in FIG. 44(a) is used. FIG. 44(b) illustrates a layout detection pipeline for delimited data. The pipeline of FIG. 44(b) includes the M2V module, the RLD operating in the third mode, and various other hardware-accelerated stages. The M2V module operates the same as the M2V module described above in FIG. 27. The RLD follows the M2V module and performs layout detection.

Figure 45:
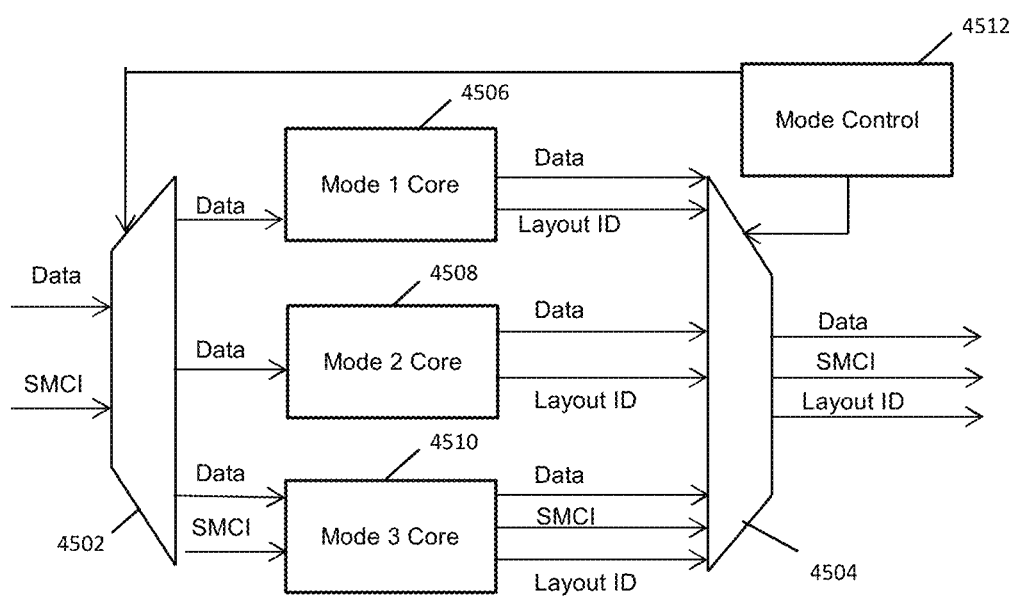
FIG. 45 illustrates an exemplary multi-mode record layout detector.

Multi-Mode RLD:

FIG. 45 illustrates a high level view of a hardware RLD having multiple modes of operation. The RLD illustrated in FIG. 45 includes two multiplexers 4502 and 4504, three mode cores 4506, 4508, 4510, and a mode control 4512. The first multiplexer 4502 receives a data signal and an SMCI signal. In some embodiments, the SMCI signal will not contain any relevant data because no data has been converted into the internal variable format having SMCI protocol when the RLD receives the data stream, but in other embodiments, the SMCI signal may contain relevant data because a module upstream from the RLD may have previously converted the data stream into the internal variable format/SMCI. In the fixed field embodiment described above with reference to FIG. 35, the SMCI signal will not contain relevant data because the software module is not responsible for converting the fixed field data into the internal variable format with SMCI control protocol.

The first multiplexer passes the data and/or the SMCI signal to the first mode core 4506, the second mode core 4508, or the third mode core 4510 based on a signal provided by the mode control 4512. Mode control 4512 will set this mode control signal based on the nature of the data to be processed and whether the system is employing the software module pre-processing for record detection layout.

Mode core 4506 can be the "Mode 1" RLD as described in connection with FIG. 36(a). Mode core 4508 can be the "Mode 2" RLD as described in connection with FIG. 40. Mode core 4510 can be the "Mode 3" RLD described above.

After one of the mode cores 4506, 4508, 4510 has processed the data and/or the SMCI signal, the second multiplexer outputs the data signal, the Layout ID signal, and/or the SMCI signal from the mode core that based on a signal received from the mode control 4512 (where this signal controls which of the inputs to the second multiplexer is passed to the output).

Thus, with the multi-mode arrangement, an RLD module can be adaptable to operate in any of the above-described modes.

Hardware-Accelerated Data Processing Stage

Figure 29:
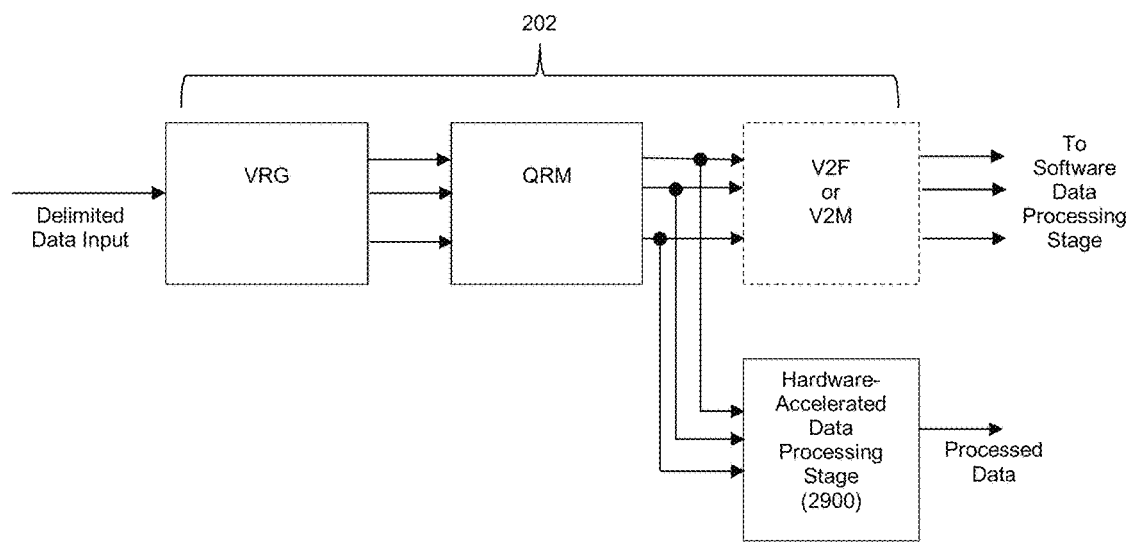
FIG. 29 depicts an example of a pipeline that can be deployed by a translation engine to convert delimited data to a structured data format, wherein a hardware-accelerated data processing stage operates on the output variable format data output from the QRM module.

It should be understood that, in embodiments where the field-specific data processing stage 300 is implemented in hardware (such as on an FPGA), the data processing stage 300 can take the form of a hardware-accelerated data processing stage 2900 as shown in FIG. 29. Such a hardware-accelerated data processing stage 2900 can tap into the output of the QRM module to operate on the data internally formatted to the SMCI protocol.

Examples of hardware-accelerated data processing that can be performed by stage 2900 include data processing operations such as regular expression pattern matching, approximate pattern matching, encryption/decryption, compression/decompression, rule processing, data indexing, and others, such as those disclosed by the above-referenced and incorporated U.S. Pat. Nos. 7,636,703, 7,702,629, 8,095,508 and U.S. Pat. App. Pubs. 2007/0237327, 2008/0114725, 2009/0060197, and 2009/0287628. This hardware-accelerated data processing can be field-specific by leveraging the information present in the SMCI signal to identify record and field boundaries.

Figure 30:
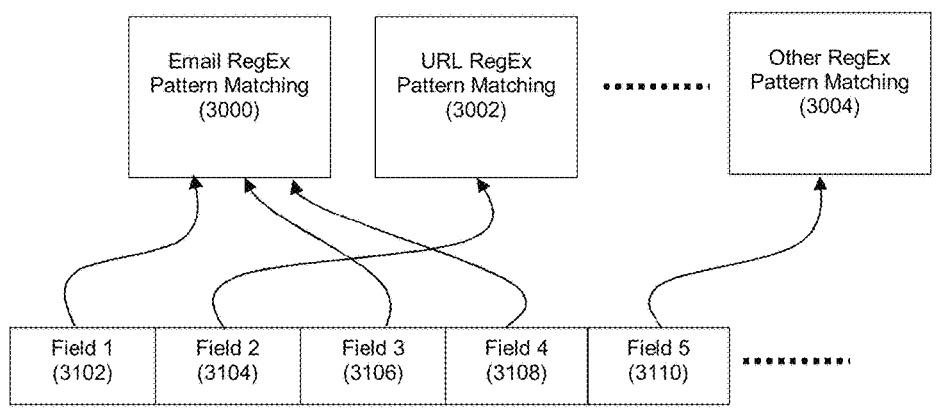
FIG. 30 depicts an example of how field-specific regular expression pattern matching can be performed by a hardware-accelerated regular expression pattern matching engine.

An example of field-specific hardware-accelerated data processing is shown by FIG. 30 with respect to regular expression pattern matching. A practitioner may have a desire to perform regular expression pattern matching with respect to different patterns for different fields of the data. Examples of different pattern types for there may be a desire to perform regular expression pattern matching include email patterns, uniform resource locator (URL) patterns, social security number (SSN) patterns, credit card number patterns, and others.

As shown in FIG. 30, different fields of the data can be mapped to different regular expression pattern matching operations. For example, Fields 1, 3, and 4 of the data can be mapped to regular expression pattern matching that is configured to detect email patterns. Field 2 of the data can be mapped to regular expression pattern matching that is configured to detect URL patterns. Field 5 of the data can be mapped to regular expression pattern matching that is configured to detect some other pattern type (e.g., an SSN pattern).

In an exemplary embodiment, several different regular expression pattern matching modules can be instantiated in the hardware platform (e.g., reconfigurable logic such as an FPGA) for operation at the same time, whereby one of the regular expression pattern matching modules is configured to detect email patterns, another of the regular expression pattern matching modules is configured to detect URL patterns, and another of the regular expression pattern matching modules is configured to detect the other pattern.

However, in another exemplary embodiment, a single regular expression pattern matching module can be instantiated in the hardware platform, such as the regular expression pattern matching module described by the above-referenced and incorporated U.S. Pat. No. 7,702,629. The transition table memory that stores data to key the regular expression pattern matching module to search for a particular pattern can then be loaded with transition data for an email pattern, URL pattern, or another pattern on an as needed basis at run-time as different fields stream through.

Selective Enabling and Disabling of Engines and Processing Modules:

It should also be understood that command data can be inserted into the data stream to enable and disable various modules of the processing pipeline deployed by the translation engine(s) as appropriate for a processing task. For example, in an embodiment where both translation engine 202 and translation engine 400 are employed (for example in reconfigurable logic), and if the destination for the delimited data is a database, a practitioner may choose to disable the translation engine 400. The disabled translation engine 400 would thus act as a pass through while remaining instantiated on the reconfigurable logic. As another example, if the incoming delimited data does not include shield characters, command data can be employed to disable the QM circuit of the VRG module and the QRM module. Such disabled modules would thus act as pass through components while remaining instantiated on the reconfigurable logic.

The command data allows a practitioner to design hardware on reconfigurable logic that includes all modules discussed above arranged in a sequence that suits the needs of a user when processing any of a number of different types of data streams. In this way, each hardware appliance may include all the modules discussed above, even if a customer using the hardware has no need for mapped variable fixed format conversions, as an example. The command data may enable and disable modules and components deployed on the hardware rather than having unique hardware configurations per user or customer. Also, the command data selectively enables and disables modules and components rather than reconfiguring the reconfigurable logic for each specific data format translation task. Such a reconfiguration of the reconfigurable logic wastes significant time when massive amounts of data must be converted or translated.

For example, if the incoming data stream is not multi-layout, the RLD module may receive a disable command signal and pass data through rather than perform layout recognition of a record. In another embodiment, if the data stream is fixed field format rather than delimited data format, the VRG and QRM modules may be disabled while a F2V module might be enabled.

Figure 22:
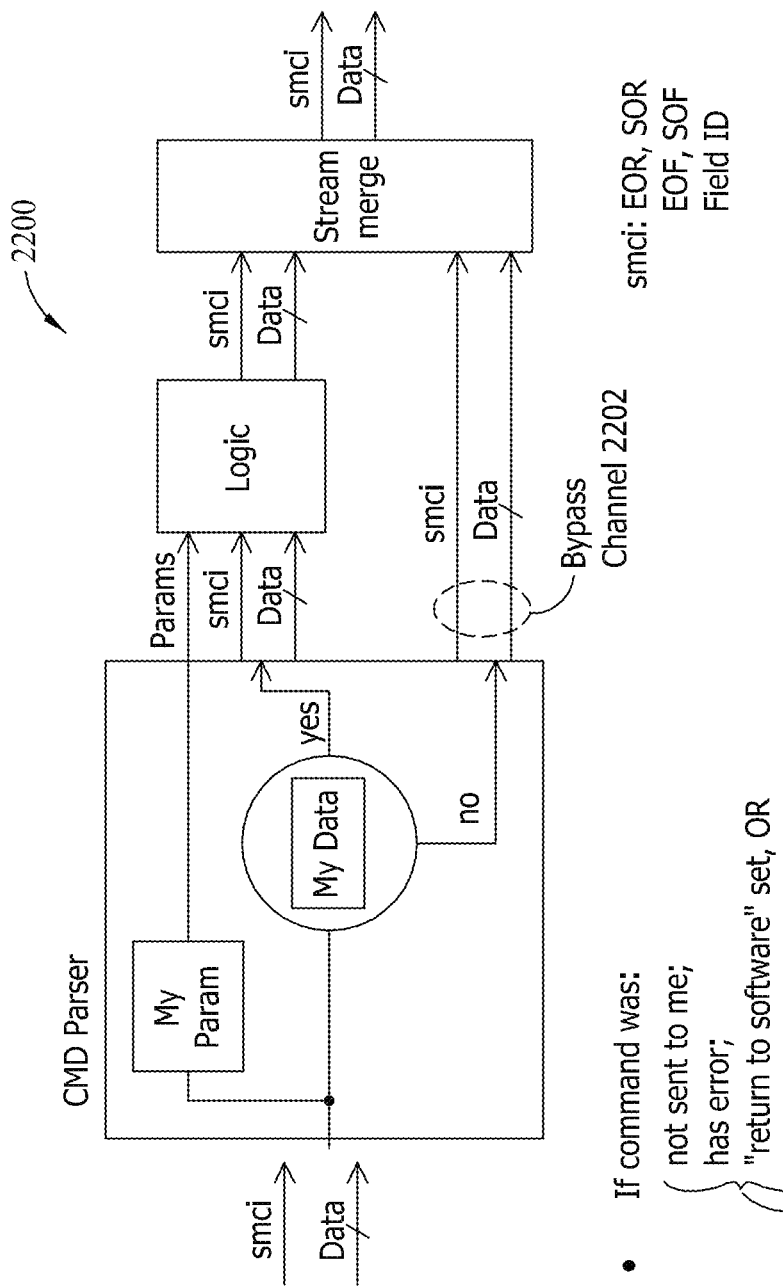
FIG. 22 depicts an exemplary arrangement for a processing module, where the processing module includes a bypass path and a processing path.

FIG. 22 depicts an exemplary arrangement for a processing module to support a selective enabling/disabling functionality. The module 2200 of FIG. 22 can include a command parser block, a logic block downstream from the command parser block, and a stream merge block downstream from the command parser block and the logic block.

The command parser block operates to receive the incoming data stream (which in this example is incoming data and associated SMCI control protocol; however, this need not be the case) and interpret the content of that stream to determine whether the incoming data is to be processed by the logic block or to bypass the logic block. Two criteria can determine whether data or commands will be processed by a module. For commands specifically, a module ID is present in a command to denote which specific module the command targets. There can be a special case for a module ID of zero that denotes the command applies to the entire chain. In addition to command routing, a context identifier can be used to denote which stream of data is currently being processed. Different modules can be bound to different contexts or streams.

Command messages are used to toggle the "plumbing" of a given module chain, turning modules ON or OFF (pass through) for a given context, and are used to mark changes in the active context. As a result, commands are sent through to set up the active data routes for a context and are used to denote which context is active. After the command setup, data will be processed by that configured chain until new commands arrive to enable/disable modules or toggle a context switch.

The command parser is responsible for inspecting command headers to note whether or not the command is intended for the given module, and it is responsible for following context switching commands that denote the active context.

When the module is in pass through, or is observing data from a context for which it is not bound, all data will be sent through the bypass channel 2202 rather than through the logic block. To disable an entire engine (such as translation engine 400), all of the modules that make up that engine can be disabled.

The logic block can implement any of the processing tasks described herein for the translation engine (e.g., the VRG module, the QM circuit, the V2F module, etc.).

The stream merge block operates to merge the output of the logic block and the information on the bypass channel to generate an output from the module. Data from the bypass channel will be given precedence over data from the logic block (if both are available), and the stream merge block is responsible for ensuring that data and commands are merged in on proper data boundaries.

Data Pivot to Accelerate Downstream Field-Specific Data Processing:

The embodiments described herein discussed downstream processing stages and modules that may operate on translated data discussed herein. For example, FIG. 3 illustrates a data processing stage 300, and other figures discuss hardware accelerated processing stages. Any of these downstream processing stages may perform computing tasks, such as address validation, email validation, date validation, query/replace, field masking/tokenization, encryption, decryption, and/or filtering/searching.

Some of these processing tasks may be targeted to specific fields in the streaming data, and the ability to pivot the streaming data to effectively group common fields between records may provide significant improvements with respect to how quickly and efficiently the field-specific data processing operations are performed.

For example, some of field-specific processing tasks may be performed by a GPU. GPUs provide thousands of cores to process data-parallel applications. The GPU operates most efficiently when all of the cores are operating on the same instructions. Instructing the GPU to operate on the same instructions can be a challenge for many computing tasks that could be accelerated with the GPU because real-world tasks typically involve many branching paths through the source code. A kernel with many branches is one example of where the benefits of using the GPU quickly diminish unless the architecture around the GPU is carefully designed.

Aggregating data with similar processing needs can help minimize branching, and thus maximize throughput, through a GPU kernel. For record-oriented data, because data operations are usually performed on a subset of specific fields, similar data may be aggregated by having software first collect one or more fields in each record and copy each field index to a host buffer to send to the GPU. This process is commonly known as a pivot operation as the "columns" gathered from the input stream are copied and stacked as "rows" on the host. As another example, software may gather social security numbers and birth dates for encryption. In this example, the software may use two pivot buffers: the first for the social security number field and the second for the date of birth field. While a GPU has been described and will be described as the exemplary processing device that performs aggregated processing, any multi-core processor may benefit from the data pivoting methods described herein. For example, a cell processor or a multi-core processor may benefit from data pivoting. In addition, this technique can be used to reduce the I/O bandwidth requirements to move data to and from a reconfigurable logic device. Also, data pivoting may be applied to more types of data than just record-oriented data.

As an example, data organized in records may need a specific field encrypted, and a GPU may efficiently perform such encryption. As an example, the GPU can be configured to perform format preserving encryption (FPE). An example of FPE is described in Vance, Joachim, "VAES3 scheme for FFX: An addendum to 'The FFX Mode of Operation for Format-Preserving Encryption'", May 20, 2011, the entire disclosure of which is incorporated herein by reference. For example, to hide the identity of medical patients for privacy purposes, a computer system may encrypt all the patient names stored in the medical records. A GPU may efficiently encrypt the names of all medical patients because similar encryption processing needs to be performed on a plurality of names stored as a name field in a plurality of records. In this example, the "column" representing the name field for all the patients must first be "pivoted" into a "row" so that the GPU may perform parallel encryption processing on the name fields and leverage the thousands of cores resident on the GPU.

After the pivoted host buffer is sent to the GPU, the GPU executes the processing specified in the kernel, which may be encrypting the names in the example above. After the GPU executes the kernel, the GPU copies the data back to the host. By aggregating data with similar processing needs, the GPU maximizes the amount of uniformity in the kernel execution.

Figure 46:
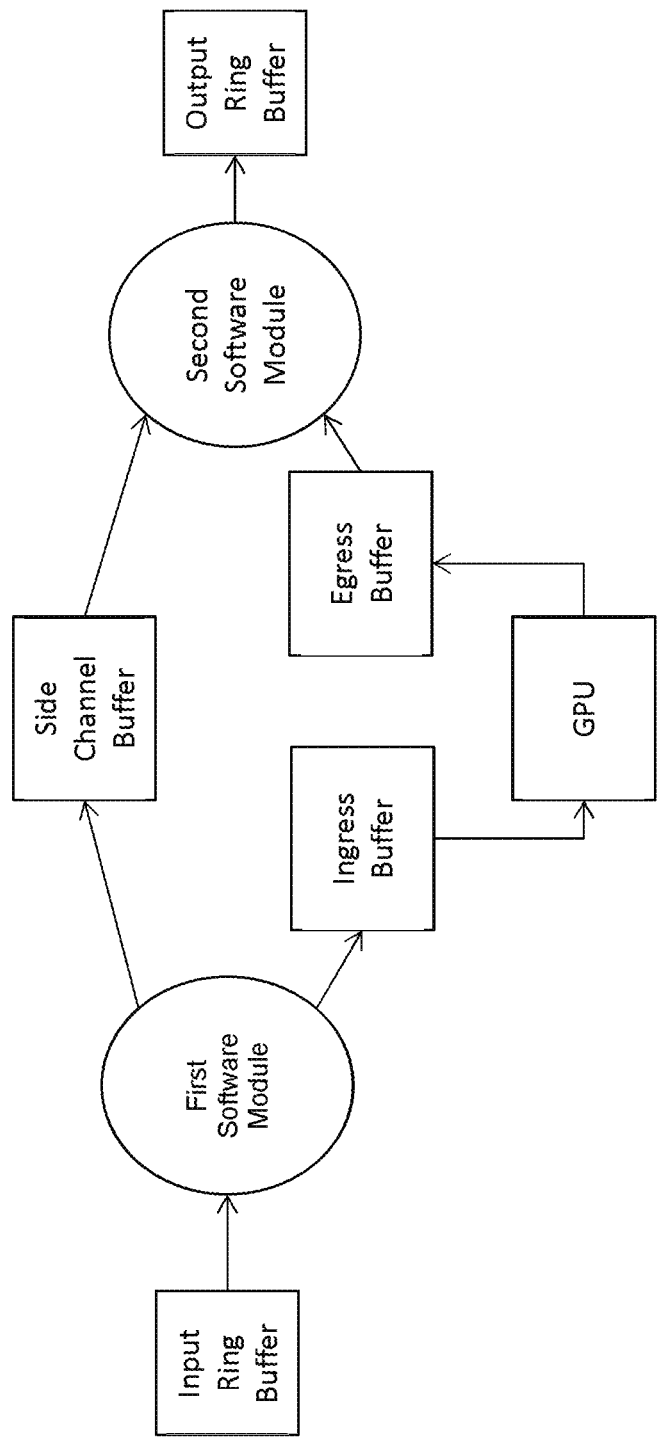
FIG. 46 depicts an exemplary architecture to perform data pivoting and de-pivoting.

FIG. 46 illustrates the modules and components comprising the data pivot and de-pivot operation. These modules and components can be executed in software by a processor. For exemplary purposes, the input data described herein shall be record-based data, but the data does not need to be record based for the pivoting operation. The data pivot operation includes an input ring buffer, an output ring buffer, a first and second software module, an ingress buffer and an egress buffer, a side channel buffer, and a GPU. A GPU is illustrated by way of example in FIG. 46, but it should be understood that the GPU may be replaced by any multi-core or cell processor or reconfigurable logic device such as an FPGA.

The input ring buffer provides a data stream, and the first software module receives the data stream from the input ring buffer. The first software module is configured to manage ingress buffer allocation, identify fields which need to be processed by the GPU, and copy the fields that need to be processed by the GPU into the ingress buffer. The first software module also copies the data stream to the side channel buffer. The data in the side channel buffer may include all the data received by the first software module from the input ring buffer. The side channel buffer may hold the data from the input data stream while the GPU processes some of the fields of the data stream until the de-pivot operation.

The ingress buffer may comprise a pool of ingress buffers, and the first software module may allocate available ingress buffers to store information until data is ready to be sent to the GPU. The ingress buffers are also configured to provide data to the GPU at the direction of the GPU. The egress buffer may also be a pool of buffers, which are allocated by the second software module. The GPU places processed data in the egress buffers after completing the processing task on a field of data.

The second software module is configured to copy all the data from the side channel buffer into the output ring data. In addition, the second software module "de-pivots" each processed field by copying processed data from an egress buffer and overwriting the original data in the corresponding field in the output ring buffer until every used egress buffer has been emptied.

It should be noted that the ingress and egress buffers may come from the same buffer pool. In this way, the first software module or the GPU allocate unused buffers from a pool of buffers for ingress and egress. In another embodiments, the ingress and egress buffers may be separate pools of buffers.

Figure 47:
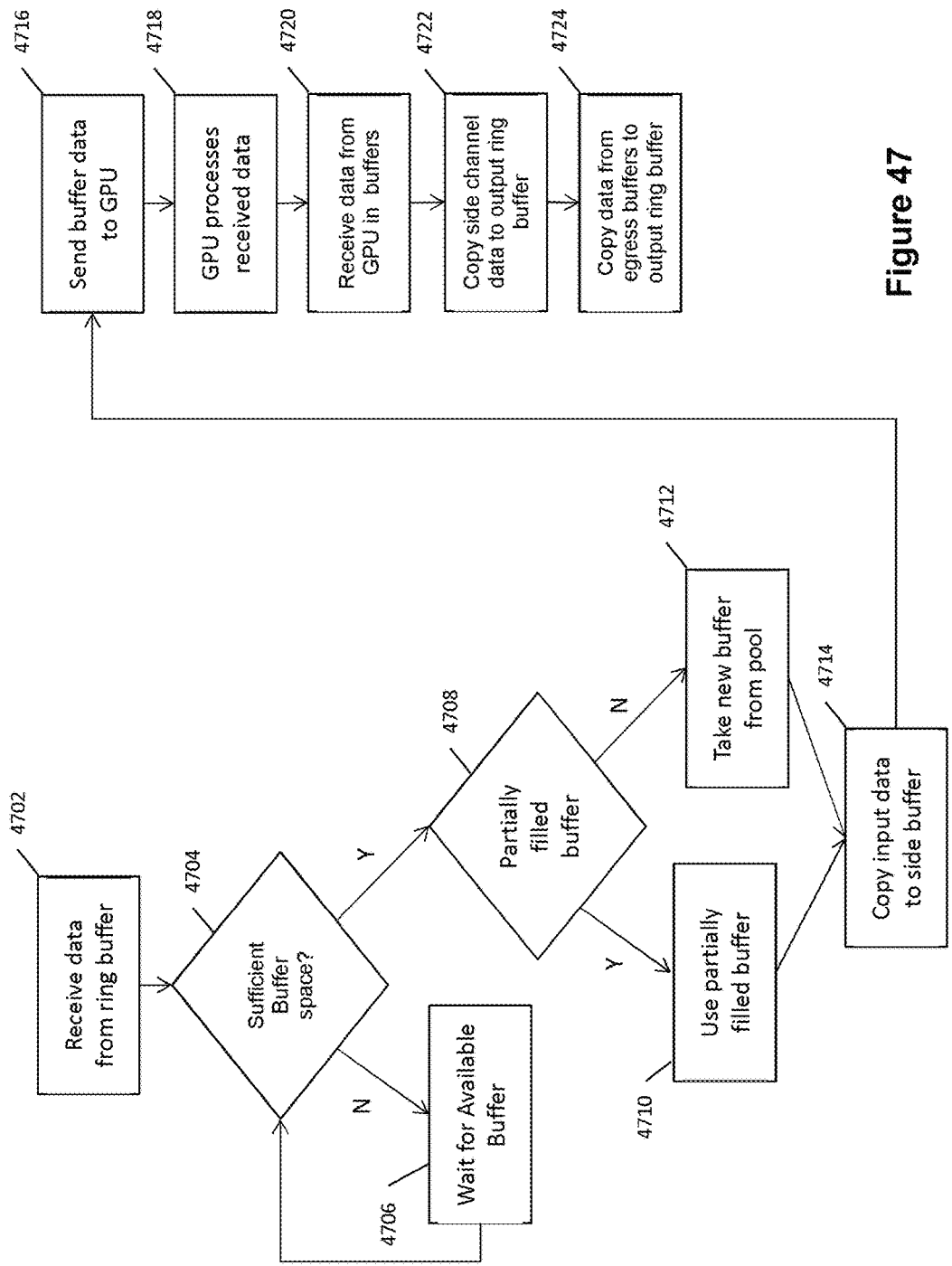
FIG. 47 depicts an exemplary process flow for performing data pivoting and de-pivoting.

FIG. 47 illustrates the method for data pivot and de-pivot before and after processing data using, for example, a GPU. The method 4700 begins in step 4702 when the first software module receives the input data stream from the input ring buffer. After receiving the input data stream, the first software module determines if there is sufficient buffer space to process the input data in step 4704. If the first software module determines there is not sufficient space, the first software module waits until buffer space becomes available in step 4706, such as by waiting for the GPU to begin processing the next batch in a work queue. If the first software module determines that sufficient buffer space is available, the first software module determines if there are any partially-filled ingress buffers already in use for each input field to be processed in step 4708. In other words, the first software module determines whether or not previous buffers have been filled with similar data fields to be processed by the GPU. If a partially-filled buffer exists, the first software module copies the fields to be processed by the GPU into the pre-allocated buffer pool in step 4710. If no partially filled buffers are available, the first software module takes a new ingress buffer from the buffer pool and copies the identified field data to the newly allocated ingress buffer in step 4712.

In some situations, more than one field from a record may be processed by the GPU. For example, if more than one field in a record should be encrypted, then the first software module copies all the fields that need to be processed by the GPU into ingress buffers. However, if more than one field is to be processed by the GPU, then each field of interest across the records is copied into a separate ingress buffer. For example, if fields 0 and 5 are to be processed by the GPU, the first software module copies the data for field 0 in each record to a first ingress buffer and the data for field 5 in each record into a second ingress buffer.

While the first software module searches for fields to be processed by the GPU, the first software module also copies the data from the input ring buffer into the side channel buffer in step 4714. The side buffer holds the input data while the pivoted fields are processed by the GPU until the processed data is ready to be de-pivoted.

After each ingress buffer becomes full, the buffer data is sent to a work queue for the GPU. The ingress buffer may also send data to the work queue if it receives an end of file signal from the first software module or a side channel buffer space full signal. The GPU may signal when it is ready to begin processing another batch of data, and the GPU may begin processing the data in the work queue in step 4718.

After processing the data, the second software module may handle egress of data from the GPU. The second software module may receive data from the GPU and place the field data in egress buffers in step 4720. For example, the second software module de-queues buffers from the GPU work queue only when the GPU indicates the it has completed transforming the buffer contents.

Once all of the fields in each record have been transformed by the GPU, the second software module completely copies the data in the side channel buffer into the output ring buffer in step 4722. Also, the second software module copies processed fields from the egress buffers and "de-pivots" the processed field data by copying the processed field data from the egress buffers into the outbound ring by overwriting the original data for that field in step 4724. For example, if the GPU encrypted data from field 0, the second software module copies the encrypted data from the egress buffer into field 0, thereby overwriting the original, unencrypted data in field 0 with encrypted data. This process continues until the second software module copies the data contained in all the egress buffers. After copying data from an egress buffer, the second software module releases the buffer back into the buffer pool. If the egress and ingress buffers are pulled from the same pool, the buffers become like an assembly line, wherein the first software module may commission a buffer recently used as an egress buffer for storing field data as an ingress buffer.

It should be understood that the egress side of the process flow of FIG. 47 can also include appropriate software checks to ensure that there is sufficient available buffer space.

There are instances where the efficiency of the GPU can be increased even further by adding pre and post processing tasks on the fields during pivot and de-pivot. Pre-processing can be done by the first software module as an additional step as it copies the data from the input ring buffer to the ingress host buffer. Post-processing can be performed by the second software module as an additional step when copying data from the egress buffers onto the output ring buffer. Examples of pre-processing and post-processing operations might include field re-sizing (via padding and de-padding), data conversions, etc. Additional processing threads and ring buffers can be added to the architecture if the pre and post-processing steps create a processing bottleneck in the system.

Also, it should be understood that such data pivoting and de-pivoting in connection with aiding field-specific data processing can be employed by a computing system independently of whether the computing system also performs the data translations described herein.

The exemplary embodiments described herein can be used for a wide array of data processing tasks where performing data translations at low latency and high throughput are desired.

While the present invention has been described above in relation to example embodiments, various modifications may be made thereto that still fall within the invention's scope, as would be recognized by those of ordinary skill in the art. Such modifications to the invention will be recognizable upon review of the teachings herein. As such, the full scope of the present invention is to be defined solely by the appended claims and their legal equivalents.

What is claimed is:

1. A method for low latency and high throughput data translation using record layout detection, the method comprising:

a processor receiving a plurality of records, the records comprising record data content arranged in a first format, but exhibiting a plurality of different record layouts for the first format, wherein the processor comprises a processing pipeline that is controllable to translate records to a second format from any of the different record layouts for the first format, and wherein the processing pipeline is deployed on at least one of a reconfigurable logic device, a graphics processing unit (GPU), a multi-core processor, and a cell processor;

the processor analyzing the record data content with respect to a plurality of conditions corresponding to the different record layouts to determine the record layouts for the records from among the different record layouts, wherein the processor includes a plurality of data analysis components arranged in parallel, and wherein the analyzing step, for each of a plurality of the records, comprises:

the processor processing a record through the data analysis components in parallel, each of a plurality of the data analysis components (1) listening for data of interest in the record based on a byte offset from a start of record, (2) testing the record data content in the data of interest against a corresponding predicate condition to determine whether the corresponding predicate condition has been met, and (3) outputting data indicative of whether the tested record data content satisfies the corresponding predicate condition, wherein the corresponding predicate conditions for the data analysis components in the aggregate serve as criteria for determining whether the record exhibits any of the different record layouts;

based on the output data from the data analysis components, the processor determining whether the record exhibits one of the different record layouts; and in response to a determination that the record exhibits one of the different record layouts, the processor generating data that associates the record with its determined record layout;

defining the byte offsets for data of interest with respect to data analysis components based on data in a configuration table;

the processor streaming the records and data indicative of their determined record layouts through the processing pipeline;

controlling the processing pipeline based on the data indicative of the determined record layouts such that the controlled processing pipeline is configured to translate record data content arranged in the determined record layouts to the second format; and the controlled processing pipeline translating the records by simultaneously performing a plurality of translation tasks on different portions of the streaming record data content to arrange the record data content in the second format.

2. The method of claim 1 wherein the processing pipeline is deployed on a reconfigurable logic device.

3. The method of claim 2 wherein the reconfigurable logic device comprises a field programmable gate array (FPGA).

4. The method of claim 1 wherein the analyzing step is performed by a reconfigurable logic device.

5. The method of claim 4 wherein the reconfigurable logic device comprises the data analysis components arranged in parallel.

6. The method of claim 5 further comprising the reconfigurable logic device repeating the processing step, the determining step, and the generating step for a plurality of the streaming records in a pipelined fashion.

7. The method of claim 5 wherein the analyzing step further comprises:

the processor determining a record length for the record; and the processor generating data that associates the determined record length with the record and its determined record layout.

8. The method of claim 5 further comprising:

loading the predicate conditions into the data analysis components from the configuration table.

9. The method of claim 8 wherein the processing step further comprises each of a plurality of the data analysis components listening for data of interest in each record based on a field identifier in each record; and defining the field identifiers for data of interest with respect to data analysis components based on data in the configuration table.

10. The method of claim 1 wherein the analyzing step is performed by a field programmable gate array (FPGA).

11. The method of claim 1 wherein the processor comprises a first processor and a second processor, wherein the processing pipeline is deployed on the second processor, and wherein the analyzing step is performed by the first processor executing software.

12. The method of claim 11 further comprising a reconfigurable logic device tagging the analyzed records with data indicative of the records' determined record layouts, and wherein the streaming step comprises streaming the tagged records through the processing pipeline.

13. The method of claim 1 wherein the first format is a fixed field format.

14. The method of claim 13 wherein the second format is a mapped field format.

15. The method of claim 14 wherein the mapped field format is a mapped variable field format.

16. The method of claim 13 wherein the second format is a delimited data format.

17. The method of claim 1 wherein the first format is a mapped field format.

18. The method of claim 17 wherein the mapped field format is a mapped variable field format.

19. The method of claim 17 wherein the second format is a fixed field format.

20. The method of claim 17 wherein the second format is a delimited data format.

21. The method of claim 1 wherein the first format is a delimited data format.

22. The method of claim 21 wherein the second format is a mapped field format.

23. The method of claim 22 wherein the mapped field format is a mapped variable field format.

24. The method of claim 21 wherein the second format is a fixed field format.

25. The method of claim 1 further comprising:

performing a data processing operation on the translated data in the second format.

26. The method of claim 25 wherein the translated data comprises a plurality of data characters in a plurality of fields, and wherein the data processing operation performing step comprises a processor selectively targeting a field of the translated data for the data processing operation without analyzing the data characters of the translated data.

27. The method of claim 26 wherein the translated data further comprises a plurality of record headers and a plurality of field headers, the record headers comprising data indicative of where boundaries exist between a plurality of records in the translated data, the field headers comprising data indicative of where boundaries exist between the fields in the records, and wherein the selectively targeting step comprises a processor selectively targeting a field for the data processing operation based on data in the field headers.

28. The method of claim 26 wherein the processor that performs the selectively targeting step and the data processing operation performing step comprises at least one of a reconfigurable logic device, a graphics processing unit (GPU), a multi-core processor, and a cell processor.

29. The method of claim 1 wherein the analyzing step is performed by at least one of a reconfigurable logic device, a graphics processing unit (GPU), a multi-core processor, and a cell processor.

30. An apparatus for low latency and high throughput data translation using record layout detection, the apparatus comprising:
  a processor that includes a processing pipeline, wherein the processing pipeline is deployed on at least one of a reconfigurable logic device, a graphics processing unit (GPU), a multi-core processor, and a cell processor;
  wherein the processor further comprises a plurality of data analysis components and a logic component;
  the processor configured to receive a plurality of records, the records comprising record data content arranged in the first format, but exhibiting a plurality of different record layouts for the first format;
  wherein the processor is further configured to perform record layout detection for each of a plurality of the records via a plurality of operations that (1) process a record through a plurality of the data analysis components in parallel, each of a plurality of the data analysis components configured to (i) listen for data of interest in the record based on a byte offset from a start of record, (ii) test the record data content in the data of interest against a corresponding predicate condition to determine whether the corresponding predicate condition has been met, and (iii) output data indicative of whether the tested record data content satisfies the corresponding predicate condition, wherein the corresponding predicate conditions for the data analysis components in the aggregate serve as criteria for determining whether the record exhibits any of the different record layouts, (2) based on the output data from the data analysis components, determine via the logic component whether the record exhibits one of the different record layouts, and (3) in response to a determination that the record exhibits on of the different record layouts, generate data that associates the record with its determined record layout;
  wherein the processor is further configured to define the byte offsets for data of interest with respect to data analysis components based on data in a configuration table;
  wherein the processor is further configured to stream the records and data indicative of their determined record layouts through the processing pipeline; and
  wherein the processing pipeline is controllable based on the data indicative of the determined record layouts such that the controlled processing pipeline is configured to translate the streaming records by simultaneously performing a plurality of translation tasks on different portions of the streaming record data content having the determined record layouts to arrange the record data content in the second format.

31. The apparatus of claim 30 wherein the processor comprises a reconfigurable logic device, the processing pipeline being deployed on the reconfigurable logic device.

32. The apparatus of claim 31 wherein the reconfigurable logic device comprises a field programmable gate array (FPGA).

33. The apparatus of claim 30 wherein the processor comprises a reconfigurable logic device, and wherein the reconfigurable logic device is configured to perform the analyze operation.

34. The apparatus of claim 33 wherein the first format is a fixed field format.

35. The apparatus of claim 34 wherein the second format is a mapped field format.

36. The apparatus of claim 35 wherein the mapped field format is a mapped variable field format.

37. The apparatus of claim 34 wherein the second format is a delimited data format.

38. The apparatus of claim 33 wherein the first format is a mapped field format.

39. The apparatus of claim 38 wherein the mapped field format is a mapped variable field format.

40. The apparatus of claim 38 wherein the second format is a fixed field format.

41. The apparatus of claim 38 wherein the second format is a delimited data format.

42. The apparatus of claim 33 wherein the first format is a delimited data format.

43. The apparatus of claim 42 wherein the second format is a mapped field format.

44. The apparatus of claim 43 wherein the mapped field format is a mapped variable field format.

45. The apparatus of claim 42 wherein the second format is a fixed field format.

46. The apparatus of claim 30 wherein the processor comprises a field programmable gate array (FPGA), and wherein the FPGA is configured to perform the analyze operation.

47. The apparatus of claim 30 wherein the processor comprises a first processor and a second processor, wherein the first processor comprises a software-based processor configured to execute software to perform the analyze operation, and wherein the processing pipeline is deployed on the second processor.

48. The apparatus of claim 47 wherein the processor further comprises a reconfigurable logic device, the reconfigurable logic device configured to tag the analyzed records with data indicative of the records' determined record layouts, and wherein the processor is further configured to stream the tagged records through the processing pipeline.

49. The apparatus of claim 30 wherein processor is further configured to perform the record layout detection operations for a plurality of the streaming records in a pipelined fashion.

50. The apparatus of claim 30 wherein the processor is further configured to, as part of the record layout detection operations:
  determine a record length for the record; and
  generate the data that associates the determined record length with the record and its determined record layout.

51. The apparatus of claim 30 wherein the processor is further configured to load the predicate conditions into the data analysis components from the configuration table.

52. The apparatus of claim 51 wherein each of a plurality of the data analysis components is configured to listen for data of interest in each record based on a field identifier in each record; and
  wherein the processor is further configured to define the field identifiers for data of interest with respect to data analysis components based on data in the configuration table.

53. The apparatus of claim 30 wherein the processor is further configured to perform a data processing operation on the translated data in the second format.

54. The apparatus of claim 53 wherein the translated data comprises a plurality of data characters in a plurality of fields, and wherein the processor is further configured to selectively target a field of the translated data for the data processing operation without analyzing the data characters of the translated data.

55. The apparatus of claim 54 wherein the translated data further comprises a plurality of record headers and a plurality of field headers, the record headers comprising data indicative of where boundaries exist between a plurality of records in the translated data, the field headers comprising data indicative of where boundaries exist between the fields in the records, and wherein the processor is further configured to selectively target a field for the data processing operation based on data in the field headers.

56. The apparatus of claim 54 wherein the processor comprises at least one of a reconfigurable logic device, a graphics processing unit (GPU), a multi-core processor, and a cell processor that performs the selective targeting operation and the data processing operation.

57. The apparatus of claim 30 wherein processor comprises at least one of a reconfigurable logic device, a graphics processing unit (GPU), a multi-core processor, and a cell processor that performs the analyze operation.

58. The apparatus of claim 30 wherein the processor comprises a hardware record layout detector, the hardware record layout detector comprising (1) the data analysis components arranged in a parallel orientation, and (2) the logic component.

59. The apparatus of claim 58 wherein the processor further comprises a reconfigurable logic device, wherein the hardware record layout detector is deployed on the reconfigurable logic device.

60. The apparatus of claim 30 wherein the processing pipeline is further configured to (1) identify field lengths for fields in the records based on the data indicative of the determined record layouts, (2) identify fields in the record data content based on the identified field lengths, and (3) arrange the identified fields of the record data content in the second format.

61. The apparatus of claim 60 wherein the processing pipeline is further configured to identify the field lengths based on a look up in a table that associates field lengths with data indicative of different record layouts.

62. The method of claim 1 wherein the controlling step comprises (1) identifying field lengths for fields in the records based on the data indicative of the determined record layouts, and (2) providing the identified field lengths to the processing pipeline.

63. The method of claim 62 wherein the translating step comprises the controlled processing pipeline (1) identifying fields in the record data content based on the provided field lengths, and (2) arranging the identified fields of the record data content in the second format.

64. The method of claim 62 wherein the identifying step comprises looking up the field lengths in a table that associates field lengths with data indicative of different record layouts.

* * * * *